United States Patent
Larcheveque et al.

(10) Patent No.: US 7,913,159 B2
(45) Date of Patent: Mar. 22, 2011

(54) SYSTEM AND METHOD FOR REAL-TIME VALIDATION OF STRUCTURED DATA FILES

(75) Inventors: Jean-Marie H. Larcheveque, Bellevue, WA (US); Arungundram Narendran, Bellevue, WA (US); Prakash Sikchi, Issaquah, WA (US); Alexei Levenkov, Kirkland, WA (US); Adriana Ardeleanu, Redmond, WA (US); Andrey Shur, Redmond, WA (US); Alessandro Catorcini, Redmond, WA (US); Nora S. Selim, Redmond, WA (US); Kamaljit S. Bath, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 946 days.

(21) Appl. No.: 10/402,640

(22) Filed: Mar. 28, 2003

(65) Prior Publication Data

US 2004/0189708 A1 Sep. 30, 2004

(51) Int. Cl.
*G06F 3/00* (2006.01)
(52) U.S. Cl. .................. 715/224; 715/226
(58) Field of Classification Search .......... 715/505, 715/507, 224–226
See application file for complete search history.

(56) References Cited

U.S. PATENT DOCUMENTS

| | | | |
|---|---|---|---|
| 4,201,978 A | 5/1980 | Nally | |
| 4,498,147 A | 2/1985 | Agnew et al. | |
| 4,514,800 A | 4/1985 | Gruner et al. | |
| 4,564,752 A | 1/1986 | Lepic et al. | |
| 4,641,274 A | 2/1987 | Swank | |
| 4,674,040 A | 6/1987 | Barker et al. | |
| 4,723,211 A | 2/1988 | Barker et al. | |
| 4,739,477 A | 4/1988 | Barker et al. | |
| 4,815,029 A | 3/1989 | Barker et al. | |
| 4,847,749 A | 7/1989 | Collins et al. | |
| 4,910,663 A | 3/1990 | Bailey | |
| 4,926,476 A | 5/1990 | Covey | |
| 4,933,880 A | 6/1990 | Borgendale et al. | |
| 4,962,475 A | 10/1990 | Hernandez et al. | |
| 5,025,484 A | 6/1991 | Yamanari et al. | |
| 5,072,412 A | 12/1991 | Henderson, Jr. et al. | |
| 5,140,563 A | 8/1992 | Thinesen | |
| 5,179,703 A | 1/1993 | Evans | |
| 5,182,709 A | 1/1993 | Makus | |
| 5,187,786 A | 2/1993 | Densmore et al. | |
| 5,191,645 A | 3/1993 | Carlucci et al. | |
| 5,195,183 A | 3/1993 | Miller et al. | |
| 5,204,947 A | 4/1993 | Bernstein et al. | |

(Continued)

FOREIGN PATENT DOCUMENTS

EP 0 841 615 A2 5/1998

(Continued)

OTHER PUBLICATIONS

Brabrand et al. (PowerForms: Declarative Client-Side Form Field Validation, 2002, pp. 1-20).*

(Continued)

*Primary Examiner* — Ryan F Pitaro

(57) ABSTRACT

A system and method validating entry of data into a structured data file in real-time is described. The system and method also described a real-time validation tool that enables a developer to create custom validation rules. These custom validation rules can include preset validation rules, which the real-time validation tool enables a developer to create in an easy-to-use way.

35 Claims, 19 Drawing Sheets

U.S. PATENT DOCUMENTS

| | | |
|---|---|---|
| 5,206,951 A | 4/1993 | Khoyi et al. |
| 5,218,672 A | 6/1993 | Morgan et al. |
| 5,220,649 A | 6/1993 | Forcier |
| 5,222,160 A | 6/1993 | Sakai et al. |
| 5,228,100 A | 7/1993 | Takeda et al. |
| 5,237,680 A | 8/1993 | Adams et al. |
| 5,249,275 A | 9/1993 | Srivastava |
| 5,251,273 A | 10/1993 | Betts et al. |
| 5,274,803 A | 12/1993 | Dubin et al. |
| 5,297,249 A | 3/1994 | Bernstein et al. |
| 5,297,283 A | 3/1994 | Kelly, Jr. et al. |
| 5,313,631 A | 5/1994 | Kao |
| 5,313,646 A | 5/1994 | Hendricks et al. |
| 5,317,686 A | 5/1994 | Salas et al. |
| 5,333,317 A | 7/1994 | Dann |
| 5,339,423 A | 8/1994 | Beitel et al. |
| 5,339,424 A | 8/1994 | Fushimi |
| 5,341,478 A | 8/1994 | Travis, Jr. et al. |
| 5,369,766 A | 11/1994 | Nakano et al. |
| 5,369,778 A | 11/1994 | San Soucie et al. |
| 5,371,675 A | 12/1994 | Greif et al. |
| 5,377,323 A | 12/1994 | Vasudevan |
| 5,379,419 A | 1/1995 | Heffeman et al. |
| 5,381,547 A | 1/1995 | Flug et al. |
| 5,390,325 A | 2/1995 | Miller |
| 5,396,623 A | 3/1995 | McCall et al. |
| 5,408,665 A | 4/1995 | Fitzgerald |
| 5,410,646 A | 4/1995 | Tondevold et al. |
| 5,410,688 A | 4/1995 | Williams et al. |
| 5,412,772 A | 5/1995 | Monson |
| 5,428,738 A | 6/1995 | Carter et al. |
| 5,434,975 A | 7/1995 | Allen |
| 5,436,637 A | 7/1995 | Gayraud et al. |
| 5,438,659 A | 8/1995 | Notess et al. |
| 5,440,744 A | 8/1995 | Jacobson et al. |
| 5,446,842 A | 8/1995 | Schaeffer et al. |
| 5,455,875 A | 10/1995 | Chevion et al. |
| 5,459,865 A | 10/1995 | Heninger et al. |
| 5,481,722 A | 1/1996 | Skinner |
| 5,497,489 A | 3/1996 | Menne |
| 5,504,898 A | 4/1996 | Klein |
| 5,517,655 A | 5/1996 | Collins et al. |
| 5,535,389 A | 7/1996 | Elder et al. |
| 5,542,070 A | 7/1996 | LeBlanc et al. |
| 5,550,976 A | 8/1996 | Henderson et al. |
| 5,551,035 A | 8/1996 | Arnold et al. |
| 5,555,325 A | 9/1996 | Burger |
| 5,566,330 A | 10/1996 | Sheffield |
| 5,572,643 A | 11/1996 | Judson |
| 5,572,648 A | 11/1996 | Bibayan |
| 5,577,252 A | 11/1996 | Nelson et al. |
| 5,581,686 A | 12/1996 | Koppolu et al. |
| 5,581,760 A | 12/1996 | Atkinson et al. |
| 5,600,789 A | 2/1997 | Parker et al. |
| 5,602,996 A | 2/1997 | Powers, III et al. |
| 5,608,720 A | 3/1997 | Biegel et al. |
| 5,625,783 A | 4/1997 | Ezekiel et al. |
| 5,627,979 A | 5/1997 | Chang et al. |
| 5,630,126 A | 5/1997 | Redpath |
| 5,634,113 A | 5/1997 | Rusterholz |
| 5,634,121 A | 5/1997 | Tracz et al. |
| 5,634,124 A | 5/1997 | Khoyi et al. |
| 5,640,544 A | 6/1997 | Onodera et al. |
| 5,644,738 A | 7/1997 | Goldman et al. |
| 5,649,099 A | 7/1997 | Theimer et al. |
| 5,659,729 A | 8/1997 | Nielsen |
| 5,664,133 A | 9/1997 | Malamud et al. |
| 5,664,178 A | 9/1997 | Sinofsky |
| 5,668,966 A | 9/1997 | Ono et al. |
| 5,669,005 A | 9/1997 | Curbow et al. |
| 5,682,536 A | 10/1997 | Atkinson et al. |
| 5,689,667 A | 11/1997 | Kurtenbach |
| 5,689,703 A | 11/1997 | Atkinson et al. |
| 5,704,029 A | 12/1997 | Wright, Jr. |
| 5,706,501 A | 1/1998 | Horikiri et al. |
| 5,717,939 A | 2/1998 | Bricklin et al. |
| 5,721,824 A | 2/1998 | Taylor |
| 5,740,439 A | 4/1998 | Atkinson et al. |
| 5,742,504 A | 4/1998 | Meyer et al. |
| 5,745,683 A | 4/1998 | Lee et al. |
| 5,745,712 A | 4/1998 | Turpin et al. |
| 5,748,807 A | 5/1998 | Lopresti et al. |
| 5,758,184 A | 5/1998 | Lucovsky et al. |
| 5,758,358 A | 5/1998 | Ebbo |
| 5,761,408 A | 6/1998 | Kolawa et al. |
| 5,761,683 A | 6/1998 | Logan et al. |
| 5,764,984 A | 6/1998 | Loucks |
| 5,764,985 A | 6/1998 | Smale |
| 5,778,372 A | 7/1998 | Cordell et al. |
| 5,778,402 A | 7/1998 | Gipson |
| 5,784,555 A | 7/1998 | Stone |
| 5,790,796 A | 8/1998 | Sadowsky |
| 5,798,757 A | 8/1998 | Smith |
| 5,801,701 A | 9/1998 | Koppolu et al. |
| 5,802,304 A | 9/1998 | Stone |
| 5,806,079 A | 9/1998 | Rivette et al. |
| 5,815,830 A | 9/1998 | Anthony |
| 5,826,031 A | 10/1998 | Nielsen |
| 5,826,265 A | 10/1998 | Van Huben et al. |
| 5,835,777 A | 11/1998 | Staelin |
| 5,838,906 A | 11/1998 | Doyle et al. |
| 5,842,018 A | 11/1998 | Atkinson et al. |
| 5,845,077 A | 12/1998 | Fawcett |
| 5,845,090 A | 12/1998 | Collins, III et al. |
| 5,845,122 A | 12/1998 | Nielsen et al. |
| 5,854,630 A | 12/1998 | Nielsen |
| 5,859,973 A | 1/1999 | Carpenter et al. |
| 5,862,372 A | 1/1999 | Morris et al. |
| 5,862,379 A | 1/1999 | Rubin et al. |
| 5,864,819 A | 1/1999 | De Armas et al. |
| 5,873,088 A | 2/1999 | Hayashi et al. |
| 5,905,492 A | 5/1999 | Straub et al. |
| 5,907,704 A | 5/1999 | Gudmundson et al. |
| 5,910,895 A | 6/1999 | Proskauer et al. |
| 5,911,776 A | 6/1999 | Guck |
| 5,915,112 A | 6/1999 | Boutcher |
| 5,919,247 A | 7/1999 | Van Hoff et al. |
| 5,922,072 A | 7/1999 | Hutchinson et al. |
| 5,928,363 A | 7/1999 | Ruvolo |
| 5,929,858 A | 7/1999 | Shibata et al. |
| 5,940,075 A | 8/1999 | Mutschler, III et al. |
| 5,950,010 A | 9/1999 | Hesse et al. |
| 5,953,731 A | 9/1999 | Glaser |
| 5,956,481 A | 9/1999 | Walsh et al. |
| 5,960,199 A | 9/1999 | Brodsky et al. |
| 5,963,964 A | 10/1999 | Nielsen |
| 5,973,696 A | 10/1999 | Agranat et al. |
| 5,974,454 A | 10/1999 | Apfel et al. |
| 5,982,370 A | 11/1999 | Kamper |
| 5,983,348 A | 11/1999 | Ji |
| 5,987,480 A | 11/1999 | Donohue et al. |
| 5,991,710 A | 11/1999 | Papineni et al. |
| 5,991,731 A * | 11/1999 | Colon et al. ..................... 705/3 |
| 5,991,877 A | 11/1999 | Luckenbaugh |
| 5,995,103 A | 11/1999 | Ashe |
| 5,999,740 A | 12/1999 | Rowley |
| 6,005,570 A | 12/1999 | Gayraud et al. |
| 6,006,227 A | 12/1999 | Freeman et al. |
| 6,012,066 A | 1/2000 | Discount et al. |
| 6,014,135 A | 1/2000 | Fernandes |
| 6,016,520 A | 1/2000 | Facq et al. |
| 6,018,743 A | 1/2000 | Xu |
| 6,021,403 A | 2/2000 | Horvitz et al. |
| 6,026,379 A | 2/2000 | Haller et al. |
| 6,026,416 A | 2/2000 | Kanerva et al. |
| 6,031,989 A | 2/2000 | Cordell |
| 6,035,297 A | 3/2000 | Van Huben et al. |
| 6,035,309 A | 3/2000 | Dauerer et al. |
| 6,044,205 A | 3/2000 | Reed et al. |
| 6,052,531 A | 4/2000 | Waldin et al. |
| 6,052,710 A | 4/2000 | Saliba et al. |
| 6,054,987 A | 4/2000 | Richardson |
| 6,057,837 A | 5/2000 | Hatakeda et al. |
| 6,058,413 A | 5/2000 | Flores et al. |
| 6,065,043 A | 5/2000 | Domenikos et al. |
| 6,069,626 A | 5/2000 | Cline et al. |
| 6,070,184 A | 5/2000 | Blount et al. |

| | | | |
|---|---|---|---|
| 6,072,870 A | 6/2000 | Nguyen et al. |
| 6,078,326 A | 6/2000 | Kilmer et al. |
| 6,078,327 A | 6/2000 | Liman et al. |
| 6,078,924 A | 6/2000 | Ainsbury et al. |
| 6,081,610 A | 6/2000 | Dwork et al. |
| 6,084,585 A | 7/2000 | Kraft et al. |
| 6,088,679 A | 7/2000 | Barkley |
| 6,088,708 A | 7/2000 | Burch et al. |
| 6,091,417 A | 7/2000 | Lefkowitz |
| 6,094,657 A | 7/2000 | Hailpern et al. |
| 6,096,096 A | 8/2000 | Murphy et al. |
| 6,097,382 A | 8/2000 | Rosen et al. |
| 6,098,081 A | 8/2000 | Heidorn et al. |
| 6,105,012 A | 8/2000 | Chang et al. |
| 6,108,637 A | 8/2000 | Blumenau |
| 6,108,783 A | 8/2000 | Krawczyk et al. |
| 6,115,646 A | 9/2000 | Fiszman et al. |
| 6,121,965 A | 9/2000 | Kenney et al. |
| 6,122,647 A | 9/2000 | Horowitz et al. |
| 6,144,969 A | 11/2000 | Inokuchi et al. |
| 6,151,624 A | 11/2000 | Teare et al. |
| 6,154,128 A | 11/2000 | Wookey et al. |
| 6,163,772 A | 12/2000 | Kramer et al. |
| 6,167,521 A | 12/2000 | Smith et al. |
| 6,167,523 A * | 12/2000 | Strong ............................ 726/21 |
| 6,182,094 B1 | 1/2001 | Humpleman et al. |
| 6,182,095 B1 | 1/2001 | Leymaster et al. |
| 6,188,401 B1 | 2/2001 | Peyer |
| 6,191,797 B1 | 2/2001 | Politis |
| 6,192,367 B1 | 2/2001 | Hawley et al. |
| 6,195,661 B1 | 2/2001 | Filepp et al. |
| 6,199,204 B1 | 3/2001 | Donohue |
| 6,209,128 B1 | 3/2001 | Gerard et al. |
| 6,216,152 B1 | 4/2001 | Wong et al. |
| 6,219,423 B1 | 4/2001 | Davis |
| 6,219,698 B1 | 4/2001 | Iannucci et al. |
| 6,225,996 B1 | 5/2001 | Gibb et al. |
| 6,235,027 B1 | 5/2001 | Herzon |
| 6,243,088 B1 | 6/2001 | McCormack et al. |
| 6,253,366 B1 | 6/2001 | Mutschler, III |
| 6,253,374 B1 | 6/2001 | Dresevic et al. |
| 6,263,313 B1 | 7/2001 | Milsted et al. |
| 6,266,810 B1 | 7/2001 | Tanaka et al. |
| 6,268,852 B1 | 7/2001 | Lindhorst et al. |
| 6,272,506 B1 | 8/2001 | Bell |
| 6,275,227 B1 | 8/2001 | DeStefano |
| 6,275,599 B1 | 8/2001 | Adler et al. |
| 6,279,042 B1 | 8/2001 | Ouchi |
| 6,281,896 B1 | 8/2001 | Alimpich et al. |
| 6,282,709 B1 | 8/2001 | Reha et al. |
| 6,282,711 B1 | 8/2001 | Halpern et al. |
| 6,286,033 B1 | 9/2001 | Kishinsky et al. |
| 6,292,897 B1 | 9/2001 | Gennaro et al. |
| 6,292,941 B1 | 9/2001 | Jollands |
| 6,297,819 B1 | 10/2001 | Furst |
| 6,300,948 B1 | 10/2001 | Geller et al. |
| 6,307,955 B1 | 10/2001 | Zank et al. |
| 6,308,179 B1 | 10/2001 | Petersen et al. |
| 6,308,273 B1 | 10/2001 | Goertzel et al. |
| 6,311,221 B1 | 10/2001 | Raz et al. |
| 6,311,271 B1 | 10/2001 | Gennaro et al. |
| 6,314,415 B1 | 11/2001 | Mukherjee |
| 6,321,259 B1 | 11/2001 | Ouellette et al. |
| 6,321,334 B1 | 11/2001 | Jerger et al. |
| 6,327,628 B1 | 12/2001 | Anuff et al. |
| 6,331,864 B1 | 12/2001 | Coco et al. |
| 6,336,214 B1 | 1/2002 | Sundaresan |
| 6,342,907 B1 | 1/2002 | Petty et al. |
| 6,343,149 B1 | 1/2002 | Motoiwa |
| 6,343,302 B1 | 1/2002 | Graham |
| 6,343,377 B1 | 1/2002 | Gessner et al. |
| 6,344,862 B1 | 2/2002 | Williams et al. |
| 6,345,256 B1 | 2/2002 | Milsted et al. |
| 6,345,278 B1 | 2/2002 | Hitchcock et al. |
| 6,345,361 B1 | 2/2002 | Jerger et al. |
| 6,347,323 B1 | 2/2002 | Garber et al. |
| 6,349,408 B1 | 2/2002 | Smith |
| 6,351,574 B1 | 2/2002 | Yair et al. |
| 6,353,851 B1 | 3/2002 | Anupam et al. |
| 6,353,926 B1 | 3/2002 | Parthesarathy et al. |
| 6,356,906 B1 | 3/2002 | Lippert et al. |
| 6,357,038 B1 | 3/2002 | Scouten |
| 6,366,907 B1 | 4/2002 | Fanning et al. |
| 6,366,912 B1 | 4/2002 | Wallent et al. |
| 6,367,013 B1 | 4/2002 | Bisbee et al. |
| 6,369,840 B1 | 4/2002 | Barnett et al. |
| 6,369,841 B1 | 4/2002 | Salomon et al. |
| 6,374,402 B1 | 4/2002 | Schmeidler et al. |
| 6,381,742 B2 | 4/2002 | Forbes et al. |
| 6,381,743 B1 | 4/2002 | Mutschler, III |
| 6,389,434 B1 | 5/2002 | Rivette et al. |
| 6,393,456 B1 | 5/2002 | Ambler et al. |
| 6,393,469 B1 | 5/2002 | Dozier et al. |
| 6,396,488 B1 | 5/2002 | Simmons et al. |
| 6,397,264 B1 | 5/2002 | Stasnick et al. |
| 6,405,221 B1 | 6/2002 | Levine et al. |
| 6,405,238 B1 | 6/2002 | Votipka |
| 6,408,311 B1 | 6/2002 | Baisley et al. |
| 6,414,700 B1 | 7/2002 | Kurtenbach et al. |
| 6,421,070 B1 | 7/2002 | Ramos et al. |
| 6,421,656 B1 | 7/2002 | Cheng et al. |
| 6,421,777 B1 | 7/2002 | Pierre-Louis |
| 6,425,125 B1 | 7/2002 | Fries et al. |
| 6,429,885 B1 | 8/2002 | Saib et al. |
| 6,434,563 B1 | 8/2002 | Pasquali et al. |
| 6,434,564 B2 | 8/2002 | Ebert |
| 6,442,563 B1 | 8/2002 | Bacon et al. |
| 6,442,755 B1 | 8/2002 | Lemmons et al. |
| 6,446,110 B1 | 9/2002 | Lection et al. |
| 6,449,617 B1 | 9/2002 | Quinn et al. |
| 6,457,009 B1 | 9/2002 | Bollay |
| 6,460,058 B2 | 10/2002 | Koppolu et al. |
| 6,463,419 B1 | 10/2002 | Kluss |
| 6,470,349 B1 | 10/2002 | Heninger et al. |
| 6,473,800 B1 | 10/2002 | Jerger et al. |
| 6,476,828 B1 | 11/2002 | Burkett et al. |
| 6,476,833 B1 | 11/2002 | Moshfeghi |
| 6,477,544 B1 | 11/2002 | Bolosky et al. |
| 6,480,860 B1 | 11/2002 | Monday |
| 6,487,566 B1 | 11/2002 | Sundaresan |
| 6,490,601 B1 | 12/2002 | Markus et al. |
| 6,493,007 B1 | 12/2002 | Pang |
| 6,493,702 B1 | 12/2002 | Adar et al. |
| 6,501,864 B1 | 12/2002 | Eguchi et al. |
| 6,502,101 B1 | 12/2002 | Verprauskus et al. |
| 6,502,103 B1 | 12/2002 | Frey et al. |
| 6,505,200 B1 | 1/2003 | Ims et al. |
| 6,505,230 B1 | 1/2003 | Mohan et al. |
| 6,505,300 B2 | 1/2003 | Chan et al. |
| 6,507,856 B1 | 1/2003 | Chen et al. |
| 6,516,322 B1 | 2/2003 | Meredith |
| 6,519,617 B1 | 2/2003 | Wanderski et al. |
| 6,523,027 B1 | 2/2003 | Underwood |
| 6,529,909 B1 | 3/2003 | Bowman-Amuah |
| 6,535,229 B1 | 3/2003 | Kraft |
| 6,535,883 B1 * | 3/2003 | Lee et al. ...................... 707/100 |
| RE38,070 E | 4/2003 | Spies et al. |
| 6,546,546 B1 | 4/2003 | Van Doorn |
| 6,546,554 B1 | 4/2003 | Schmidt et al. |
| 6,549,221 B1 | 4/2003 | Brown et al. |
| 6,549,878 B1 | 4/2003 | Lowry et al. |
| 6,549,922 B1 | 4/2003 | Srivastava et al. |
| 6,553,402 B1 | 4/2003 | Makarios et al. |
| 6,560,616 B1 | 5/2003 | Garber |
| 6,560,620 B1 | 5/2003 | Ching |
| 6,560,640 B2 | 5/2003 | Smethers |
| 6,563,514 B1 | 5/2003 | Samar |
| 6,571,253 B1 | 5/2003 | Thompson et al. |
| 6,578,144 B1 | 6/2003 | Gennaro et al. |
| 6,581,061 B2 | 6/2003 | Graham |
| 6,584,469 B1 | 6/2003 | Chiang et al. |
| 6,584,548 B1 | 6/2003 | Bourne et al. |
| 6,585,778 B1 | 7/2003 | Hind et al. |
| 6,589,290 B1 | 7/2003 | Maxwell et al. |
| 6,594,686 B1 | 7/2003 | Edwards et al. |
| 6,598,219 B1 | 7/2003 | Lau |
| 6,603,489 B1 | 8/2003 | Edlund et al. |
| 6,604,099 B1 | 8/2003 | Chung et al. |

| | | |
|---|---|---|
| 6,606,606 B2 | 8/2003 | Starr |
| 6,609,200 B2 | 8/2003 | Anderson et al. |
| 6,611,822 B1 | 8/2003 | Beams et al. |
| 6,611,840 B1 | 8/2003 | Baer et al. |
| 6,611,843 B1 | 8/2003 | Jacobs |
| 6,613,098 B1 | 9/2003 | Sorge et al. |
| 6,615,276 B1 | 9/2003 | Mastriann et al. |
| 6,629,109 B1 | 9/2003 | Koshisaka |
| 6,631,357 B1 | 10/2003 | Perkowski |
| 6,631,379 B2 | 10/2003 | Cox |
| 6,631,497 B1 | 10/2003 | Jamshidi et al. |
| 6,631,519 B1 | 10/2003 | Nicholson et al. |
| 6,632,251 B1 | 10/2003 | Rutten et al. |
| 6,633,315 B1 | 10/2003 | Sobeski et al. |
| 6,635,089 B1 | 10/2003 | Burkett et al. |
| 6,636,845 B2 | 10/2003 | Chau et al. |
| 6,643,633 B2 | 11/2003 | Chau et al. |
| 6,643,652 B2 | 11/2003 | Helgeson et al. |
| 6,643,684 B1 | 11/2003 | Malkin et al. |
| 6,651,217 B1 | 11/2003 | Kennedy et al. |
| 6,654,737 B1 | 11/2003 | Nunez |
| 6,654,932 B1 | 11/2003 | Bahrs et al. |
| 6,658,417 B1 | 12/2003 | Stakutis et al. |
| 6,658,622 B1 * | 12/2003 | Aiken et al. ............... 715/507 |
| 6,661,920 B1 | 12/2003 | Skinner |
| 6,668,369 B1 | 12/2003 | Krebs et al. |
| 6,671,805 B1 | 12/2003 | Brown et al. |
| 6,675,202 B1 | 1/2004 | Perttunen |
| 6,678,717 B1 | 1/2004 | Schneider |
| 6,681,370 B2 | 1/2004 | Lawrence et al. |
| 6,691,230 B1 | 2/2004 | Bardon |
| 6,691,281 B1 | 2/2004 | Sorge et al. |
| 6,697,944 B1 | 2/2004 | Jones et al. |
| 6,701,434 B1 | 3/2004 | Rohatgi |
| 6,701,486 B1 | 3/2004 | Weber et al. |
| 6,704,906 B1 | 3/2004 | Yankovich et al. |
| 6,711,679 B1 | 3/2004 | Guski et al. |
| 6,720,985 B1 | 4/2004 | Silverbrook et al. |
| 6,725,426 B1 | 4/2004 | Pavlov |
| 6,728,755 B1 | 4/2004 | de Ment |
| 6,735,721 B1 | 5/2004 | Morrow et al. |
| 6,745,367 B1 | 6/2004 | Bates et al. |
| 6,748,385 B1 | 6/2004 | Rodkin et al. |
| 6,748,569 B1 | 6/2004 | Brooke et al. |
| 6,751,777 B2 | 6/2004 | Bates et al. |
| 6,754,874 B1 | 6/2004 | Richman |
| 6,757,826 B1 | 6/2004 | Paltenghe |
| 6,757,868 B1 | 6/2004 | Glaser et al. |
| 6,760,723 B2 | 7/2004 | Oshinsky et al. |
| 6,763,343 B1 | 7/2004 | Brooke et al. |
| 6,772,139 B1 | 8/2004 | Smith, III |
| 6,772,165 B2 | 8/2004 | O'Carroll |
| 6,774,926 B1 | 8/2004 | Ellis et al. |
| 6,779,154 B1 | 8/2004 | Nussbaum et al. |
| 6,781,609 B1 | 8/2004 | Barker et al. |
| 6,782,144 B2 | 8/2004 | Bellavita et al. |
| 6,799,299 B1 | 9/2004 | Li et al. |
| 6,801,929 B1 | 10/2004 | Donoho et al. |
| 6,816,849 B1 | 11/2004 | Halt, Jr. |
| 6,828,992 B1 | 12/2004 | Freeman et al. |
| 6,845,380 B2 | 1/2005 | Su et al. |
| 6,845,499 B2 | 1/2005 | Srivastava et al. |
| 6,847,387 B2 | 1/2005 | Roth |
| 6,848,078 B1 | 1/2005 | Birsan et al. |
| 6,850,895 B2 | 2/2005 | Brodersen et al. |
| 6,871,220 B1 | 3/2005 | Rajan et al. |
| 6,871,345 B1 | 3/2005 | Crow et al. |
| 6,874,130 B1 | 3/2005 | Baweja et al. |
| 6,876,996 B2 | 4/2005 | Czajkowski et al. |
| 6,883,168 B1 | 4/2005 | James et al. |
| 6,889,359 B1 | 5/2005 | Conner et al. |
| 6,901,403 B1 | 5/2005 | Bata et al. |
| 6,915,454 B1 | 7/2005 | Moore et al. |
| 6,925,609 B1 | 8/2005 | Lucke |
| 6,931,532 B1 | 8/2005 | Davis et al. |
| 6,941,510 B1 | 9/2005 | Ozzie et al. |
| 6,941,511 B1 | 9/2005 | Hind et al. |
| 6,941,521 B2 | 9/2005 | Lin et al. |
| 6,948,129 B1 | 9/2005 | Loghmani |
| 6,948,133 B2 | 9/2005 | Haley |
| 6,948,135 B1 | 9/2005 | Ruthfield et al. |
| 6,950,980 B1 | 9/2005 | Malcolm |
| 6,950,987 B1 | 9/2005 | Hargraves et al. |
| 6,957,395 B1 | 10/2005 | Jobs et al. |
| 6,961,897 B1 | 11/2005 | Peel, Jr. et al. |
| 6,963,875 B2 | 11/2005 | Moore |
| 6,968,503 B1 | 11/2005 | Chang et al. |
| 6,968,505 B2 | 11/2005 | Stoll et al. |
| 6,993,714 B2 | 1/2006 | Kaler et al. |
| 6,993,722 B1 | 1/2006 | Greer et al. |
| 6,996,776 B1 | 2/2006 | Makely et al. |
| 6,996,781 B1 | 2/2006 | Myers et al. |
| 7,000,179 B2 | 2/2006 | Yankovich et al. |
| 7,002,560 B2 | 2/2006 | Graham |
| 7,003,548 B1 * | 2/2006 | Barck et al. ............... 709/203 |
| 7,003,722 B2 | 2/2006 | Rothchiller et al. |
| 7,010,580 B1 | 3/2006 | Fu et al. |
| 7,020,869 B2 | 3/2006 | Abrari et al. |
| 7,024,417 B1 | 4/2006 | Russakovsky et al. |
| 7,032,170 B2 | 4/2006 | Poulose |
| 7,036,072 B1 | 4/2006 | Sulistio et al. |
| 7,039,875 B2 | 5/2006 | Khalfay et al. |
| 7,043,687 B2 | 5/2006 | Knauss et al. |
| 7,051,273 B1 | 5/2006 | Holt et al. |
| 7,058,663 B2 | 6/2006 | Johnston et al. |
| 7,062,764 B2 | 6/2006 | Cohen et al. |
| 7,065,493 B1 | 6/2006 | Homsi |
| 7,076,728 B2 | 7/2006 | Davis et al. |
| 7,080,083 B2 | 7/2006 | Kim et al. |
| 7,080,325 B2 | 7/2006 | Treibach-Heck et al. |
| 7,081,882 B2 | 7/2006 | Sowden et al. |
| 7,086,009 B2 | 8/2006 | Resnick et al. |
| 7,086,042 B2 | 8/2006 | Abe et al. |
| 7,088,374 B2 | 8/2006 | David et al. |
| 7,100,147 B2 | 8/2006 | Miller et al. |
| 7,103,611 B2 | 9/2006 | Murthy et al. |
| 7,106,888 B1 | 9/2006 | Silverbrook et al. |
| 7,107,282 B1 | 9/2006 | Yalamanchi |
| 7,107,521 B2 | 9/2006 | Santos |
| 7,107,539 B2 | 9/2006 | Abbott et al. |
| 7,120,863 B1 * | 10/2006 | Wang ............... 715/227 |
| 7,124,167 B1 | 10/2006 | Bellotti et al. |
| 7,130,885 B2 | 10/2006 | Chandra et al. |
| 7,143,341 B1 | 11/2006 | Kohli |
| 7,146,564 B2 | 12/2006 | Kim et al. |
| 7,152,205 B2 | 12/2006 | Day et al. |
| 7,159,011 B1 | 1/2007 | Knight et al. |
| 7,168,035 B1 | 1/2007 | Bell et al. |
| 7,178,166 B1 | 2/2007 | Taylor et al. |
| 7,190,376 B1 | 3/2007 | Tonisson |
| 7,191,394 B1 | 3/2007 | Ardeleanu et al. |
| 7,200,816 B1 | 4/2007 | Falk et al. |
| 7,213,200 B2 | 5/2007 | Abe et al. |
| 7,236,982 B2 | 6/2007 | Zlatanov et al. |
| 7,237,114 B1 | 6/2007 | Rosenberg |
| 7,249,328 B1 | 7/2007 | Davis |
| 7,272,789 B2 | 9/2007 | O'Brien |
| 7,281,206 B2 | 10/2007 | Schnelle et al. |
| 7,281,245 B2 | 10/2007 | Reynar et al. |
| 7,284,208 B2 | 10/2007 | Matthews |
| 7,287,218 B1 | 10/2007 | Knotz et al. |
| 7,296,017 B2 * | 11/2007 | Larcheveque et al. ............ 707/6 |
| 7,313,758 B2 | 12/2007 | Kozlov |
| 7,316,003 B1 | 1/2008 | Dulepet et al. |
| 7,318,237 B2 | 1/2008 | Moriconi et al. |
| 7,334,187 B2 | 2/2008 | Stanciu et al. |
| 7,337,391 B2 | 2/2008 | Clarke et al. |
| 7,337,392 B2 | 2/2008 | Lue |
| 7,346,610 B2 | 3/2008 | Ruthfield et al. |
| 7,346,840 B1 | 3/2008 | Ravishankar et al. |
| 7,346,848 B1 | 3/2008 | Ruthfield et al. |
| 7,350,141 B2 | 3/2008 | Kotler et al. |
| 7,370,066 B1 | 5/2008 | Sikchi et al. |
| 7,373,595 B2 | 5/2008 | Jones et al. |
| 7,376,673 B1 | 5/2008 | Chalecki et al. |
| 7,412,649 B2 | 8/2008 | Emek et al. |
| 7,424,671 B2 | 9/2008 | Elza et al. |
| 7,428,699 B1 | 9/2008 | Kane et al. |

| Patent/Pub No. | Date | Name |
|---|---|---|
| 7,441,200 B2 | 10/2008 | Savage |
| 7,490,109 B1 | 2/2009 | Sikchi et al. |
| 7,496,632 B2 | 2/2009 | Chapman et al. |
| 7,496,837 B1 | 2/2009 | Larcheveque et al. |
| 7,543,228 B2 | 6/2009 | Kelkar |
| 7,549,115 B2 | 6/2009 | Kotler |
| 7,562,215 B2 | 7/2009 | Cummins |
| 7,584,417 B2 | 9/2009 | Friend |
| 7,613,996 B2 | 11/2009 | Dallett et al. |
| 7,673,227 B2 | 3/2010 | Kotler |
| 7,673,228 B2 | 3/2010 | Kelkar |
| 7,676,843 B1 | 3/2010 | Stott |
| 7,689,929 B2 | 3/2010 | Ruthfield |
| 7,692,636 B2 | 4/2010 | Kim |
| 7,712,022 B2 | 5/2010 | Smuga |
| 7,721,190 B2 | 5/2010 | Sikchi |
| 7,725,834 B2 | 5/2010 | Bell |
| 7,774,620 B1 | 8/2010 | Stott |
| 7,779,027 B2 | 8/2010 | James |
| 2001/0007109 A1 | 7/2001 | Lange |
| 2001/0016880 A1 | 8/2001 | Cai et al. |
| 2001/0022592 A1 | 9/2001 | Alimpich et al. |
| 2001/0024195 A1 | 9/2001 | Hayakawa |
| 2001/0037345 A1 | 11/2001 | Kiernan |
| 2001/0044850 A1 | 11/2001 | Raz et al. |
| 2001/0051928 A1 | 12/2001 | Brody |
| 2001/0054004 A1 | 12/2001 | Powers |
| 2001/0056411 A1 | 12/2001 | Lindskog et al. |
| 2001/0056429 A1 | 12/2001 | Moore et al. |
| 2001/0056460 A1 | 12/2001 | Sahota et al. |
| 2002/0010700 A1 | 1/2002 | Wotring |
| 2002/0010743 A1 | 1/2002 | Ryan et al. |
| 2002/0010746 A1 | 1/2002 | Jilk, Jr. et al. |
| 2002/0010855 A1 | 1/2002 | Reshef et al. |
| 2002/0013788 A1 | 1/2002 | Pennell et al. |
| 2002/0019941 A1 | 2/2002 | Chan et al. |
| 2002/0023113 A1 | 2/2002 | Hsing et al. |
| 2002/0026441 A1 | 2/2002 | Kutay |
| 2002/0026461 A1 | 2/2002 | Kutay |
| 2002/0032590 A1 | 3/2002 | Anand et al. |
| 2002/0032692 A1 | 3/2002 | Suzuki et al. |
| 2002/0032706 A1 | 3/2002 | Perla et al. |
| 2002/0032768 A1 | 3/2002 | Voskuil |
| 2002/0035579 A1 | 3/2002 | Wang et al. |
| 2002/0035581 A1 | 3/2002 | Reynar et al. |
| 2002/0040469 A1 | 4/2002 | Pramberger |
| 2002/0052769 A1 | 5/2002 | Navani et al. |
| 2002/0053021 A1 | 5/2002 | Rice et al. |
| 2002/0054126 A1 | 5/2002 | Gamon |
| 2002/0057297 A1 | 5/2002 | Grimes et al. |
| 2002/0065798 A1 | 5/2002 | Bostleman et al. |
| 2002/0065847 A1 | 5/2002 | Furukawa et al. |
| 2002/0070973 A1 | 6/2002 | Croley |
| 2002/0078074 A1 | 6/2002 | Cho et al. |
| 2002/0078103 A1 | 6/2002 | Gorman et al. |
| 2002/0083145 A1 | 6/2002 | Perinpanathan |
| 2002/0083148 A1 | 6/2002 | Shaw et al. |
| 2002/0083318 A1 | 6/2002 | Larose |
| 2002/0091738 A1 | 7/2002 | Rohrabaugh et al. |
| 2002/0099952 A1 | 7/2002 | Lambert et al. |
| 2002/0100027 A1 | 7/2002 | Binding et al. |
| 2002/0107885 A1 | 8/2002 | Brooks et al. |
| 2002/0111699 A1 | 8/2002 | Melli et al. |
| 2002/0111932 A1 | 8/2002 | Roberge et al. |
| 2002/0112224 A1 | 8/2002 | Cox |
| 2002/0129056 A1 | 9/2002 | Conant |
| 2002/0133484 A1 | 9/2002 | Chau et al. |
| 2002/0152222 A1 | 10/2002 | Holbrook |
| 2002/0152244 A1 | 10/2002 | Dean et al. |
| 2002/0156772 A1 | 10/2002 | Chau et al. |
| 2002/0156846 A1 | 10/2002 | Rawat et al. |
| 2002/0156929 A1 | 10/2002 | Hekmatpour |
| 2002/0169752 A1 | 11/2002 | Kusama et al. |
| 2002/0169789 A1 | 11/2002 | Kutay |
| 2002/0174147 A1 | 11/2002 | Wang et al. |
| 2002/0174417 A1 | 11/2002 | Sijacic et al. |
| 2002/0178187 A1 | 11/2002 | Rasmussen et al. |
| 2002/0178380 A1 | 11/2002 | Wolf et al. |
| 2002/0184188 A1 | 12/2002 | Mandyam et al. |
| 2002/0184219 A1 | 12/2002 | Preisig et al. |
| 2002/0184401 A1 | 12/2002 | Kadel, Jr. et al. |
| 2002/0184485 A1 | 12/2002 | Dray et al. |
| 2002/0188597 A1 | 12/2002 | Kern et al. |
| 2002/0188613 A1 | 12/2002 | Chakraborty et al. |
| 2002/0194219 A1 | 12/2002 | Bradley et al. |
| 2002/0196281 A1 | 12/2002 | Audleman et al. |
| 2002/0196288 A1 | 12/2002 | Emrani |
| 2002/0198891 A1 | 12/2002 | Li et al. |
| 2002/0198935 A1* | 12/2002 | Crandall et al. ............... 709/203 |
| 2003/0004951 A1* | 1/2003 | Chokshi ........................ 707/10 |
| 2003/0007000 A1 | 1/2003 | Carlson et al. |
| 2003/0014397 A1 | 1/2003 | Chau et al. |
| 2003/0018668 A1 | 1/2003 | Britton et al. |
| 2003/0020746 A1 | 1/2003 | Chen et al. |
| 2003/0023641 A1 | 1/2003 | Gorman et al. |
| 2003/0025693 A1 | 2/2003 | Haley |
| 2003/0025732 A1 | 2/2003 | Prichard |
| 2003/0026507 A1 | 2/2003 | Zlotnick |
| 2003/0028550 A1 | 2/2003 | Lee et al. |
| 2003/0037021 A1 | 2/2003 | Krothappalli et al. |
| 2003/0037303 A1 | 2/2003 | Bodlaender |
| 2003/0038788 A1 | 2/2003 | Demartines et al. |
| 2003/0038846 A1 | 2/2003 | Hori et al. |
| 2003/0043986 A1 | 3/2003 | Creamer |
| 2003/0046665 A1 | 3/2003 | Ilin |
| 2003/0048301 A1 | 3/2003 | Menninger |
| 2003/0051243 A1 | 3/2003 | Lemmons et al. |
| 2003/0055811 A1 | 3/2003 | Stork et al. |
| 2003/0055828 A1 | 3/2003 | Koch et al. |
| 2003/0056198 A1 | 3/2003 | Al-Azzawe |
| 2003/0061386 A1 | 3/2003 | Brown |
| 2003/0061567 A1 | 3/2003 | Brown et al. |
| 2003/0084424 A1 | 5/2003 | Reddy et al. |
| 2003/0093755 A1 | 5/2003 | O'Carroll |
| 2003/0110443 A1 | 6/2003 | Yankovich et al. |
| 2003/0120578 A1 | 6/2003 | Newman |
| 2003/0120651 A1 | 6/2003 | Bernstein et al. |
| 2003/0120659 A1 | 6/2003 | Sridhar |
| 2003/0120671 A1 | 6/2003 | Kim et al. |
| 2003/0120686 A1 | 6/2003 | Kim et al. |
| 2003/0126555 A1 | 7/2003 | Aggarwal et al. |
| 2003/0128196 A1 | 7/2003 | Lapstun et al. |
| 2003/0135825 A1 | 7/2003 | Gertner et al. |
| 2003/0140132 A1 | 7/2003 | Champagne et al. |
| 2003/0140160 A1 | 7/2003 | Raz et al. |
| 2003/0142072 A1 | 7/2003 | Lapstun et al. |
| 2003/0149934 A1* | 8/2003 | Worden ........................ 715/513 |
| 2003/0158897 A1 | 8/2003 | Ben-Natan et al. |
| 2003/0163285 A1 | 8/2003 | Nakamura et al. |
| 2003/0167277 A1 | 9/2003 | Hejlsberg et al. |
| 2003/0172113 A1 | 9/2003 | Cameron et al. |
| 2003/0182268 A1 | 9/2003 | Lal |
| 2003/0182327 A1 | 9/2003 | Ramanujam et al. |
| 2003/0187756 A1 | 10/2003 | Klivington et al. |
| 2003/0187930 A1 | 10/2003 | Ghaffar et al. |
| 2003/0188260 A1 | 10/2003 | Jensen et al. |
| 2003/0189593 A1 | 10/2003 | Yarvin |
| 2003/0192008 A1 | 10/2003 | Lee |
| 2003/0200506 A1 | 10/2003 | Abe et al. |
| 2003/0204481 A1 | 10/2003 | Lau |
| 2003/0204511 A1 | 10/2003 | Brundage |
| 2003/0204814 A1 | 10/2003 | Elo et al. |
| 2003/0205615 A1 | 11/2003 | Marappan |
| 2003/0210428 A1 | 11/2003 | Bevlin et al. |
| 2003/0212664 A1 | 11/2003 | Breining et al. |
| 2003/0212902 A1 | 11/2003 | van der Made |
| 2003/0217053 A1 | 11/2003 | Bachman et al. |
| 2003/0218620 A1 | 11/2003 | Lai et al. |
| 2003/0220930 A1 | 11/2003 | Milleker et al. |
| 2003/0225469 A1 | 12/2003 | DeRemer et al. |
| 2003/0225768 A1 | 12/2003 | Chaudhuri |
| 2003/0225829 A1 | 12/2003 | Pena et al. |
| 2003/0226111 A1 | 12/2003 | Wirts et al. |
| 2003/0226132 A1 | 12/2003 | Tondreau et al. |
| 2003/0233374 A1 | 12/2003 | Spinola et al. |
| 2003/0233644 A1 | 12/2003 | Cohen et al. |
| 2003/0236859 A1 | 12/2003 | Vaschillo et al. |
| 2003/0236903 A1 | 12/2003 | Piotrowski |

| Publication No. | Date | Inventor |
|---|---|---|
| 2003/0237046 A1 | 12/2003 | Parker et al. |
| 2003/0237047 A1 | 12/2003 | Borson |
| 2004/0002939 A1 | 1/2004 | Arora |
| 2004/0002950 A1 | 1/2004 | Brennan et al. |
| 2004/0003031 A1 | 1/2004 | Brown et al. |
| 2004/0003353 A1 | 1/2004 | Rivera et al. |
| 2004/0003389 A1 | 1/2004 | Reynar et al. |
| 2004/0006744 A1 | 1/2004 | Jones et al. |
| 2004/0010752 A1 | 1/2004 | Chan et al. |
| 2004/0015783 A1 | 1/2004 | Lennon et al. |
| 2004/0024842 A1 | 2/2004 | Witt |
| 2004/0030991 A1 | 2/2004 | Hepworth et al. |
| 2004/0039881 A1 | 2/2004 | Shoebridge et al. |
| 2004/0039990 A1 | 2/2004 | Bakar et al. |
| 2004/0039993 A1* | 2/2004 | Kougiouris et al. .......... 715/513 |
| 2004/0044961 A1 | 3/2004 | Pesenson |
| 2004/0044965 A1 | 3/2004 | Toyama et al. |
| 2004/0046789 A1 | 3/2004 | Inanoria |
| 2004/0054966 A1* | 3/2004 | Busch et al. ................ 715/505 |
| 2004/0059754 A1 | 3/2004 | Barghout et al. |
| 2004/0073565 A1 | 4/2004 | Kaufman et al. |
| 2004/0073868 A1 | 4/2004 | Easter et al. |
| 2004/0078756 A1 | 4/2004 | Napper et al. |
| 2004/0083426 A1 | 4/2004 | Sahu |
| 2004/0088647 A1 | 5/2004 | Miller et al. |
| 2004/0088652 A1 | 5/2004 | Abe et al. |
| 2004/0093596 A1 | 5/2004 | Koyano |
| 2004/0107367 A1 | 6/2004 | Kisters |
| 2004/0117769 A1 | 6/2004 | Lauzon et al. |
| 2004/0123277 A1 | 6/2004 | Schrader et al. |
| 2004/0139400 A1 | 7/2004 | Allam et al. |
| 2004/0146199 A1 | 7/2004 | Berkner et al. |
| 2004/0148178 A1 | 7/2004 | Brain |
| 2004/0148514 A1 | 7/2004 | Fee et al. |
| 2004/0148571 A1 | 7/2004 | Lue |
| 2004/0162741 A1 | 8/2004 | Flaxer et al. |
| 2004/0163041 A1 | 8/2004 | Engel |
| 2004/0163046 A1 | 8/2004 | Chu et al. |
| 2004/0172442 A1 | 9/2004 | Ripley |
| 2004/0181543 A1 | 9/2004 | Wu et al. |
| 2004/0181711 A1 | 9/2004 | Johnson et al. |
| 2004/0186762 A1 | 9/2004 | Beaven et al. |
| 2004/0189708 A1 | 9/2004 | Larcheveque et al. |
| 2004/0189716 A1 | 9/2004 | Paoli et al. |
| 2004/0194035 A1 | 9/2004 | Chakraborty |
| 2004/0199572 A1 | 10/2004 | Hunt et al. |
| 2004/0205473 A1 | 10/2004 | Fisher et al. |
| 2004/0205525 A1 | 10/2004 | Murren et al. |
| 2004/0205534 A1 | 10/2004 | Koelle |
| 2004/0205571 A1 | 10/2004 | Adler |
| 2004/0205592 A1 | 10/2004 | Huang |
| 2004/0205605 A1 | 10/2004 | Adler et al. |
| 2004/0205653 A1 | 10/2004 | Hadfield et al. |
| 2004/0205671 A1 | 10/2004 | Sukehiro et al. |
| 2004/0210599 A1 | 10/2004 | Friedman et al. |
| 2004/0210645 A1 | 10/2004 | Kouznetsov et al. |
| 2004/0216084 A1 | 10/2004 | Brown et al. |
| 2004/0221238 A1 | 11/2004 | Cifra et al. |
| 2004/0221245 A1 | 11/2004 | Chickles et al. |
| 2004/0237030 A1 | 11/2004 | Malkin |
| 2004/0260593 A1 | 12/2004 | Abraham-Fuchs et al. |
| 2004/0261019 A1 | 12/2004 | Imamura et al. |
| 2004/0268229 A1 | 12/2004 | Paoli et al. |
| 2005/0004893 A1 | 1/2005 | Sangroniz |
| 2005/0005248 A1 | 1/2005 | Rockey et al. |
| 2005/0015279 A1 | 1/2005 | Rucker |
| 2005/0015732 A1 | 1/2005 | Vedula et al. |
| 2005/0022115 A1 | 1/2005 | Baumgartner et al. |
| 2005/0027757 A1 | 2/2005 | Kiessig et al. |
| 2005/0028073 A1 | 2/2005 | Henry et al. |
| 2005/0033626 A1 | 2/2005 | Kruse et al. |
| 2005/0033728 A1 | 2/2005 | James |
| 2005/0038711 A1 | 2/2005 | Marlelo |
| 2005/0050066 A1 | 3/2005 | Hughes |
| 2005/0055627 A1 | 3/2005 | Lloyd et al. |
| 2005/0060324 A1 | 3/2005 | Johnson et al. |
| 2005/0060647 A1 | 3/2005 | Doan et al. |
| 2005/0060721 A1 | 3/2005 | Choudhary et al. |
| 2005/0065933 A1 | 3/2005 | Goering |
| 2005/0065936 A1 | 3/2005 | Goering |
| 2005/0066287 A1 | 3/2005 | Tattrie et al. |
| 2005/0071752 A1 | 3/2005 | Marlatt |
| 2005/0076049 A1 | 4/2005 | Qubti et al. |
| 2005/0080801 A1 | 4/2005 | Kothandaraman et al. |
| 2005/0091285 A1 | 4/2005 | Krishnan et al. |
| 2005/0091305 A1 | 4/2005 | Lange et al. |
| 2005/0097536 A1 | 5/2005 | Bernstein et al. |
| 2005/0102370 A1 | 5/2005 | Lin et al. |
| 2005/0102612 A1 | 5/2005 | Allan et al. |
| 2005/0108104 A1 | 5/2005 | Woo |
| 2005/0108624 A1 | 5/2005 | Carrier |
| 2005/0114757 A1 | 5/2005 | Sahota et al. |
| 2005/0114764 A1 | 5/2005 | Gudenkauf et al. |
| 2005/0132043 A1 | 6/2005 | Wang et al. |
| 2005/0132196 A1 | 6/2005 | Dietl |
| 2005/0138031 A1 | 6/2005 | Wefers |
| 2005/0138086 A1 | 6/2005 | Pecht-Seibert |
| 2005/0138539 A1 | 6/2005 | Bravery et al. |
| 2005/0149375 A1 | 7/2005 | Wefers |
| 2005/0149726 A1 | 7/2005 | Joshi et al. |
| 2005/0160398 A1 | 7/2005 | Bjornson et al. |
| 2005/0171746 A1 | 8/2005 | Thalhammer-Reyero |
| 2005/0198086 A1 | 9/2005 | Moore |
| 2005/0198125 A1 | 9/2005 | Beck et al. |
| 2005/0198247 A1 | 9/2005 | Perry et al. |
| 2005/0223063 A1 | 10/2005 | Chang et al. |
| 2005/0223320 A1 | 10/2005 | Brintzenhofe et al. |
| 2005/0234890 A1 | 10/2005 | Enzler et al. |
| 2005/0246304 A1 | 11/2005 | Knight et al. |
| 2005/0257148 A1 | 11/2005 | Goodman et al. |
| 2005/0262112 A1 | 11/2005 | Moore |
| 2005/0268217 A1 | 12/2005 | Garrison |
| 2005/0268222 A1 | 12/2005 | Cheng |
| 2006/0010386 A1 | 1/2006 | Khan |
| 2006/0020586 A1 | 1/2006 | Prompt et al. |
| 2006/0026500 A1 | 2/2006 | Hood |
| 2006/0026534 A1 | 2/2006 | Ruthfield et al. |
| 2006/0031757 A9 | 2/2006 | Vincent |
| 2006/0036995 A1 | 2/2006 | Chickles et al. |
| 2006/0041838 A1 | 2/2006 | Khan |
| 2006/0059107 A1* | 3/2006 | Elmore et al. .................. 705/64 |
| 2006/0059434 A1 | 3/2006 | Boss et al. |
| 2006/0069605 A1 | 3/2006 | Hatoun |
| 2006/0069985 A1 | 3/2006 | Friedman et al. |
| 2006/0075245 A1 | 4/2006 | Meier |
| 2006/0080657 A1 | 4/2006 | Goodman |
| 2006/0085409 A1 | 4/2006 | Rys et al. |
| 2006/0101037 A1 | 5/2006 | Brill et al. |
| 2006/0101051 A1 | 5/2006 | Carr et al. |
| 2006/0107206 A1 | 5/2006 | Koskimies |
| 2006/0129583 A1 | 6/2006 | Catorcini et al. |
| 2006/0129978 A1 | 6/2006 | Abrari et al. |
| 2006/0136422 A1 | 6/2006 | Matveief et al. |
| 2006/0143220 A1 | 6/2006 | Spencer |
| 2006/0161559 A1 | 7/2006 | Bordawekar et al. |
| 2006/0161837 A1 | 7/2006 | Kelkar et al. |
| 2006/0173865 A1 | 8/2006 | Fong |
| 2006/0184393 A1 | 8/2006 | Ewin et al. |
| 2006/0195413 A1 | 8/2006 | Davis et al. |
| 2006/0200754 A1 | 9/2006 | Kablesh et al. |
| 2006/0230363 A1 | 10/2006 | Rapp |
| 2006/0248468 A1 | 11/2006 | Constantine et al. |
| 2007/0005611 A1 | 1/2007 | Takasugi et al. |
| 2007/0036433 A1 | 2/2007 | Teutsch |
| 2007/0050719 A1 | 3/2007 | Lui et al. |
| 2007/0061467 A1 | 3/2007 | Essey |
| 2007/0061706 A1 | 3/2007 | Cupala |
| 2007/0074106 A1 | 3/2007 | Ardeleanu |
| 2007/0088554 A1 | 4/2007 | Harb et al. |
| 2007/0094589 A1 | 4/2007 | Paoli |
| 2007/0100877 A1 | 5/2007 | Paoli |
| 2007/0101280 A1 | 5/2007 | Paoli |
| 2007/0118538 A1 | 5/2007 | Ahern et al. |
| 2007/0118803 A1 | 5/2007 | Walker et al. |
| 2007/0130500 A1 | 6/2007 | Rivers-Moore et al. |
| 2007/0130504 A1 | 6/2007 | Betancourt et al. |
| 2007/0186157 A1 | 8/2007 | Walker et al. |
| 2007/0208606 A1 | 9/2007 | MacKay et al. |

| | | | |
|---|---|---|---|
| 2007/0208769 | A1 | 9/2007 | Boehm et al. |
| 2007/0276768 | A1 | 11/2007 | Pallante |
| 2008/0021916 | A1 | 1/2008 | Schnelle et al. |
| 2008/0028340 | A1 | 1/2008 | Davis |
| 2008/0052287 | A1 | 2/2008 | Stanciu |
| 2008/0126402 | A1 | 5/2008 | Sitchi et al. |
| 2008/0134162 | A1 | 6/2008 | James |
| 2009/0070411 | A1 | 3/2009 | Chang et al. |
| 2009/0119580 | A1 | 5/2009 | Rohrabaugh et al. |
| 2009/0138389 | A1 | 5/2009 | Barthel |
| 2009/0177961 | A1 | 7/2009 | Fortini |
| 2010/0125778 | A1 | 5/2010 | Kelkar et al. |

FOREIGN PATENT DOCUMENTS

| | | |
|---|---|---|
| EP | 0841615 | 5/1998 |
| EP | 0 961 197 | 12/1999 |
| EP | 0961197 | 12/1999 |
| EP | 1 076 290 A2 | 2/2001 |
| EP | 1076290 | 2/2001 |
| EP | 1221661 | 7/2002 |
| JP | 63085960 | 4/1988 |
| JP | 401173140 | 7/1989 |
| JP | 3191429 | 8/1991 |
| JP | 4225466 | 8/1992 |
| JP | 3191429 | 2/1993 |
| JP | 5314152 | 11/1993 |
| JP | 406014105 | 1/1994 |
| JP | 6139241 | 5/1994 |
| JP | 6180697 | 6/1994 |
| JP | 6180698 | 6/1994 |
| JP | 10171662 | 6/1998 |
| JP | 10207805 | 8/1998 |
| JP | 2000132436 | 5/2000 |
| JP | 2002183652 | 6/2002 |
| JP | 2003173288 | 6/2003 |
| WO | WO 99/24945 | 5/1999 |
| WO | WO-9924945 | 5/1999 |
| WO | WO99/56207 | 11/1999 |
| WO | WO-9956207 | 11/1999 |
| WO | WO 01/44934 A1 | 6/2001 |
| WO | WO-0144934 | 6/2001 |
| WO | WO0157720 | 8/2001 |
| WO | WO0157720 | 9/2006 |

OTHER PUBLICATIONS

Cover, XML Forms Architecture, retrieved at <<http://xml.coverpages.org/xfa.html>> on Aug. 17, 2006, Coverpages, Jun. 16, 1999.
Raggett, "HTML Tables", retrieved on Aug. 6, 2006, at <<http:www://is-edu.hcmuns.edu.vn/WebLib/books/Web/Tel/htm13-tables.html>>, W3C Internet Draft, Jul. 7, 1995, pp. 1-12.
Altova, Inc., "XML Spy 4.0 Manual," Altova Inc. & Altova GmbH, coyright 1998-2001, Chapters 1, 2, and 6, encompassing pp. 1-17, 18-90, and 343-362.
Cybook, Inc.: "Copying the Search Form to Services-based Web Sites" INternet Article, (online) Jul. 26, 2004.
Excel Developer Tip (hereinafter "Excel"), "Determining the Data Type of a Cell", May 13,1998, p. 1 (available at http://jwalk.com/ss//excel/tips/tip62.htm).
Macromedia, Inc.: "Dreamweaver Technote, Changes in copying and pasting in Dreamweaver 4" Internet Article (online).
Atova, "User Reference manual Version 4.4, XML Spy suite 4.4," Atova Ges.m.b.H & Alloys, Inc., May 24, 2002, pages cover, copyright p. 1-565.
Altova et al. XML Spy, XML Integrated Development Environments, Altova Inc., 2002, pp. 1-18.
Ben-Natan, U.S. Appl. No. 60/203,081, filed May 9, 2000, entitled "Internet platform for creating and supporting communities".
Ixia Soft, "Steamlining content creation, retrieval, and publishing on the Web using TEXTML Server and SML Spy 4 Suite in an integrated, Web publishing environment," (Partner's Whitepaper, published on the Web as of Jun. 6, 2002, downlowad pp. 1-16.
Kutay, U.S. Appl. No. 60/209,713, filed Jun. 5, 2000, entitled, "Methods and systems for accessing, organizing presenting and viewing data".

Microsoft Word 2000 (see Screen Shot "About Microsoft Word") Published 1983-1999 end Microsoft Excel 2000 (see Screen Shot "About Microsoft Excel") Published 1988-1999, Three pages.
Moore, U.S. Appl. No. 60/191,662, filed Mar. 23, 2000, entitled "Collection-based presistent digital archives" .
IBM: Stack Algorithm for Extractin Subtree from Serialized Tree, Mar. 1, 1994, TDB-ACC-NONN94033, 3 pages.
Laura Acklen & Read Gilgen, "Using Corel Wordperfect 9", 251-284, 424-434, 583-586 (1998).
Bruce Halberg et al, "Using Microsoft Excel 97", Published 1997, Bestseller Edition, Pertinent pp. 1-9, 18-25, 85-89, 98-101, 106-113, 124-127, 144-147, 190-201, 209-210, 218-227, 581-590, 632-633, 650-655, 712-714.
Leblond et al, "PC Magazine Guide to Quattro Pro for Windows", pp. 9-11, 42-61, Ziff-Davis Press, Copyright 1993 by the LeBlond Group.
Mansfield, "Excel 97 for Busy People", Published by Osborne/Mcgraw-Hill 1997 pp. 48-50.
"Microsoft Visual Basic 5.0 Programmer's Guide 1997"; pp. 578-579; Redmond WA 98052-6399.
Han et al., WebSplitter: A Unified XML Framework for Multi-Device Collaborative Web Browsing, 2000, ACM Conference on Cimputer Supported Cooperative Work, 10 pages.
OMG XML Metadata Interchange (XMI) Specification Version 1.2 Jan. 2002.
U.S. Appl. No. 60/191,662, Kutay et al.
U.S. Appl. No. 60/203,081, Ben-Natan et al.
"Store and Organize Related Project Files in a Binder," Getting Results with Microsoft Office, 1990, pp. 109-112.
Barker et al., "Creating In-Line Objects Within an Integrated Editing Environment," IBM Technical Disclosure Bulletin, vol. 27, No. 5, Oct. 1984, p. 2962.
Berg A., "Naming and Binding: Monikers" Inside OLE, 1995, Chapter 9, pp. 431-490.
Clapp D., "The NeXT Application Kit Part I: Non-Responsive Classes," The NeXT Bible 1990, Chapter 16, pp. 275-293.
DiLascia et al., "Sweeper" Microsoft Interactive Developer, vol. 1, No. 1, 1996, 27 pages.
Herzner et al., "CDAM—Compound Document Access and Management. An Object-Oriented Approach" Multimedia Systems Interaction and Applications, 1992, Chapter 3, pp. 17-36.
Kobayashi et al., "An Update on BTRON-specification OS Development" IEEE 1991 pp. 132-140.
Peterson B. , "Unix Variants," Unix Review, vol. 10, No. 4, Apr. 1992, pp. 29-31.
Pike et al., "Plan 9 from Bell Labs" UKUUG, Summer 1990, 10 pages.
Pike et al., "The Use of Name Spaces in Plan 9," Operating Systems Review vol. 27, No. 2, Apr. 1993, pp. 72-76.
Staneck W., "Internal and External Media" Electronic Publishing Unleashed, 1995, Chapter 22, pp. 510-542.
Zdonik S., "Object Management System Concepts," ACM, 1984, pp. 13-19.
Trupin J., "The Visual Programmer," Microsoft Systems Journal, Apr. 1996, pp. 103-105.
"Architecture for a Dynamic Information Area Control" IBM Technical Disclosure Bulletin IBM Corp. New York US vol. 37 No. 10 Jan. 10, 1994. pp. 245-246.
Alschuler, Liora, "A tour of Xmetal" O'Reilly XML.COM 'Online Jul. 14, 1999 XP002230081 retrieved from the Internet: <URL:http://www.xml.com/pub/a/SeyboldReport/ip00311025.html> retrieved on Feb. 5, 2003.
Au, Irene et al., "Netscape Communicator's Collapsible Toolbars" CHI'98 Human Factors in Computing Systems Conference Proceedings Los Angeles CA Apr. 18-23, 1998 pp. 81-86.
Battle, Steven A. et al., "Flexible Information Presentation with XML" 1998, The Institution of Electrical Engineers, 6 pages.
Brogden, William, "Arbortext Adept 8 Editor Review" O'Reilly XML.COM 'Online! Sep. 22, 1999 XP002230080 retrieved from the Internet <URL:http://www.xml.com/pub/a/1999/09/adept/AdeptRvw.htm> retrieved on Feb. 5, 2003.

Ciancarini, Paolo et al., "Managing Complex Documents Over the WWW: A Case Study for XML" IEEE Transactions on Knowledge and Data Engineering vo.l. 11 No. 4 Jul./Aug. 1999, pp. 629-938.

Davidow, Ari, "XML Editors: Allegations of Functionality in search of reality," INTERNET 'Online! 1999 XP002230082 retrieved from the Internet <URL:http://www.ivritype.com/xml/>.

Kanemoto, Hirotaka et al., "An Efficiently Updatable Index Scheme for Structured Documents" 1998 IEEE, pp. 991-996.

Netscape Communication Corp., "Netscape Communicator 4.61 for OS/2 Warp" Software 1999 The whole software release & "Netscape—Version 4.6 [en]-010615" NETSCAPE SCREENHOT Oct. 2, 2002.

Sutanthavibul, Supoj et al., "XFIG Version 3.2 Patchlevel 2 (Jul. 2, 1998) Users Manual (Edition 1.0)" Internet Document [Online] Jul. 2, 1998 XP002229137 Retrieved from the Internet <URL:http://www.ice.mtu.edu/online_docs/xfig332/> retrieved Jan. 28, 2003.

Usdin, Tommie et al., "XML: Not a Silver Bullet But a Great Pipe Wrench" Standardview vol. 6. No. 3, Sep. 1998, pp. 125-132.

Hwang et al., "Micro-Firewalls for Dynamic Network Security with Distributed Intrusion Detection"; IEEE INternational Symposium on Network Computing and Applications; 2001; pp. 68-79.

Kaiya et al., "Specifying Runtime Environments and Functionalities of Downloadable Components Under the Sandbox Mode"; International Symposium on Principles of Software Evolution; 2000; pp. 138-142.

Prevelakis et al., "Sandboxing Applications"; Proceedings of the FREENIX Track; 2001; pp. 119-126.

Schmid et al., "Protection Data from Malicious Software"; 18th Annual Computer Security Applications Conference; 2002; pp. 199-208.

Tomimori et al., "An Efficient and Flexible Access Control Framework for Java Programs in Mobile Terminals"; 22nd International Conference on Distributed Computing Systems Workshops; 2002; pp. 777-782.

Whitehill, "Whitehill Composer" Whitehill Technologies Inc. 2 pages.

Clarke, P., "From small beginnings," Knowledge Management, Nov. 2001, pp. 28-30.

Description of Whitehill Composer software product, produced by Whitehill Technologies, Inc., available at <http://www.xml.com/pub/p/221>, accessed on Apr. 8, 2004, two pages.

Sun, Q., et al., "A Robust and Secure Media Signature Scheme for JPEG Images," Proceedings of 2002 IEEE Workshop on Multimedia Signal Processing, Dec. 2002, pp. 296-299.

Komatsu, N., et al., "A Proposal on Digital Watermark in Document Image Communication and Its Application to Realizing a Signature," Electronics and Communications in Japan, Part I: Communications, vol. 73, No. 5, May 1990, pp. 22-33.

Noore, A., "A Secure Conditional Access System using Digital Signature and Encryption," International Conference on Consumer Electronics, Jun. 2003, pp. 220-221.

Pacheco, X., et al., "Delphi 5 Developer's Guide," Sams Publishing 1999, Section: Data Streaming, 6 pages.

Clark, James, Ed.; "XSL Transformation (XSLT) Version 1.0", Nov. 16, 1999, W3C (MIT, INRIA, Keio), pp. 1-156.

Clark, James and Steve Derose, "XML Path Language (XPath) Version 1.0", Nov. 16, 1999, W3C (MIT, INRIA, Keio), pp. 1-49.

Musgrave, S., "Networking technology—impact and opportunities", Survey and Statistical Computing 1996. Proceedings of the Second ASC International Conference. Sep. 1996. pp. 369-378. London, UK.

Rapaport, L., "Get more from SharePoint", Transform Magazine, vol. 11, No. 3, Mar. 2002, pp. 13, 15.

Mccright, J.S., "New Tool Kit to Link Groove with Microsoft SharePoint", eWeek, Enterprise News & Reviews, Ziff Davis Media Inc., Jul. 29, 2002, 1 page.

U.S. Appl. No. 60/209,713, filed Jun. 5, 2000.

Richard Scott Hall, "Agent-based Software Configuration and Deployment," Thesis of the University of Colorado, Online, Dec. 31, 1999, retrieved from the Internet on Nov. 7, 2003: <http://www.cs.colorado.edu/users/rickhall/documents/ThesisFinal.pdf>, 169 pages.

Arthur Van Hoff et al., "The Open Software Description Format," Online, Aug. 13, 1997, retrieved from the Internet on Nov. 7, 2003: <http://www.w3.org/TR/NOTE-OSD>, 11 pages.

Netscape Communications Corp., "SmartUpdate Developer's Guide," Online, Mar. 11, 1999, retrieved from the Internet on Dec. 8, 2000: <http://developer.netscape.com:80/docs/manuals/communicator/jarman/index.htm>, 83 pages.

Linnea Dayton and Jack Davis, "Photo Shop 5/5.5 WOW! Book," 2000, Peachpit Press, pp. 8-17.

Sara Williams and Charlie Kindel, "The Component Object Model: A Technical Overview," Oct. 1994, Microsoft Corp., pp. 1-14.

Varlamis et al., "Bridging XML-Schema and relational databases. A system for generating and manipulating relational databases using valid XML documents," DocEng '01, Nov. 9-10, 2001, Copyright 2001, ACM 1-58113-432-0/01/0011, pp. 105-114.

Hardy et al., "Mapping and Displaying Structural Transformations between XML and PDF," DocEng '02, Nov. 8-9, 2002, Copyright 2002, ACM 1-58113-594-7/02/0011, pp. 95-102.

Kim et al., "Immediate and Partial Validation Mechanism for the Conflict Resolution of Update in XML Databases," WAIM 2002, LNCS 2419, 2002, pp. 387-396, Springer-Verlag Berlin Heidelberg 2002.

Chuang, T., "Generic Validation of Structural Content with Parametric Modules," ICFP '01, Sep. 3-5, 2001, Copyright 2001, ACM 1-58113-415-0/01/0009, pp. 98-109.

Chen et al., "Designing Valid XML Views," ER 2002, LNCS 2503, 2002, Springer-Verlag Berlin Heidelberg 2002, pp. 463-477.

Chen et al., "XKvalidator. A Constraint Validator for XML," CIKM '02, Nov. 4-9, 2002, Copyright ACM 1-58113-492-4/02/0011, pp. 446-452.

W. Brogden, "Arbortext Adept 8 Editor Review," O'Reilly XML.COM, 'Online! Sep. 22, 1999) XP002230080, retrieved from the Internet <URL:http://www.xml.com/pub/a/1999/09/adept/AdeptRvw.htm>, retrieved on Feb. 5, 2003.

L Alschuler, "A tour of XMetal" O'Reilly XML.COM, 'Online! Jul. 14, 1999, XP002230081, retrieved from the Internet: <URL:http://www.xml.com/pub/a/SeyboldReport/ip031102.html>, retrieved on Feb. 5, 2003.

A. Davidow, "XML Editors: Allegations of Functionality in search of reality," Internet, 'Online! 1999, XP002230082, retrieved from the Internet, <URL:http://www.ivritype.com/xml/>.

Steven A. Battle, et al., "Flexible Information Presentation with XML", 1998, The Institution of Electrical Engineers, 6 pages.

Paolo Ciancarini, et al., "Managing Complex Documents Over the WWW: A Case Study for XML", IEEE Transactions on Knowledge and Data Engineering, vol. 11, No. 4, Jul./Aug. 1999, pp. 629-638.

Hirotaka Kanemoto, et al., "An Efficiently Updatable Index Scheme for Structured Documents", 1998 IEEE, pp. 991-996.

Tommie Usdin, et al., "XML: Not a Silver Bullet, But a Great Pipe Wrench", Standardview vol. 6, No. 3, Sep. 1998, pp. 125-132.

Supoj Sutanthavibul, et al., "XFIG Version 3.2 Patchlevel 2(Jul. 2, 1998) Users Manual (Edition 1.0)", Internet Document, [Online] Jul. 2, 1998, XP002229137 Retrieved from the Internet: <URL:http://www.ice.mtu.edu/online_docs/xfig332/> [retrieved on Jan. 28, 2003].

"Architecture for a Dynamic Information Area Control", IBM Technical Disclosure Bulletin, IBM Corp. New York, US, vol. 37, No. 10, Jan. 10, 1994, pp. 245-246.

Irene Au & Shuang Li, "Netscape Communicator's Collapsible Toolbars," CHI '98, Human Factors in Computing Systems, Conference Proceedings, Los Angeles, CA, Apr. 18-23,1998, pp. 81-86.

Netscape Communication Corporation: "Netscape Communicator 4.61 for OS/2 Warp" Software, 1999, The whole software release & "Netscape—Version 4.61 [en]—010615" Netscape Screenshot, Oct. 2, 2002.

Rogge et al., "Validating MPEG-21 Encapsulated Functional Metadata," IEEE 2002, pp. 209-212.

Nelson, "Validation with MSXML and XML Schema," Windows Developer Magazine, Jan. 2002. pp. 35-38.

Chien et al., "XML Document Versioning," SIGMOD Record, vol. 30, No. 3, Sep. 2001, pp. 46-53.

Wong et al., "Managing and Querying Multi-Version XML Data with Update Logging," DocEng '02, Nov. 8-9, 2002, Copyright 2002, ACM 1-58113-594-7/02/0011, pp. 74-81.

Chien et al., "Efficient schemes for managing multiversionXML documents", VLDB Journal (2002), pp. 332-353.

Chien et al., "Efficient Management of Multiversion Documents by Object Referencing," Proceedings of the 27th VLDB Conference, 2001, pp. 291-300.

Chien et al., "Storing and Querying Multiversion XML Documents using Durable Node Numbers," IEEE 2002, pp. 232-241.

Dyck, T., "XML Spy Tops as XML Editor," http://www.eweek.com/article2/0,3959,724041,00.asp, Nov. 25, 2002, 2 pages.

"Netscape window" Netscape Screenshot, Oct. 2, 2002.

Jan-Henrick Haukeland: "Tsbiff—tildeslash biff—version 1.2.1" Internet Document, [Online] Jun. 1999, URL:http://web.archive.org/web/19990912001527/http://www.tildeslash.com/tsbiff/.

Baraband et al., PowerForms: "Declarative Client Site Form Field Validation", World Wide Web, Baltzer Science Publishers, Bussum, NL. vol. 3, No. 4, Dec. 2000, p. 1-20.

Microsoft Corporation, "Microsoft Computer Dictionary" Microsoft Press, Fifth Edition, p. 149.

"Webopedla Computer Dictionary" retrieved on May 9, 2006, at <<http://www.pewebopedia.com/TERM/O/OLE.html>>, Jupitermedia Corporation, 2006, pp. 7.

"Enter Key", Retrieved from the Internet at http://systems.webopedia.com/TERM/Enter_key.html on Dec. 20, 2006.

"Microsoft Visual Basic 5.0 Programmer's Guide", *Microsoft Press*, (1997), pp. 42-43, 54-58.

"Microsoft Word 2000", Screenshots,(1999),1-5.

Adams, Susie, et al., "BizTalk Unleashed", Sams publishing, 2002, first printing Mar. 2001, 1-2, 31-138.

Anat, Eyal, et al., "Integrating and Customizing Hererogeneous E-Commerce Applications", The VLDB Journal—The International Journal on Very Large Data Bases, vol. 10, Issue 1,(Aug. 2001),16-38.

Beauchemin, Dave, "Using InfoPath to Create Smart Forms", Retrieved from the Internet at http:/www.microsoft.com/office/infopath/prodinfo/using.mspx on Jan. 21, 2007,(Mar. 27, 2003).

Begun, Andrew, et al., "Support and Troubleshooting for XML Schemas in InfoPath 2003", *Microsoft Office InfoPath 2003 Technical Articles*, Retrieved from the Internet at http://msdn2.microsoft.com/en-us/library/aa168241(office.11,d=printer).aspx on Jan. 21, 2007,(Aug. 2004).

Borland, Russo, "Running Microsoft Word 97", 314-315, 338, 361-362, 390, and 714-719.

Dubinko, Micah, "XForms and Microsoft InfoPath", Retrieved from the Internet at http://www.xml.com/lpt/a/1311 on Jan. 21, 2007,(Oct. 29, 2003).

Halberg, Bruce, et al., "Using Microsoft Excel 97", (1997),191-201, 213-219.

Hoffman, Michael, "Architecture of Microsoft Office InfoPath 2003", *Microsoft Office InfoPath 2003 Technical Articles*, Retrieved from the Internet at http://msdn2.microsoft.com/en-us/library/aa219024(office.11,d=printer).aspx on Jan. 21, 2007,(Jun. 2003).

Lehtonen, Miro, et al., "A Dynamic User Interface for Document Assembly", Department of Computer Science, University of Helsinki,(Nov. 2002).

Nelson, Joe, "Client-side Form Validation Using JavaScript" *Developer Advisory*, (Sep. 21, 2001).

Raman, T. V., et al., "XForms 1.0", (Dec. 2001),Section 1-12.2.3 & Appendices A-G.

Rees, Michael J., "Evolving the Browser Towards a Standard User Interface Architecture", School of Information Technology, Bond University, Australia,(2001).

Singh, Darshan, "Microsoft InfoPath 2003 by Example", Retrieved from the Internet at http://www.perfectxml.com/InfoPath.asp on Jan. 21, 2007,(Apr. 20, 2003).

Udell, Jon, "InfoPath and XForms", Retrieved from the Internet at http://weblog.infoworld.com/udell/2003/02/26.html,(Feb. 26, 2003).

Vasters, Clemens F., "BizTalk Server 2000 A Beginner's Guide", Osborne/McGraw-Hill,(2001),1-2, 359-402.

Villard, et al., "An Incremental XSLT Transformation Processor for XML Document Manipulation", http://www2002.org/CDROM/refereed/321, printed on May 18, 2007,(May 2002),25 pages.

"Microsoft Word 2000 Screenshots", (2000),11-17.

XMLSPY, "XmlSpy 2004 Enterprise Edition Manual", Altova,(May 17, 2004),1-25, 220-225.

Stylusstudio, "StylusStudio: XPath Tools", 2004-2007, StylusStudio,1-14.

Dodds, "Toward an XPath API", xml.com,(May 7, 2001),1-3.

Altova, "Altova Tools for XPath 1.0/2.0", Altova,1-12.

"Microsoft Word 2000 Screenshots", Word,(2000),1-17.

Grosso, et al., "XML Fragment Interchange", W3C,(Feb. 2001),1-28.

Altova, et al., "User and Reference Manual Version 4.4", www.xmlspy.com,(May 24, 2007),1-565.

"XForm 1.0", W3C,(Jul. 16, 2001).

Bradley, Neil "The XML Companion, Third Edition", *Published by Addison Wesley Professional*, http://proquest.safaribooksonline.com0201770598, http,(Dec. 12, 2001),1-18.

Klarlund, Nils "DSD: A Schema Language for XML", *ACM, FSMP* Portland Oregon, (2000),101-111.

Watt, Andrew "Microsoft Office Infopath 2003 Kick Start", (*Published by Sams*) Print ISBN-10:0-672-32623-X, (Mar. 24, 2004),1-57.

Hu, et al., "A Programmable Editor for Developing Structured Documents based on Bidirectional Transformations", ACM,(Aug. 2004),178-179.

Kay, Michael "XSL Transfornmations (XSLT) Version 2.0", http://www.w3.org/TR/2005/WD-xslt20-20050404, (04/205),1-374.

"Notice of Allowance", U.S. Appl. No. 10/404,312, (Jan. 12, 2009),12 pages.

"Final Office Action", U.S. Appl. No. 10/857,689, (Jan. 6, 2009),23 pages.

"Non Final Office Action", U.S. Appl. No. 10/977,198, (Feb. 2, 2009),15 pages.

"Non Final Office Action", U.S. Appl. No. 10/939,588, (Feb. 18, 2009),40 pages.

"Non Final Office Action", U.S. Appl. No. 10/976,451, (Feb. 23, 2009),39 pages.

"Non final Office Action", U.S. Appl. No. 11/234,767, (Feb. 26, 2009),37 pages.

"Notice of Allowance", U.S. Appl. No. 11/167,514, (Mar. 11, 2009),6 pages.

"Non Final Office Action", U.S. Appl. No. 10/942,528, (Mar. 6, 2009),31 pages.

"Non Final Offfice Action", U.S. Appl. No. 11/170,521, (Jan. 21, 2009),86 pages.

"Foreign Office Action", Application Serial No. 2,412,611, (Feb. 9, 2009),6 pages.

"Foreign Office Action", Application Serial No. 200610003709.2, (Jan. 9, 2009),8 pages.

Hall, Richard S., "Agent-based Software Configuration and Development", http://www.doc.ic.ac.uk/~alw/edu/theses/hall-phd-0599.pdf on Jun. 8, 2009, Thesis of the University of Colorado,(May 1, 1999), 182 pages.

"Notice of Allowance", U.S. Appl. No. 10/988,718, (Apr. 9, 2009).

"Final Office Action", U.S. Appl. No. 11/107,347, (Apr. 2, 2009),15 pages.

"Restriction Requirement", U.S. Appl. No. 11/227,550, (Apr. 2, 2009),8 pages.

"Non Final Office Action", U.S. Appl. No. 10/955,665, (Apr. 2, 2009),19 pages.

"Non Final Office Action", U.S. Appl. No. 10/988,720, (Apr. 2, 2009),19 pages.

"Final Office Action", U.S. Appl. No. 11/203,818, (Apr. 14, 2009),31 pages.

"Final Office Action", U.S. Appl. No. 11/226,044, (Apr. 20, 2009),24 pages.

"Final Office Action", U.S. Appl. No. 11/056,500, (Apr. 16, 2009),10 pages.

"Final Office Action", U.S. Appl. No. 11/203,937, (May 7, 2009),13 pages.

"Non Final Office Action", U.S. Appl. No. 10/955,666, (May 7, 2009),28 pages.
"Non Final Office Action", U.S. Appl. No. 10/876,433, (Apr. 24, 2009),62 pages.
"Non Final Office Action", U.S. Appl. No. 10/916,692, (Apr. 30, 2009),14 pages.
"HP Blade Sever BH Series Operating System Guide", Hewlett-Packard,(Jul. 2002).
"Non Final Office Action", U.S. Appl. No. 09/599,809, (May 13, 2009).
"Non Final Office Action", U.S. Appl. No. 11/295,178.
"Non Final Office Action", U.S. Appl. No. 10/990,152.
"Final Office Action", U.S. Appl. No. 11/036,910, (Jun. 1, 2009),15 pages.
Acklen, et al., "Using Corel Wordperfect 9", Que Corporation,,(1998),pp. 251-284, 424-434, 583-585.
"Non Final Office Action", U.S. Appl. No. 10/857,689, (Jun. 11, 2009),25 pages.
"Non Final Office Action", U.S. Appl. No. 11/095,254, (Jun. 8, 2009),21 pages.
"Final Office Action", U.S. Appl. No. 11/234,767, (Jun. 10, 2009),24 pages.
"Foreign Office Action", Application Serial No. 2002-503702, Final Notice of Rejection,(Jun. 5, 2009),212 pages.
Kaori, Iwantani et al., "Perfect Manual of Clarisworks 4.0 for Macintosh", 1st Edition, Japan,(Jul. 22, 1997),pp. 153-167.
Noriko, Matsushita "Step-up Training of Clarisworks (tabulation), Successful Use of Spreadsheet and Tabulation", Mac People, vol. 4, No. 19,(Oct. 1, 1998),pp. 138-139.
Akihiro, Senda "Word 2000, Conservative- Looking but 'Attentive' New Function", Nikkei PC 21, vol. 4, No. 8,(Aug. 1, 1999),pp. 115-116.
Yasuji, Fukuhara "Clarisworks, Introduction to Business Document Construction, No. 4, Estimate", Nikkei Mac, No. 14,(May 17, 1994),pp. 197-204.
"Final Office Action", U.S. Appl. No. 10/976,451 (Jul. 2, 2009), 22 pages.
Reagan, Moore W., et al., "Collection-based persistent digital archives", U.S. Appl. No. 60/191,662, filed Mar. 23, 2000, 133 pages.
"Notice of Allowance", U.S. Appl. No. 11/203,937, (Aug. 31, 2009),2 pages.
"Non-Final Office Action", U.S. Appl. No. 11/227,550, (Aug. 3, 2009),10 pages.
"Notice of Allowance", U.S. Appl. No. 11/203,937, (Aug. 3, 2009),7 pages.
"Non-Final Office Action", U.S. Appl. No. 11/234,767, (Aug. 12, 2009),24 Pages.
"Final Office Action", U.S. Appl. No. 10/977,198, (Aug. 19, 2009),15 pages.
"Non-Final Office Action", U.S. Appl. No. 10/939,588, (Aug. 27, 2009),28 pages.
"Final Office Action", U.S. Appl. No. 11/170,521, (Sep. 8, 2009),12 pages.
"Notice of Allowance", U.S. Appl. No. 11/203,937, Supplemental,(Sep. 15, 2009),2 pages.
"Final Office Action", U.S. Appl. No. 10/942,528, (Sep. 17, 2009),27 pages.
"Non-Final Office Action", U.S. Appl. No. 11/107,347, (Sep. 17, 2009),9 pages.
"Notice of Allowance", U.S. Appl. No. 10/988,720, (Sep. 17, 2009),18 pages.
"Foreign Office Action", Application Serial No. 200610051554.X, (Jul. 10, 2009),11 pages.
"Notice of Allowance", U.S. Appl. No. 11/056,500, (Dec. 2, 2009),17 pages.
"Non-Final Office Action", U.S. Appl. No. 11/170,521, (Dec. 17, 2009),11 pages.
"Notice of Allowance", U.S. Appl. No. 10/990,152, (Dec. 21, 2009),6 pages.
Honkala, Mikko et al., "Multimodal Interaction with XForms", ICWE '06, (2006),pp. 201-208.
"Final Office Action", U.S. Appl. No. 11/295,178, (Dec. 24, 2009),38 pages.
"Non-Final Office Action", U.S. Appl. No. 12/021,894, (Dec. 31, 2009),10 pages.
"Non-Final Office Action", U.S. Appl. No. 11/218,149, (Jan. 14, 2010),15 Pages.
"Notice of Allowance", U.S. Appl. No. 10/955,665, (Dec. 30, 2009),2 pages.
"Foreign Office Action", Application Serial No. 200610051544.X, (Dec. 4, 2009),9 pages.
"Final Office Action", U.S. Appl. No. 11/227,550, (Jan. 19, 2010),12 pages.
Chien, Shu-Yao et al., "Efficient Schemes for Managing Multiversion XML Documents", *The VLDB Journal 2002*, (Dec. 19, 2002),pp. 332-353.
Han, Richard et al., "Websplitter: A Unified XML Framework for Multi-Device Collaborative Web Browsing", *ACM Conference on Computer Supported Cooperative Work*, (2000), 10 pages.
"Excel Developer Tip: Determining the Data Type of a Cell", Retrieved from <http://jwalk.com/ss/excel/tips/tip62.htm>, (May 13, 1998), 1 page.
Hardy, Matthew R., et al., "Mapping and Displaying Structural Transformations between XML and PDF", *Proceedings of the 2002 ACM symposium on Document engineering*, (Nov. 8-9, 2002),pp. 95-102.
Pacheco, Xavier et al., "Delphi 5 Developers Guide", *Chapter 31, Section: Data Streaming*, Sams Publishing.,(1999),4 pages.
Dyck, Timothy "XML Spy Tops as XML Editor", *eWeek*, vol. 19, No. 47 ,, (Nov. 25, 2002),3 pages.
"XML Forms Architecture (XFA)", Retrieved from http://xml.coverpages.org/xfa.html on Aug. 17, 2006, Cover Pages Technology Reports,,(Jun. 16, 1999),p. 1.
Raggett, "HTML Tables", Retrieved from: <http:www.//is-edu.homuns.edu.vn/WebLib/books/Web/Tel/html3-tables.html> on Aug. 6, 2006, W3C Internet Draft,(Jul. 7, 1995),pp. 1-12.
"Streamlining Content Creation", Ixia Soft,Jun. 6, 2002,pp. 1-16.
"SmartUpdate Developer's Guide", Retrieved from http://developer.netscape.com:80/docs/manuals/communicatior/jarman/index.htm on Dec. 8, 2000, Netscape Communications Corp,(Mar. 11, 1999),83 pages.
Hwang, Kai et al., "Micro-Firewalls for Dynamic Network Security with Distributed Intrusion Detection", *IEEE International Symposium on Network Computing and Applications 2001*, (2001),pp. 68-79.
Schmid, Mathew et al., "Protecting Data from Malicious Software", *18th Annual Security Applications Conference*, (2002),pp. 199-208.
Kaiya, Haruniko et al., "Specifying Runtime Environments and Functionalities of Downloadable Components under the Sandbox Model", *International Symposium on Principles of Software Evolution 2000*, (2000),pp. 138-142.
Tomimori, Hiroyuki et al., "An Efficient and Flexible Access Control Framework for Java Programs in Mobile Terminals", Proceeding of 22nd Int'l Conference on Distributed Computing Systems Workshops,(2002),pp. 777-782.
Rapaport, Lowell "Get More From SharePoint", *Transform Magazine*, vol. 11, No. 3, (Mar. 2002),2 pages.
"Whitehill Composer Software product", Retrieved from www.xml.com/pub/p/221 on Apr. 8, 2004, Whitehill Technologies, Inc.,(Apr. 8, 2004),2 pages.
McCright, John S., "New Tool Kit to Link Groove with Microsoft SharePoint", Retrieved from: <http://www.eweek.com/c/a/Enterprise-Applications/New-Tool-Kit-to-Link-Groove-With-Microsoft-SharePoint/>on Dec. 28, 2009, (Jul. 29, 2002),3 pages.
"Copying the Search Form to Custom Pages in Windows SharePoint Services-based Web Sites", Retrieved from <www.sharepointcustomization.com/resources/tipstricks/04wss-searchbox-tip.htm>on Feb. 11, 2009, Microsoft Corp,(2003),1 page.
Rado, Dave "How to create a template that makes it easy for users to 'fill in the blanks' without doing any programming,", Retrieved from http://word.mvps.org/FAQs/Customization/FillinTheBlanks.htm, (Apr. 2004),pp. 1-2.
Altova, et al., "XML Spy, XML Integrated Development Environments", Altova Inc.,(2002),pp. 1-18.

Halberg, et al., "Using Microsoft Excel 97", Que Corporation(1997),pp. 1-9, 18-25, 85-89, 98-101, 106-113, 124-127, 144-147, 190-201, 209-210, 213-227, 581-590, 632-633, 650-655, 712-714.

"Stack Algorithm for Extracting Subtree from Serialized Tree", *IBM Technical Disclosure Bulletin*, TDB-ACC-No. NN94033, (Mar. 1, 1994), 2 pages.

Leblond, et al., "PC Magazine Guide to Quattro Pro for Windows", Ziff-Davis Press,(1993),pp. 9-11, 42-61.

Mansfield, Ron "Excel 97 for Busy People", Osborne/McGraw-Hill,,(Jan. 27, 1997),pp. 48-50.

Pike, Rob et al., "Plan 9 From Bell Labs", AT&T Bell Laboratories, UKUUG, Summer 1990,(1990),10 pages.

Berg, A "Naming and Binding: Monikers", *Inside OLE, Chapter 9, Harmony Books*, (1995),pp. 431-490.

Herzner, Wolfgang et al., "CDAM—Compound Document Access and Management. An Object-Oriented Approach", *ACM SIGOIS Bulletin*, vol. 12 , Issue 1, MultiMedia Systems Interaction and Application, Chapter 3,,(Jul. 1991),18 pages.

Staneck, W "Internal and External Media", Electronic Publishing Unleashed, Chapter 22,,(1995),pp. 510-542.

Kobayashi, M. et al., "An Update on BTRON-specification OS Development", *Proceedings of the 8thTRON Project Symposium*, 1991, 0-8186-2475-2/91,(1991),pp. 132-140.

Dorward, Sean et al., "Unix Variants", *Unix Review*, vol. 10, No. 4, (Apr. 1992),pp. 29-31.

"Store and Organize Related Project Files in a Binder", Getting results with Microsoft Office,(1990),pp. 109-112.

Clapp, D "The NeXT Application Kit Part 1: Non-Responsive Classes", *The NeXT Bible Chapter 16*, (1990),pp. 275-293.

Dilascia, Paul et al., "Sweeper", *Microsoft interactive developer*, vol. 1., No. 1, (1996),pp. 16-52.

Barker, et al., "Creating In-Line Objects Within an Integrated Editing Environment", IBM Technical Disclosure Bulletin, vol. 27, No. 5,(Oct. 1984),p. 2962.

Pike, Rob et al., "The Use of Name Spaces in Plan 9", *Operating Systems Review*, vol. 27, No. 2, (Apr. 1993),pp. 72-76.

Trupin, J "The Visual Programmer", Microsoft Systems Journal,(Apr. 1996),pp. 103-105.

Zdonik, S "Object Management System Concepts", ACM,(1984),pp. 13-19.

"OMG XML Metadata Interchange (XMI) Specification", Retrieved from: <http://www.omg.org./cgi-bin/doc?formal/02-01-01.pdf>on Dec. 2, 2009, Version 1.2,(Jan. 2002),268 pages.

Clark, James "XSL Transformation (XSLT), Version 1.0", Retrieved from: <www.w3.org/TR/1999/REC-xslt19991116> on Oct. 26, 2009, WC3,(Nov. 16, 1999),57 pages.

Musgrave, S "Networking Technology—Impact and Opportunities", *Survey and Statistical Computing 1996, Proceedings of the Second ASC International Conference*, London, UK,, (Sep. 1996),pp. 369-378.

Clark, James et al., "XML Path Language (XPath)", Retrieved from: <www.w3.org/TR/1999/RCE-xpath-19991116> on Dec. 26, 2009, Version 1.0,(Nov. 16, 1999),37 pages.

Chien, Shu-Yao et al., "Storing and Querying Multiversion XML Documents using Durable Node Numbers", IEEE,(2002),pp. 232-241.

Clark, Peter "From Small Beginnings", *Knowledge Management*, (Nov. 2001),pp. 28-30.

Prevelakis, Vassilis et al., "Sandboxing Applications", *FREENIX Track: 2001 USENIX Annual Technical Conference*, (2001),pp. 119-126.

Sun, Q et al., "A Robust and Secure Media Signature Scheme for JPEG Images", Proceeding of 2002 IEEE Workshop on Multimedia Signal Processing,(Dec. 2002),pp. 296-299.

Komatsu, Naohisa et al., "A Proposal on Digital Watermark in Document Image Communication and Its Application to Realizing a Signature", *Electronics and Communication in Japan, Part I: Communications*, vol. 73, No. 5, (May 1990),pp. 22-33.

Noore, Afzel "A Secure Conditional Access System using Digital Signature and Encryption", *International Conference on Consumer Electronics*, (Jun. 2003),pp. 220-221.

Chien, Shu-Yoa et al., "XML Document Versioning", SIGMOD Record, vol. 30, No. 3,,(Sep. 2001),pp. 46-53.

Chien, et al., "Efficient Management of Multiversion Documents by Object Referencing", Proceedings of the 27th VLDB Conference,(2001),pp. 291-300.

Au, Irene et al., "Netscape Communicator's Collapsible Toolbars", CHI 98, Human Factors in Computing Systems, Conference Proceedings, LA, CA,(Apr. 18-23, 1998),pp. 81-86.

Wong, Raymond K., et al., "Managing and Querying Multi-Version XML Data with Update Logging", *DocEng '02*, (Nov. 8-9, 2002),8 pages.

Usdin, Tommie et al., "XML: Not a Silver Bullet, But a Great Pipe Wrench", *Standard View* vol. 6, No. 3, (Sep. 2, 1998),pp. 125-132.

Sutanthavibul, Supoj et al., "XFIG Version 3.2 Patchlevel 2 (Jul. 2, 1998) Users Manual (Edition 1.0)", Retrieved from: <www.ice.mtu.edu/online_docs/sfig332/> on Jan. 28, 2003, Internet Document XP002229137,(Jul. 2, 1998),60 pages.

"Netscape Communicator 4.61 for OS/2 Warp", Netscape Communication Corporation, Software 1999, The Whole software release & Netscape—Version 4.61 {en}—010615, Netscape Screenshot,(Oct. 2, 2002),1 page.

"Architecture for a Dynamic Information Area Control", IBM Technical Disclosure Bulletin, IBM Corp, NY, US vol. 37, No. 10, Jan. 10, 1994,, pp. 245-246.

Alschuler, Liora "A Tour of XMetal", Retrieved from: <http://www.xml.com/pub/a/Seybold/Report/ip031102.html> on Feb. 5, 2003, XML.com, Online! XPOO2230081,(Jul. 14, 1999),3 pages.

Davidow, Ari "XML Editors: Allegations of Functionality in Search of Reality", Retrieved from: <http://www.ivritype.com/xml/> on Feb. 9, 2009, SP002230082,(Oct. 12, 1999), 16 pages.

Battle, Steven A., et al., "Flexible Information Presentation with XML", *The Institution of Electrical Engineers*, (1998),6 pages.

Ciancarini, Paolo A., et al., "Managing Complex Documents Over the WWW: A Case Study for XML", *Transactions on Knowledge and Data Engineering*, vol. 11, No. 4, Available at <http://citeseerx.ist.psu.edu/viewdoc/download?doi=10.1.1.18.1679&rep=rep1&type=pdf>, (Apr. 1999),pp. 1-14.

Kanemoto, Hirotaka et al., "An Efficiently Updatable Index Scheme for Structured Documents", DEXA'98 (1998),pp. 991-996.

Chuang, Tyng-Ruey "Generic Validation of Structural Content with Parametric Modules", *ICFP 2001 International Conference on Functional Programming*, vol. 36, No. 10, Available at <http://citeseerx.ist.psu.edu/viewdoc/download?doi=10.1.1.7.6412&rep=rep1&type=pdf>, (Sep. 3, 2001),12 pages.

Brogden, William "Arbortext Adept 8 Editor Review", Retrieved from: <www.xml.com/pub/a/1999/09/adept/AdeptRvw.htm> on Feb. 5, 2003, O'Reilly XML.COM, Online!, (Sep. 22, 1999),4 pages.

Dayton, Linnea et al., "Photo Shop 5/5.5 WOW! Book", *2000, Peachpit Press*, (2000),pp. 8-17.

Williams, Sara et al., "The Component Object Model: A Technical Overview", Microsoft Corp,(Oct. 1994),pp. 1-14.

Varlamis, Iraklis et al., "Bridging XML-Schema and relational database. A System for generating and manipulating relational databases using valid XML documents", DocEng 01, ACM 1-58113-432-0/01/0011,(Nov. 9-10, 2001),pp. 105-114.

Haukeland, Jan-Henrick "Tsbiff-tildeslash biff—Version 1.2.1", http://web.archive.org/web/19990912001527/http://www.tildeslash.com/tsbiff/., (Jun. 1999),2 pages.

Kim, Sang-Kyun et al., "Immediate and Partial Validation Mechanism for the Conflict Resolution of Update Operations in XML Databases", *WAIM 2002, LNCS 2419,2002, Springer-Verlag Berlin Heidelberg*, (2002),pp. 387-396.

Kutay, Ali et al., "Methods and Systems for Accessing, Organizing, Presenting and Viewing Data", U.S. Appl. No. 60/209,713, Kutay et al., filed Jun. 5, 2000, 345 pages.

Ben-Natan, Ron et al., "Internet Platform for Creating and Supporting Communities", U.S. Appl. No. 60/203,081, filed May 9, 2000,31 pages.

"Final Office Action", U.S. Appl. No. 11/044,106, (Apr. 13, 2009),16 pages.

"Non-Final Office Action", U.S. Appl. No. 11/044,106, (Sep. 24, 2009),17 pages.

"Validation with MSXML and XML Schema", *Windows Developer Magazine*, (Jan. 1, 2002), 5 pages.
"Foreign Notice of Allowance", Mexican Application Number PA/a/2005/012067, (Nov. 13, 2009), 3 pages.
"Final Office Action", U.S. Appl. No. 11/234,767, (Jan. 26, 2010), 23 pages.
"Notice of Allowance", U.S. Appl. No. 11/872,703, (Jan. 27, 2010), 19 pages.
"Supplemental Notice of Allowance", U.S. Appl. No. 10/955,665, (Feb. 4, 2010), 2 pages.
"Supplemental Notice of Allowance", U.S. Appl. No. 10/955,665, (Nov. 27, 2009), 2 pages.
"Issue Notification", U.S. Appl. No. 11/095,254, (Feb. 10, 2010), 1 page.
"Issue Notification", U.S. Appl. No. 11/276,585, (Jan. 21, 2009), 1 page.
Cover, Robin "XML Forms Architecture (XFA)", Cover Pages. Retrieved from http://xml.coverpages.org/xfa.html on Aug. 17, 2006, (Apr. 19, 2000), 4 pages.
Altova, "XML Spy 4.0 Manual", 1998-2001 Altova Inc. & Altova GmbH, (Sep. 10, 2001), pp. 1-90, 343-362.
Chen, Yi et al., "XKvalidator: A Constraint Validator for XML", *CIKM '02*, Nov. 4-9, 2002, McLean, VA, USA, Copyright 2002, ACM, ISBN 1-58113-492-4/02/0011, (Nov. 4-9, 2002), pp. 446-452.
Rogge, Boris et al., "Validating MPEG-21 Encapsulated Functional Metadata", *IEEE 2002*, ISBN 0-7803-7304-9/02, (2002), pp. 209-212.
Chen, Ya B., et al., "Designing Valid XML Views", S. Spaccapietra, S.T. March, and Y. Kambayashi (Eds.): *ER 2002, LNCS 2503*, Copyright: Springer-Verlag Berlin Heidelberg 2002, (2002), pp. 463-477.
"Notice of Allowance", U.S. Appl. No. 11/072,087, (Feb. 23, 2010), 4 pages.
"Final Office Action", U.S. Appl. No. 11/557,931, (Feb. 26, 2010), 8 pages.
"Final Office Action", U.S. Appl. No. 11/107,347, (Mar. 22, 2010), 11 pages.
"Non-Final Office Action", U.S. Appl. No. 10/916,692, (Apr. 5, 2010), 6 pages.
"Non-Final Office Action", U.S. Appl. No. 10/976,451, (Apr. 9, 2010), 11 pages.
"Non-Final Office Action", U.S. Appl. No. 11/227,550, (Mar. 10, 2010), 12 pages.
"Notice of Allowance", U.S. Appl. No. 10/939,588, (Mar. 10, 2010), 10 pages.
"Notice of Allowance", U.S. Appl. No. 11/044,106, (Mar. 15, 2010), 7 pages.
"Supplemental Notice of Allowance", U.S. Appl. No. 10/955,665, (Mar. 5, 2010), 2 pages.
"Supplemental Notice of Allowance", U.S. Appl. No. 10/990,152, (Apr. 19, 2010), 2 pages.
"Supplemental Notice of Allowance", U.S. Appl. No. 11/072,087, (Apr. 19, 2010), 2 pages.
"Final Office Action", U.S. Appl. No. 11/218,149, (May 19, 2010), 17 pages.
"Foreign Office Action", Russian Application No. 2006105526, (Apr. 15, 2010), 6 pages.
"Non-Final Office Action", U.S. Appl. No. 11/567,140, (May 18, 2010), 8 pages.
"Notice of Allowance", U.S. Appl. No. 11/557,931, (May 5, 2010), 7 pages.
"Notice of Allowance", U.S. Appl. No. 11/872,703, (May 14, 2010), 18 pages.
"Supplemental Notice of Allowance", U.S. Appl. No. 11/044,106, (May 13, 2010), 6 pages.
"Supplemental Notice of Allowance", U.S. Appl. No. 11/044,106, (May 19, 2010), 5 pages.
"Advisory Action", U.S. Appl. No. 10/942,528, (Oct. 26, 2009), 3 pages.
"Final Office Action", U.S. Appl. No. 10/916,692, (Nov. 16, 2009), 10 pages.
"Final Office Action", U.S. Appl. No. 10/955,666, (Oct. 14, 2009), 24 pages.
"Final Office Action", U.S. Appl. No. 11/072,087, (Nov. 16, 2009), 9 pages.
"Final Office Action", U.S. Appl. No. 11/218,149, (Nov. 16, 2009), 18 pages.
"Foreign Office Action" Mexican Patent Application No. PA/a/2006/002493, (Sep. 14, 2009), 5 pages.
"Non-Final Office Action", U.S. Appl. No. 10/976,451, (Oct. 29, 2009), 14 pages.
"Non-Final Office Action", U.S. Appl. No. 11/036,910, (Nov. 13, 2009), 9 pages.
"Non-Final Office Action", U.S. Appl. No. 11/557,931, (Oct. 20, 2009), 27 pages.
"Non-Final Office Action", U.S. Appl. No. 11/567,149, (Sep. 8, 2009), 5 pages.
"Notice of Allowance", U.S. Appl. No. 10/942,528 (Dec. 3, 2009), 8 pages.
"Notice of Allowance", U.S. Appl. No. 10/955,665, (Nov. 3, 2009), 8 pages.
"Notice of Allowance", U.S. Appl. No. 11/095,254, (Nov. 18, 2009), 8 pages.
Van Hoff, Arthur et al., "The Open Software Description Format", Retrieved from: <www.w3.org/TR/NOTE-OSD> on May 18, 2009, (Aug. 13, 1997), 10 pages.
WEBOPEDIA, "Definition of Network", Retrieved from: <http://www.webopedia.com/TERM/n/network.html>, (Sep. 1, 1996), 2 pages.
WEBOPEDIA, "Definition of OLE", Retrieved from: <http://www.webopedia.com/TERM/O/OLE.html>, (May 16, 1998), 3 pages.
WEBOPEDIA, "Definition of OpenDoc", Retrieved from: <http://www.webopedia.com/TERM/O/OpenDoc.html>, (Sep. 18, 1997), 3 pages.
"Final Office Action", U.S. Appl. No. 10/976,451 (Jul. 27, 2010), 12 pages.
"Final Office Action", U.S. Appl. No. 11/227,550, (Aug. 19, 2010), 12 pages.
"Final Office Action", U.S. Appl. No. 11/295,178, (Jul. 30, 2010), 43 pages.
"Final Office Action", U.S. Appl. No. 11/567,140, (Aug. 19, 2010), 10 pages.
"Foreign Office Action", EP Application No. 01935325.9, (Jul. 20, 2010), 6 pages.
"Non-Final Office Action", U.S. Appl. No. 10/988,732, (May 26, 2010), 36 pages.
"Non-Final Office Action", U.S. Appl. No. 11/012,472, (Jul. 1, 2010), 9 pages.
"Non-Final Office Action", U.S. Appl. No. 11/036,910, (Aug. 19, 2010), 8 pages.

* cited by examiner

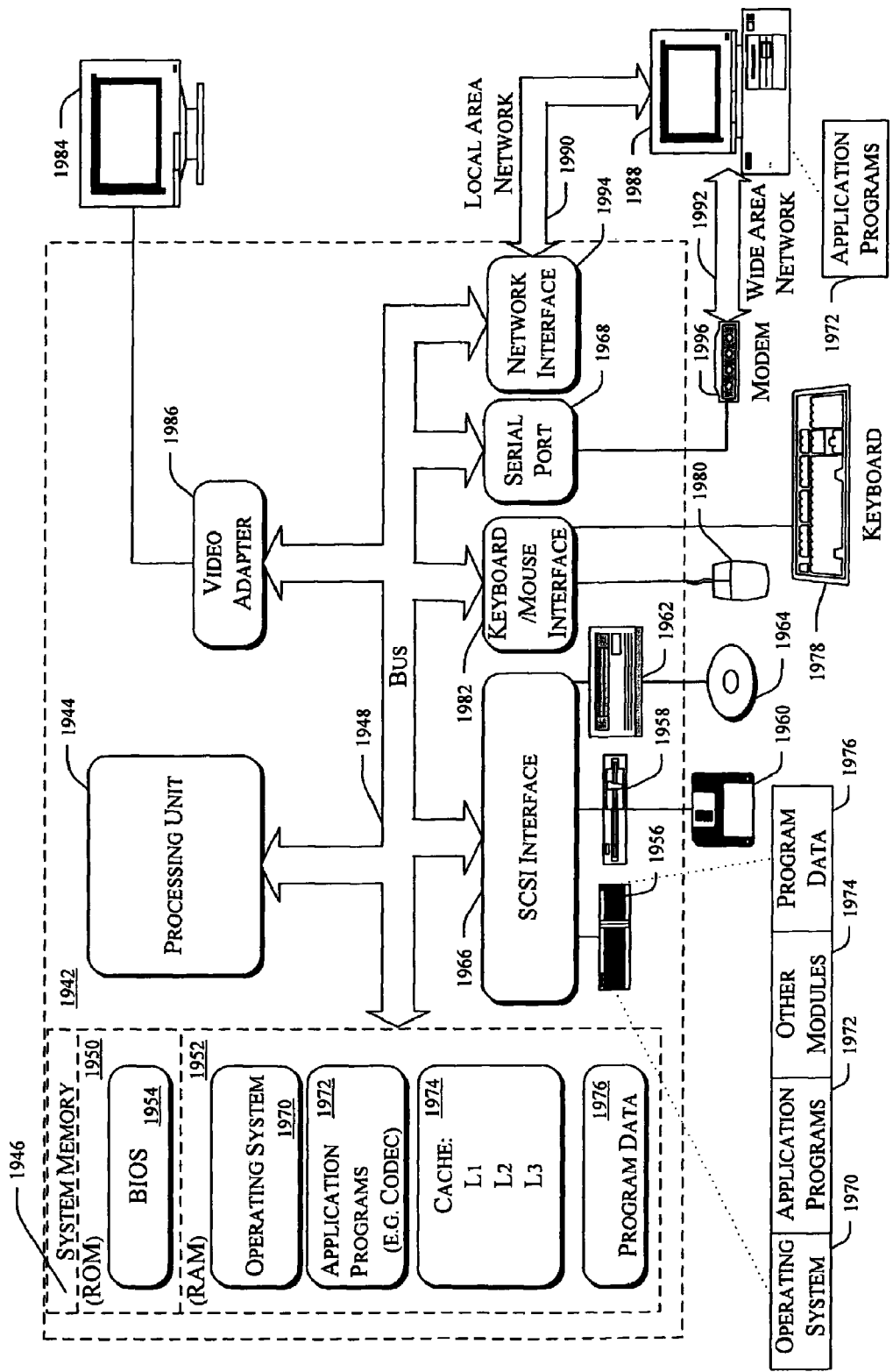

SYSTEM AND METHOD FOR REAL-TIME VALIDATION OF STRUCTURED DATA FILES

TECHNICAL FIELD

This disclosure relates to real-time validation of structured data files.

BACKGROUND

Extensible markup language (XML) is increasingly becoming the preferred format, for transferring data. XML is a tag-based hierarchical language that is extremely rich in terms of the data that it can be used to represent. For example, XML can be used to represent data spanning the spectrum from semi-structured data (such as one would find in a word processing document) to generally structured data (such as that which is contained in a table). XML is well-suited for many types of communication including business-to-business and client-to-server communication. For more on XML, XSLT (eXtensible Style-sheet Language Transformation), and XSD (schemas), the reader is referred to the following documents which are the work of, and available from the W3C (World Wide Web consortium): XML Schema Part 2: Datatypes; Extensible Markup Language (XML) 1.0 second edition specification; XML Schema Part 1: Structures; and XSL Transformations (XSLT) Version 1.0.

Before data can be transferred, however, it must first be collected. Electronic forms are commonly used to collect data. Electronic forms collect data through data-entry fields, each of which typically allows a user to enter data. Once the data is received, it can be stored in an XML data file. The data from a particular data-entry field typically is stored in a particular node of the XML data file.

Users often enter invalid data into data-entry fields, however. Invalid data, when stored in a data file, can misinform people and cause unexpected behavior in software relying on the data file. Because of this, businesses and individuals expend extensive time and effort to prevent invalid data from making its way into XML data files.

One such way to help prevent invalid data from corrupting an XML data file is to validate the data before the data file is saved or submitted. By validating the data file before it is saved or submitted, invalid data can be corrected before it is permanently stored in the data file or used by another application. Validation typically is performed when a user attempts to submit or save the entire form, and is thus performed on a group of individual data fields at one time.

One of the problems with this manner of validating data is that the user receives a list of errors disjointed from the data-entry fields from which the errors arise. These errors may be difficult to relate back to the data-entry fields in the electronic form, requiring users to hunt through the data-entry fields to find which error from the list relates to which data-entry field in the electronic form.

Another problem with this manner is that even after the user determines which error from the list relates to which data-entry field, the user may have to expend a lot of effort to fix the error if the error notification is received well after the user has moved on. Assume, for example, that the user has entered data from a 400-page source document into ninety-three data-entry fields. Assume also that once finished, the user attempts to save or submit the electronic form. A validation application then notifies the user of sixteen errors. After finding that the first error relates to the eleventh data-entry field out of ninety-three, the user will have to go back through the 400-page document to find the data that he or she was supposed to correctly enter into the eleventh data-entry field. This manner of validation can require extensive hunting through large or numerous source documents to fix old errors, wasting users' time.

Even worse, the validation application may return only the first of many errors. For this type of validation application, a user has to go back and fix the first error and then re-save or re-submit. If there are many errors in the electronic form—as is often the case—the user must go back and fix each one separately before re-saving or re-submitting to find the next error. If there are even a few errors, this process can take a lot of time.

Another problem with this process is that if the user submits the electronic form to a server, it taxes the server. A server can be slowed down by having to validate electronic forms, reducing a server's ability to perform other important tasks.

In addition to these problems, the current way of validating data for structured data files can allow some data that is not desired. While this allowance of undesired data can sometimes be prevented, doing so can require extensive time and sophisticated programming abilities.

For these reasons, validation of data for XML data files can require a lot of a data-entry user's time and tax servers. In addition, without a skilled programmer expending considerable effort, significant amounts of undesired data can get through.

SUMMARY

In the following description and figures, a real-time validation tool is disclosed. This real-time validation tool notifies a user of an error as it is entered into a structured data file's electronic form.

In another implementation, the real-time validation tool enables a developer to create custom validation rules for use by the real-time validation tool.

BRIEF DESCRIPTION OF THE DRAWINGS

FIG. 4 illustrates an exemplary screen display showing an electronic form with a filled-in data-entry field.

FIG. 5 illustrates an exemplary screen display showing an electronic form with a data-entry field having an invalid entry.

FIG. 19 is a block diagram of a computer system that is capable of supporting a real-time validation tool.

The same numbers are used throughout the disclosure and figures to reference like components and features.

DETAILED DESCRIPTION

The following disclosure describes an easy and intuitive way for a user to correctly edit structured data files by notifying the user of her errors as she makes them. As a user enters data into a data-entry field of an electronic form, a real-time validation tool validates the data to ensure that the data is valid. If the data is valid, the user can continue on to the next data-entry field. If the data is not valid, the real-time validation tool may allow the user to continue on or may not, depending on the error. The real-time validation tool, whether it allows the user to continue or not, does not allow the user to output the data into a structured data file until it is valid.

The following disclosure also includes a description of a way for a developer to create custom validation rules for use by the real-time validation tool. The real-time validation tool uses validation rules to determine when data entered is valid or invalid. A developer can adjust or add new rules for use by the real-time validation tool. A developer can, for instance, add a validation rule, set whether a user can continue or not if the rule is violated, decide what information is provided by the real-time validation tool to the user when the rule is violated, and determine how these are done.

Creating custom validation rules will be discussed in greater detail in the later parts of the detailed description. The earlier parts will focus more on a how the real-time validation tool validates data from the perspective of a user.

For discussion purposes, the real-time validation tool is described in the context of a single computer, user-input devices, and a display screen. The computer, display screen, and user-input devices will be described first, followed by a discussion of the techniques in which these and other devices can be used.

Exemplary Architecture

Figure 1:
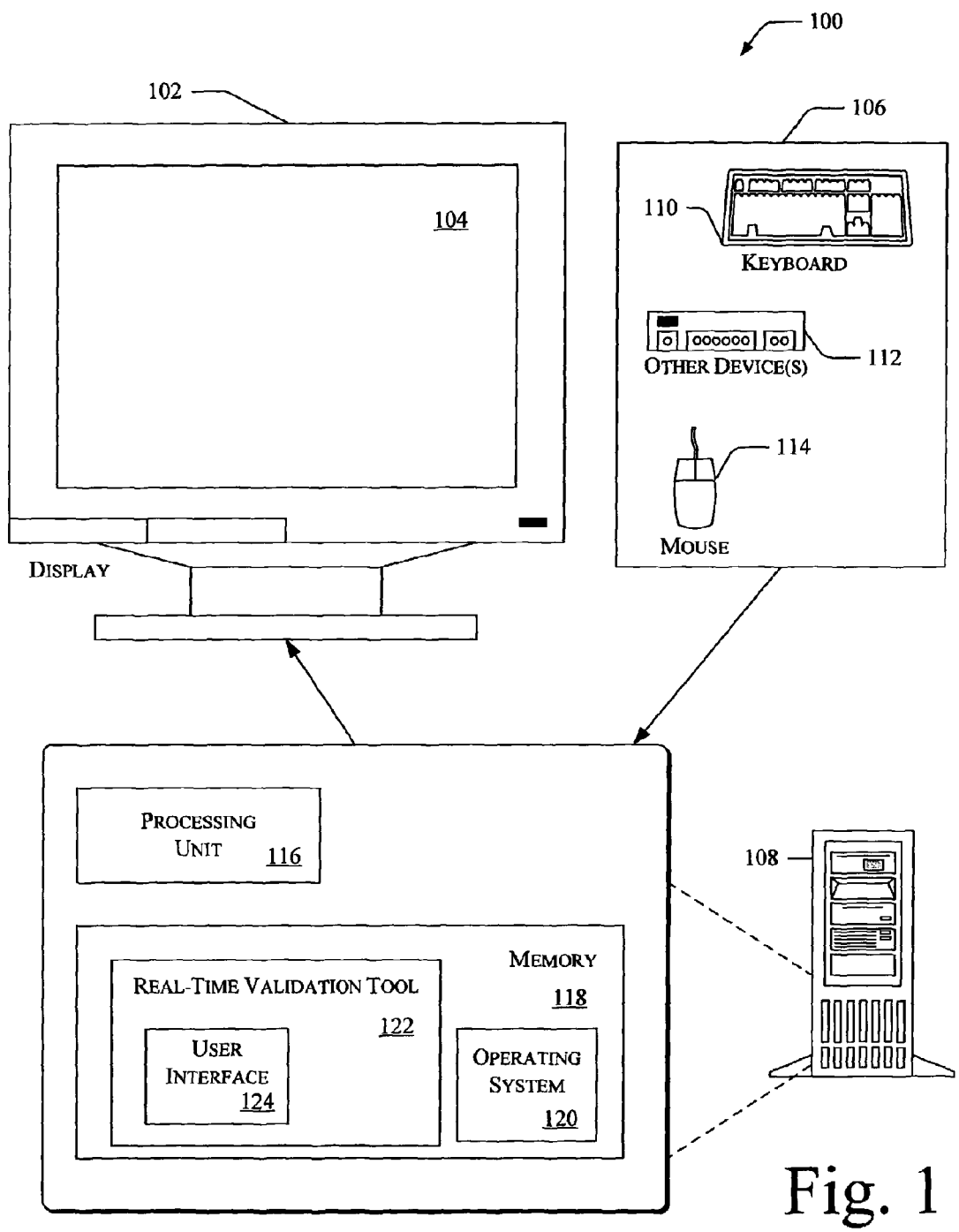
FIG. 1 illustrates a system with a display screen, computer, and user-input devices. The system implements a method for validating data for structured data files.

FIG. 1 shows an exemplary system 100 used to facilitate real-time validation of structured data files. This system 100 includes a display 102 having a screen 104, user-input devices 106, and a computer 108.

The user-input devices 106 can include any device allowing a computer to receive a developer's input, such as a keyboard 110, other device(s) 112, and a mouse 114. The other device(s) 112 can include a touch screen, a voice-activated input device, a track ball, and any other device that allows the system 100 to receive input from a developer. The computer 108 includes a processing unit 116 and random access memory and/or read-only memory 118 including applications, such as an operating system 120 and a real-time validation tool 122, which includes a user interface 124. The computer 108 communicates with a user and/or a developer through the screen 104 and the user-input devices 106.

The real-time validation tool 122 facilitates real-time validation of data for structured data files and is executed by the processing unit 116. The real-time validation tool 122 is capable of validating data entered into an electronic form as it is being entered by a user. Thus, with each new piece of data entered, the real-time validation tool 122 can check whether or not that data is valid and respond accordingly.

The real-time validation tool 122 can respond by informing the user of invalid data and allowing or not allowing the user to continue editing the electronic form. If the real-time validation tool 122 stops the user from continuing on to the next data-entry field, it alerts the user of the error. To make the error easy to fix, the real-time validation tool 122 can inform the user information about the error, such as why the data entered is incorrect or what type of data is correct. The real-time validation tool 122 can alert the user through an alert containing information, such as a dialog box in a pop-up window, or graphics, such as a colored box encasing the data-entry field, or in other ways, like rolling back the data in that data-entry field or keeping the user's cursor in the data-entry field. These and other ways of notifying the user and controlling the user's actions are designed to make the user's entry and correction of data as easy and intuitive as possible.

The real-time validation tool 122 can also allow the user to continue after entering invalid data. In many cases, stopping the user from continuing on to the next data-entry field is counterproductive. The user may not yet have the correct data, or may find it easier to come back to fix all his errors at once, rather than as-he-goes. The real-time validation tool 122 does, however, notify the user that the data entered into that data-entry field is invalid. By so doing, the real-time validation tool 122 informs the user but allows the user to decide if he or she wishes to fix the error now or later. The real-time validation tool 122 can notify the user in various ways, such as those discussed above, as well as particularly un-intrusive ways, like surrounding the data with a red, dashed-line border.

Electronic Forms, Solutions, and Structured Data Files

A view of a structured data file is depicted on the screen 104 through execution of the structured data file's solution. The data file's solution is one or more files (e.g., applications) used to enable a user to edit the structured data file, and may include logic and viewing applications. To edit the data file in a user-friendly way, the data file's solution contains a viewing application, such as an electronic form. This viewing application gives the user a graphical, visual representation of data-entry fields showing previously entered data and/or blank data-entry fields into which the user can enter data. A data file typically has one solution (though solutions often contain multiple files), but each solution often governs multiple data files.

Figure 2:
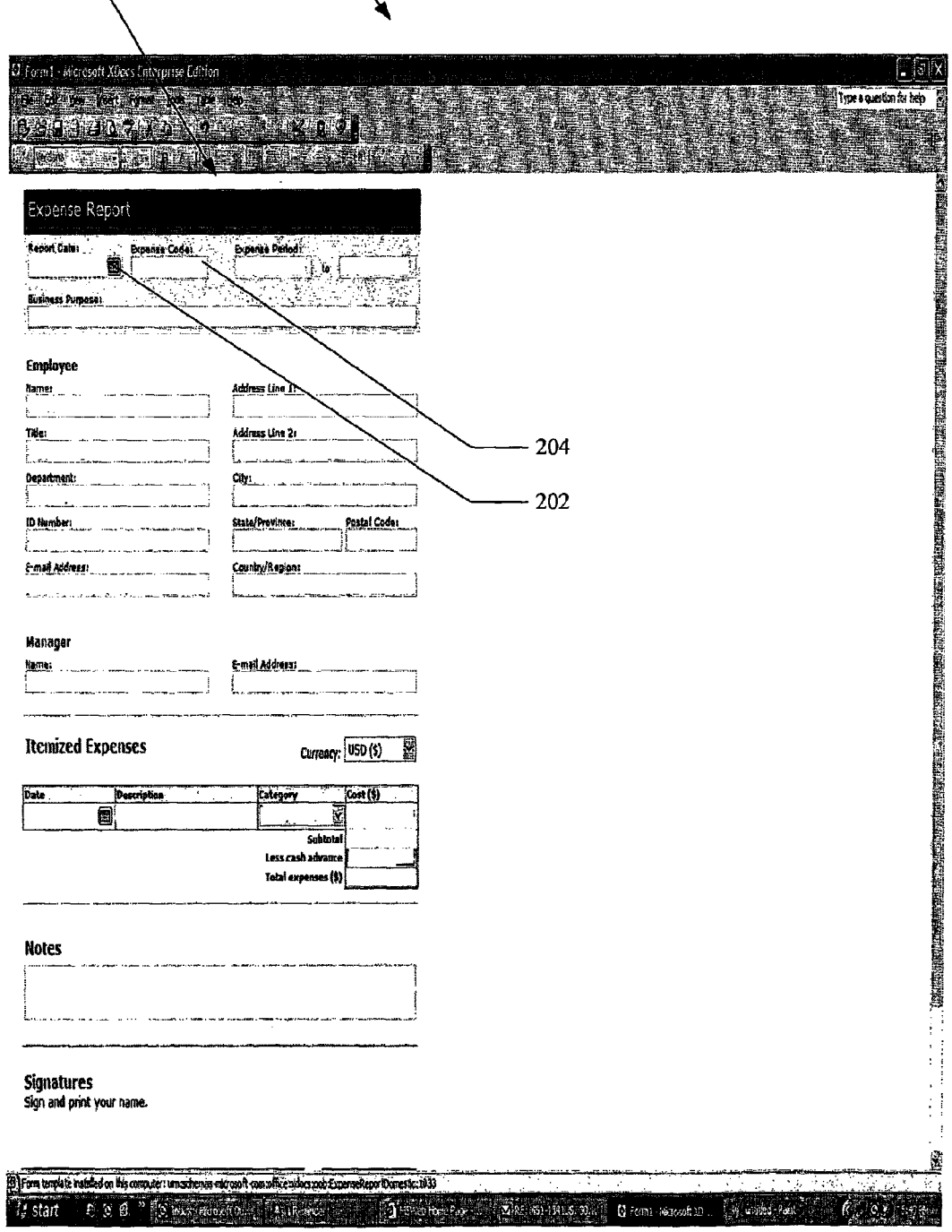
FIG. 2 illustrates an exemplary screen display showing a blank electronic form having data-entry fields.

FIG. 2 shows a display screen 200 including a blank electronic form 201 entitled "Expense Report", which is generated by a solution. This expense report 201 contains data-entry fields in which a user can enter data. These data-entry fields map to a structured data file, so that the data entered into the form can be held in the data file (and eventually stored, once confirmed valid). They can be stored one-by-one after each is confirmed valid, in total after all are confirmed valid and the electronic form is submitted or saved, or in groups after each entry in the group is confirmed valid. Data not yet stored in a data file can be held in various locations and ways, temporarily—such as in the data file (without it being saved), or permanently—such as in an auxiliary file.

This solution presents the expense report 201 electronic form but also contains logic that governs various aspects of the expense report 201 and the data file. In a report date data-entry field 202, for instance, the solution presents the data-entry field as a white box within a gray box, provides a description of the data desired with the text "Report Date", and contains logic requiring that the user enter only numbers. This logic, which can be or use a schema governing the structured data file, can be used by the real-time validation tool 122 in validation rules used to validate data. The solution may also contain other files used by the real-time validation tool 122 for validating data.

Validation rules are employed by the real-time validation tool 122 to ensure that the right kind of data is being entered before it is stored in the structured data file. A user's business manager attempting to analyze expenses with an expense code, for instance, would like the structured data file to have numbers entered into an expense code data-entry field 204. The manager may not be able to determine how an expense should be analyzed if the expense code entered is invalid because it contains letters.

Each solution can be one file or contain many files, such as a presentation file or files used by the real-time validation tool 122 for validation rules. Files used for validation will be discussed in greater detail below. The presentation file is used to present or give a view of an electronic form enabling entry of data into a structured data file, such as a visual representation of the structured data file (blank, in this case) by the expense report 201 electronic form. In some implementations, the presentation file is an XSLT or CSS (Cascading Style Sheet) file, which, when applied to a structured data file written in XML, generates an XHTML (eXtensible Hyper-Text Markup Language) or HTML (Hyper-Text Markup Language) file. XHTML and HTML files can be used to show a view on the screen 104, such as the expense report 201 of FIG. 2.

Like solutions, structured data files can come in various types and styles. As mentioned above, structured data files can be written in XML or some other language. Structured data files, however, are structured—the data they contain is oriented relative to each other. Structured data files can be modular and/or hierarchical (such as a tree structure), for instance. In a hierarchical structure, nodes of the structured data file are designed to contain data or govern other nodes designed to contain data. Nodes designed to contain data can be mapped to particular data-entry fields, so that the data entered into a data-entry field is slotted for the appropriate node. Because nodes and data-entry fields are mapped to each other, the real-time validation tool 122 can determine what node a developer or user is attempting to select or edit when a data-entry field, rather than the node itself, is selected.

The above devices and applications are merely representative; other known devices and applications may be substituted for or added to those shown in FIG. 1. One example of another known device that can be substituted for those shown in FIG. 1 is the device shown in FIG. 19, which will be discussed later.

Validating Data from a User in Real-Time

Overview

A system, such as the system 100 of FIG. 1, displays an electronic form with data-entry fields to allow a user to enter data. The user can enter data in a data-entry field and know, as he does so, whether or not the data entered is valid or invalid. By so doing, the system 100 provides an easy, intuitive, and efficient way for a user to enter and correct data intended for a structured data file.

Figure 3:
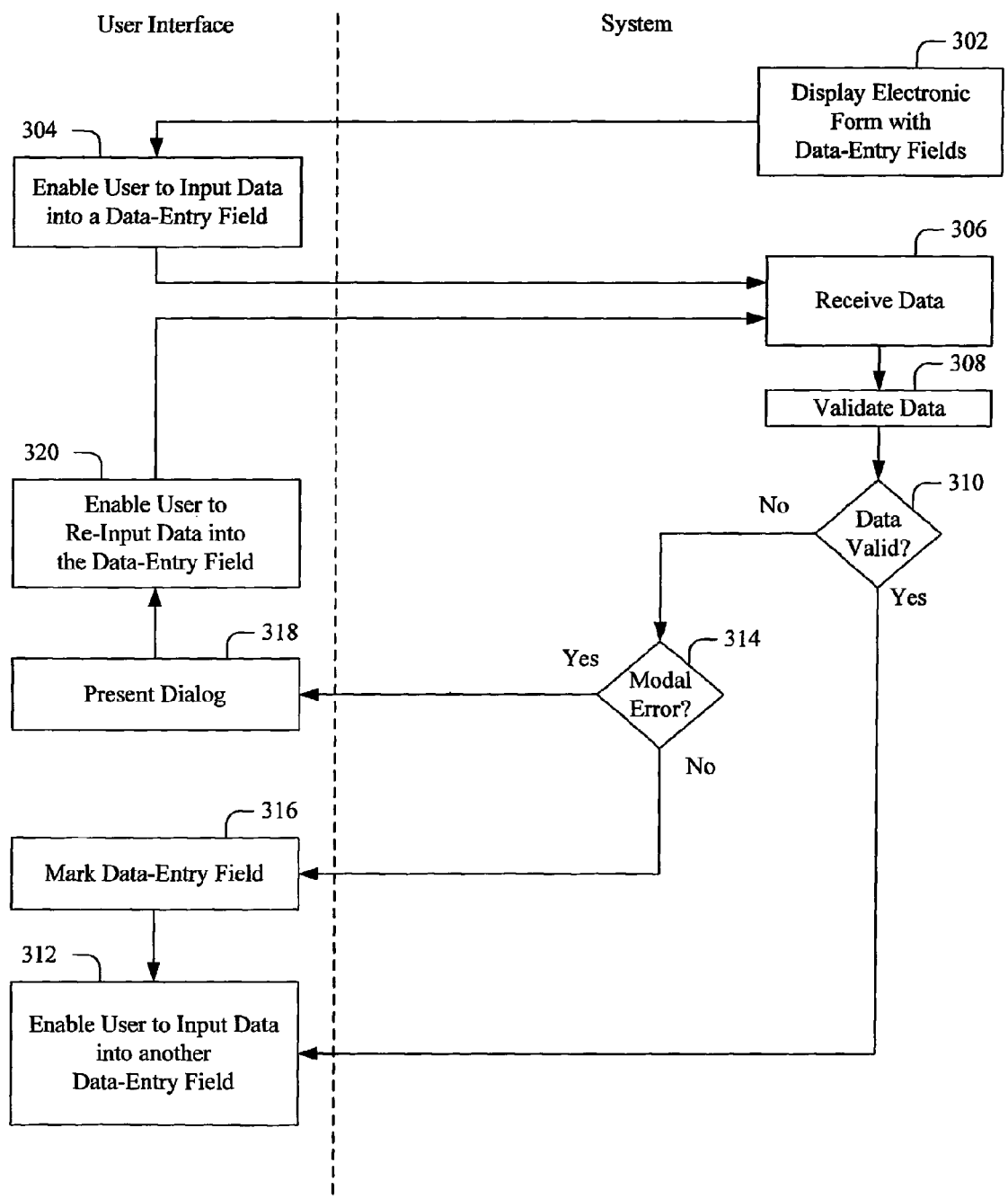
FIG. 3 is a flow diagram of an exemplary process for real-time validation of data for a structured data file.

FIG. 3 shows a process 300 for validating data entered into an electronic form in real-time. The process 300 is illustrated as a series of blocks representing individual operations or acts performed by the system 100. The process 300 may be implemented in any suitable hardware, software, firmware, or combination thereof. In the case of software and firmware, the process 300 represents a set of operations implemented as computer-executable instructions stored in memory and executable by one or more processors.

Notifying a User of Errors in Real-Time

At block 302, the system 100 displays an electronic form having data-entry fields. The electronic form can be blank or contain filled data-entry fields. The expense report 201 electronic form in FIG. 2 is an example of a blank electronic form.

The system 100 displays an electronic form in a manner aimed at making a user comfortable with editing the electronic form. It can do so by presenting the electronic form with user-friendly features like those used in popular word-processing programs, such as Microsoft® Word®. Certain features, like undoing previous entries on command, advancing from one data-entry field to another by clicking on the data-entry field or tabbing from the prior data-entry field, cut-and-paste abilities, and similar features are included to enhance a user's data-entry experience. For example, the system 100 displays a blank electronic form having some of these features in FIG. 2, the expense report 201 electronic form.

At block 304, with the electronic form presented to the user, the system 100 enables the user to input data into a data-entry field. The user can type in data, cut-and-paste it from another source, and otherwise enter data into the fields. The user can use the user-input devices 106, including the keyboard 110, the other device(s) 112 (such as a touch screen, track ball, voice-activation, and the like) and the mouse 114.

Figure 4:
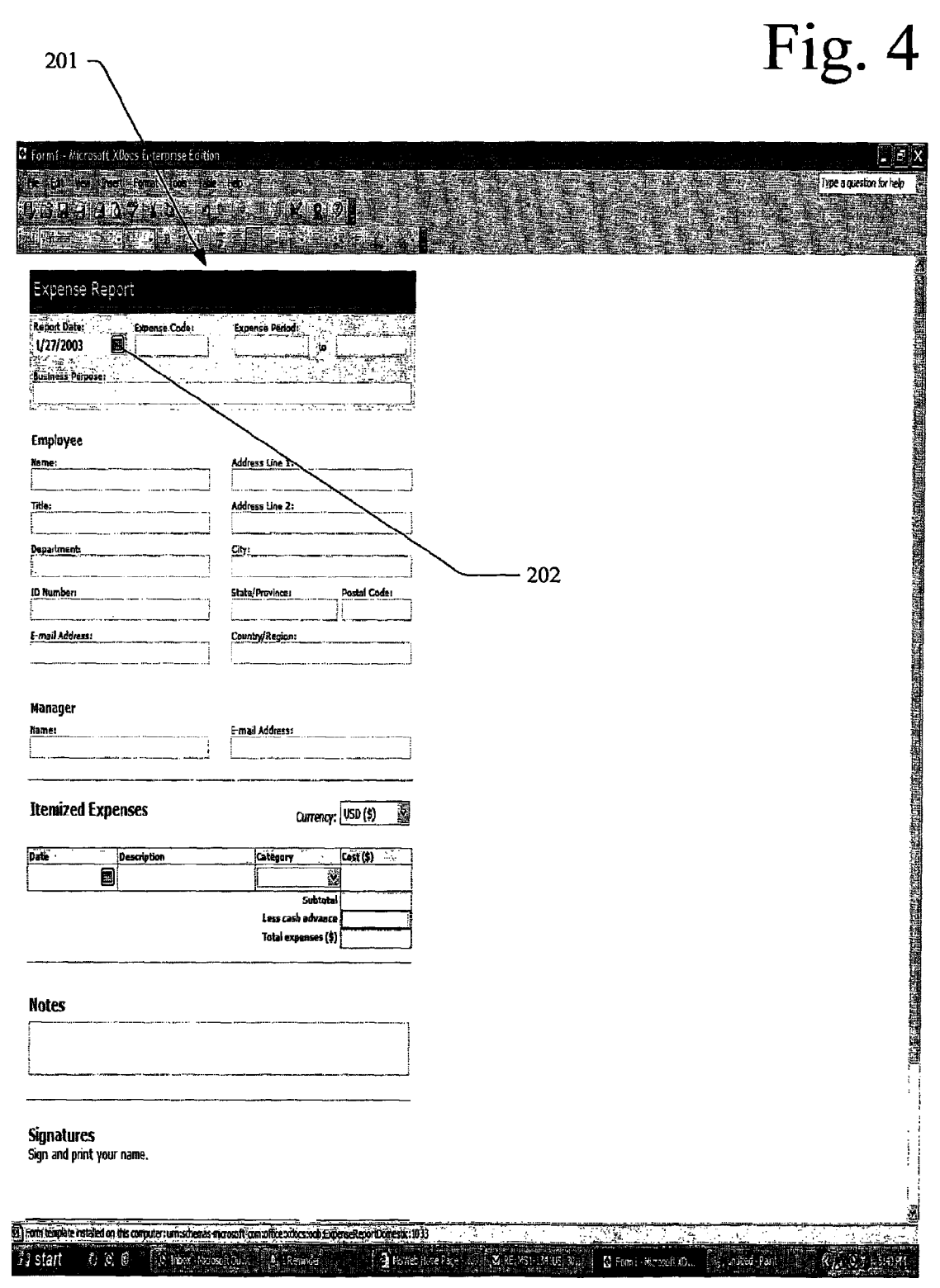

In FIG. 4, for example, the user enters "Jan. 27, 2002" into the report date data-entry field 202 of the expense report 201.

At block 306, the system 100 receives the data entered into the data-entry field by the user. The system 100 receives the data from the user through the user-input devices 106 and the user interface 124 (both of FIG. 1). The system 100 can receive the data character-by-character, when the data-entry field is full, or when the user attempts to continue, such as by tabbing to move to another data-entry field. In the foregoing example, the system 100 receives "1/27/2002" from the user when the user attempts to advance to the next data-entry field.

At block 308, the system 100 validates the data received into the data-entry field in the electronic form. The system 100, through the real-time validation tool 122, analyzes the data to determine if it is valid. The real-time validation tool 122 refers to validation rules, if any, governing that particular data-entry field (in this example the report date data-entry field 202). The real-time validation tool 122 validates the data entered into a data-entry field without the user having to save or submit the electronic form. It can do so by applying validation rules associated with the node of the structured data file corresponding to data-entry field into which the data was entered.

The real-time validation tool 122 can apply validation rules from many different sources. One source for validation rules is a schema governing the structured data file. Other sources of validation rules can include preset and script-based custom validation rules.

For script-based custom validation rules, the real-time validation tool 122 enables these rules to refer to multiple nodes in a structured data file, including nodes governing or governed by other nodes. Thus, the real-time validation tool 122 can validate data from a data-entry field intended for a particular node by checking validation rules associated with that particular node. Through so doing, the real-time validation tool 122 can validate data entered into one node of a group with the validation rules governing the group of which the node is a part. For example, if a group of nodes contains four nodes, and is associated with a script-based validation rule requiring that the total for the data in all of the four nodes not exceed 1000, the real-time validation tool 122 can validate each node against this rule. Thus, if the first node contains 100, the second 400, and the third 300, the real-time validation tool 122 will find the data intended for the fourth node invalid if it is greater than 200 (because 100+400+300+200=1000). Custom script-based validation rules and preset validation rules will be discussed in greater detail below.

In some cases the real-time validation tool 122 can build validation rules from a schema containing logic that governs a structured data file. This logic sets forth the bounds of what data nodes in a structured data file can contain, or the structure the nodes should have. Data entered into a structured data file can violate this logic, making the structured data file invalid. This invalid data may cause a structural error or a data-type error in the structured data file, possibly making the structured data file useless. To combat this, the real-time validation tool 122 can build validation rules from a structured data file's schema.

Because structural errors are especially important, the real-time validation tool 122 treats these types of errors seriously. To make sure that a user treats these errors seriously, the real-time validation tool 122 builds validation rules for structural errors that stop a user from continuing to edit an electronic form if the real-time validation tool 122 detects a structural error. Validation rules that stop the user from continuing to edit the electronic form (except for fixing that invalid data) are called modal validation rules, and errors that violate them, modal errors.

For less serious errors, such as data-type errors, the real-time validation tool 122 builds validation rules that do not stop the user from continuing. These are called modeless validation rules, and errors that violate them, modeless errors. Modal and modeless validation rules and errors will be discussed in greater detail below.

To aid the real-time validation tool 122 in validating data in real-time, validation rules are associated with particular nodes. By so doing, with each new piece of data received, the real-time validation tool 122 is capable of comparing the data received against an appropriate list of validation rules associated with the node for which the data received is intended. Because this, list of validation rules can be very short for each particular node, the real-time validation tool 122 has fewer validation rules to check for each piece of data entered than if it had to check all the validation rules for the node's structured data file. This speeds up the process of validation.

Continuing the previous example, at the block 308 the system validates the data entered, "1/27/2002", against validation rules associated with the report date data-entry field 202, thereby determining if the data entered is valid.

In block 310 the system 100 determines whether to proceed to block 314 or 312 depending on whether the data is valid. If the real-time validation tool 122 determines that the data entered is not valid, it proceeds to the block 314, discussed below. If, on the other hand, the real-time validation tool 122 determines it to be valid, the system 100 continues to block 312, allowing the user to continue editing the electronic form. Continuing the ongoing example, if the real-time validation tool 122 determines that the data "1/27/2002" is valid, the system 100 continues on to the block 312. If not, it proceeds to block 314.

At the block 312, the system 100 enables the user to input data into another data-entry field. In FIG. 2, for example, it would allow the user to proceed to enter data into the expense code data-entry field 204 after the data entered into the report date data-entry field 202 was determined to be valid. The system 100 can allow the user to proceed to another data-entry field as well, depending on the user's preference.

If the data is invalid, the system 100 proceeds to the block 314. At the block 314 the system 100, through the real-time validation tool 122, determines whether to proceed to block 316 if the error is not modal and 318 if it is.

Continuing the previous example, assume that the data entered into the report date data-entry field 202 is invalid. Assume also that "1/27/2002" is not defined to be a modal error. (Modal errors are those for which the real-time validation tool 122 rolls back the invalid entry requiring the user to re-enter another entry before continuing on to edit another data-entry field or requires the user to correct.) Thus, in this example, "1/27/2002", is invalid, but is a modeless error.

In the block 316, the real-time validation tool 122 alerts the user of a modeless error by marking the data-entry field as containing an error, but allows the user to continue editing the electronic form. To make the editing process as easy, intuitive, and efficient as possible, the real-time validation tool 122 can mark the data-entry field from which the invalid error was entered in many helpful ways. The real-time validation tool 122 can highlight the error in the data-entry field, including with a red box, a dashed red box, a colored underline, a squiggly underline, shading, and the like. The real-time validation tool 122 can also alert the user with a dialog box in a pop-up window, either automatically or only if the user asks for information about the error.

The real-time validation tool 122, for example, can present a dialog box or other presentation manner explaining the error or what type of data is required by the data-entry field. The real-time validation tool 122 can present a short comment that disappears quickly or is only shown if the user moves his cursor or mouse pointer over the data-entry field. The real-time validation tool 122 can also provide additional information on request. Many manners of showing the user that the data is invalid as well as showing information about the error can be used. These ways of notifying the user can be chosen by a developer when creating a custom validation rule, which will be discussed in greater detail below.

Figure 5:
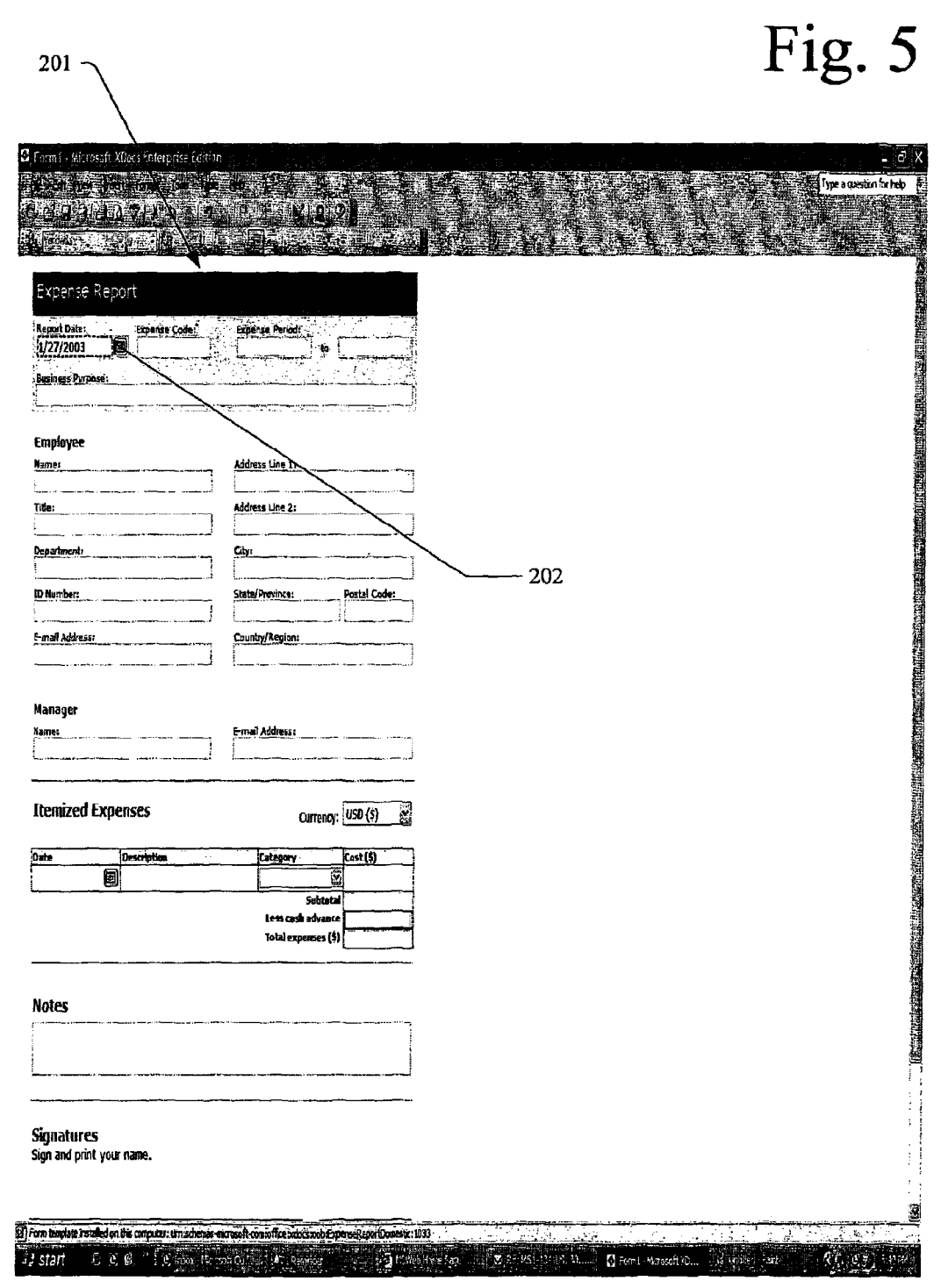

FIG. 5, for example, shows one manner in which the real-time validation tool 122 can notify the user of an error. In FIG. 5, the expense report 201 electronic form shows that the data entered into the report date data-entry field 202 is invalid with a dashed, red-lined box surrounding the report date data-entry field 202 (visible as a dashed, gray-lined box).

Figure 6:
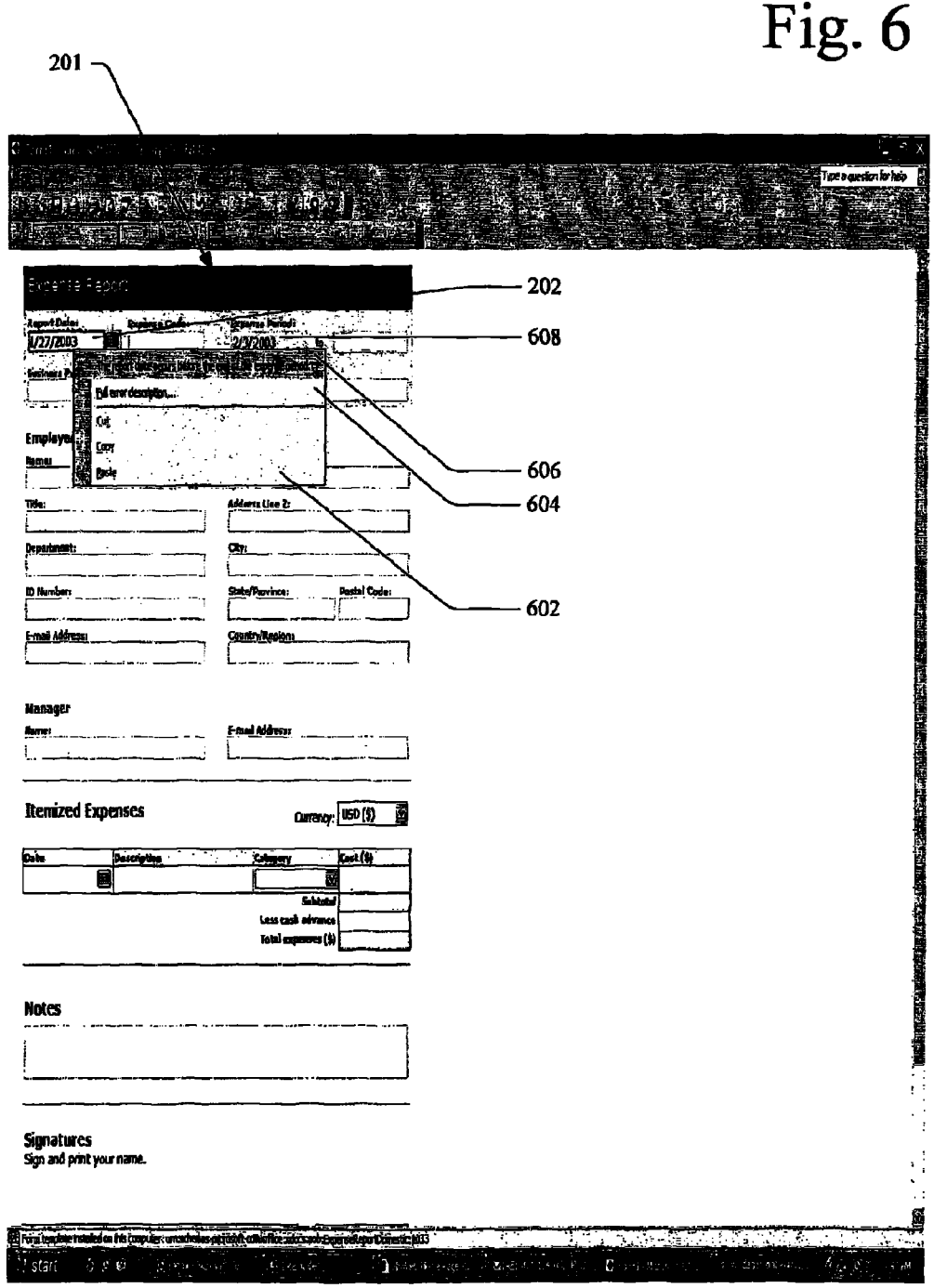
FIG. 6 illustrates an exemplary screen display showing an electronic form with a data-entry field having a modeless invalid entry and a dialog box.

FIG. 6 shows another example. Here, the expense report 201 electronic form shows that the data entered into the report date data-entry field 202 is invalid with a dialog box 602. This dialog box can pop up automatically or after the user requests information, such as by moving his mouse pointer onto the report date data-entry field 202. Also in this example, FIG. 6 shows an option for the user to gain additional information about the error and/or data-entry field by selecting an auxiliary information option 604 entitled "full error description". If the user selects this option, the system 100 will present the user with more information about the error and/or what the data-entry field requires (not shown). The real-time validation tool 122 allows the user to select additional information through a tool-tips icon, right-clicking on the data-entry field, and menu commands for navigating errors. It can also present additional information for multiple errors at once, such as through a list presenting information about every error in an electronic form.

Returning to the dialog box 602, it contains error information 606. This error information 606 reads: "The report date occurs before the end of the expense period." This informs the user that the data entered, "1/27/2002" is invalid because it violates a rule requiring the report date to occur after the expense period, shown in an expense period data-entry field 608 as "2/3/2003".

In some cases, if the real-time validation tool 122 determines that data entered in a data-entry field is invalid, it will mark other data-entry fields. This is because another data-entry field may actually contain the invalid data. In FIG. 6, for example, the real-time validation tool 122 marked the data entered into the report date data-entry field 202 ("1/27/2002") as invalid because it was prior to the date entered into the expense period data-entry field 608 ("2/3/2003"). The data entered into the expense period data-entry field 608 may actually be the date in error, however, rather than that entered into the expense report data-entry field 202. In these types of cases, the real-time validation tool 122 can mark both fields (not shown).

The real-time validation tool 122 can mark either data-entry field in the above-disclosed manners. It can, for example, mark the report date data-entry field 202 with a dashed red-lined box (shown in FIG. 6) and the expense period data-entry field 608 with a solid-red-line box (not shown). The real-time validation tool 122 can also mark a data-entry field that is invalid because invalid data has been entered into it, with a dashed red-lined box and a data entry field that is invalid because it does not contain any data, with a solid, red underline. In this implementation the real-time validation tool 122 marks the data-entry fields differently so that the user knows quickly and easily that each of these data-entry fields needs to be investigated, but can differentiate between them.

For these modeless errors, the real-time validation tool 122 permits the user to proceed, according to the block 312, discussed above.

For modal errors, however, the real-time validation tool 122 presents a dialog (block 318). The user then can dismiss the dialog. Once the dialog is dismissed, the real-time validation tool 122 rolls back the invalid entry and enables the user to continue editing the electronic form. This editing can include re-inputting data into the data-entry field (block 320), or editing another data-entry field. Alternatively, the real-time validation tool 122 leaves the error in the document, but will not allow the user to continue editing the document without first correcting the error.

In the block 318, the real-time validation tool 122 presents an alert to notify the user of the invalid entry. This alert is intended to inform the user that the error is important and must be fixed. It does not have to be a pop-up window, but should be obvious enough to provide the user with an easy-to-notice notification that the user has entered data causing an error. The alert, in one implementation, is a pop-up window that requires the user to pause in editing the electronic form by making the user click on an "OK" button in the alert. This stops the user mentally, helping the user to notice that he must fix the data-entry field having the error before proceeding. The alert can contain no, little, or extensive information about the error. The information can be presented automatically or after the system 100 receives a request for the information.

Figure 7:
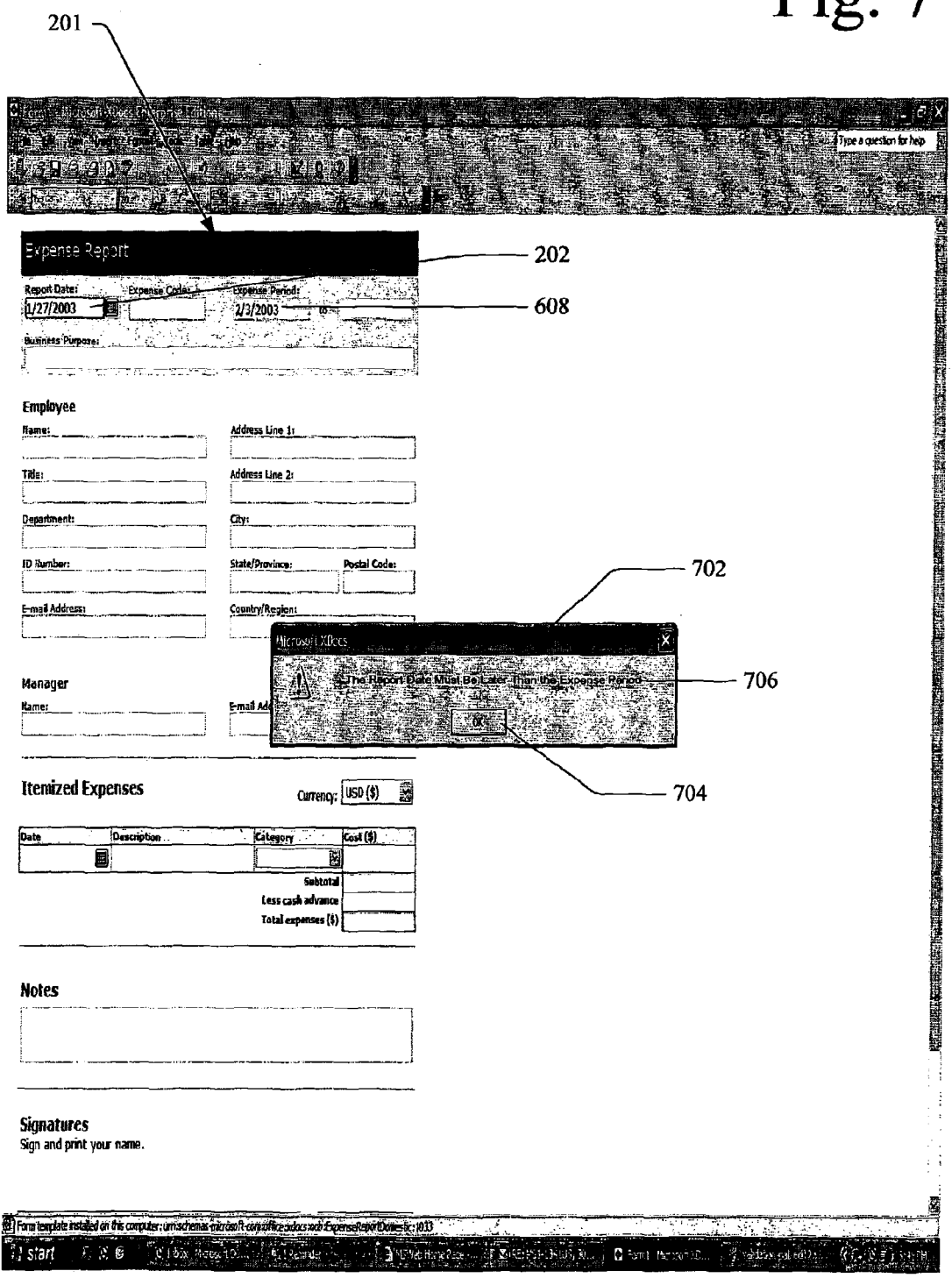
FIG. 7 illustrates an exemplary screen display showing an electronic form with a data-entry field having a modal invalid entry and a dialog box.

FIG. 7 shows the partially filled-in expense report 201 electronic form with a date dialog box 702 arising from invalid data causing a modal error. The dialog box contains a button marked "OK" that the user must select (a date dialog button 704). The date dialog box 702 also contains a date information line 706 informing the user about the error, "The Report Date Must Be Later Than the Expense Period." This information is intended to aid the user's attempt to correct the invalid data.

Figure 8:
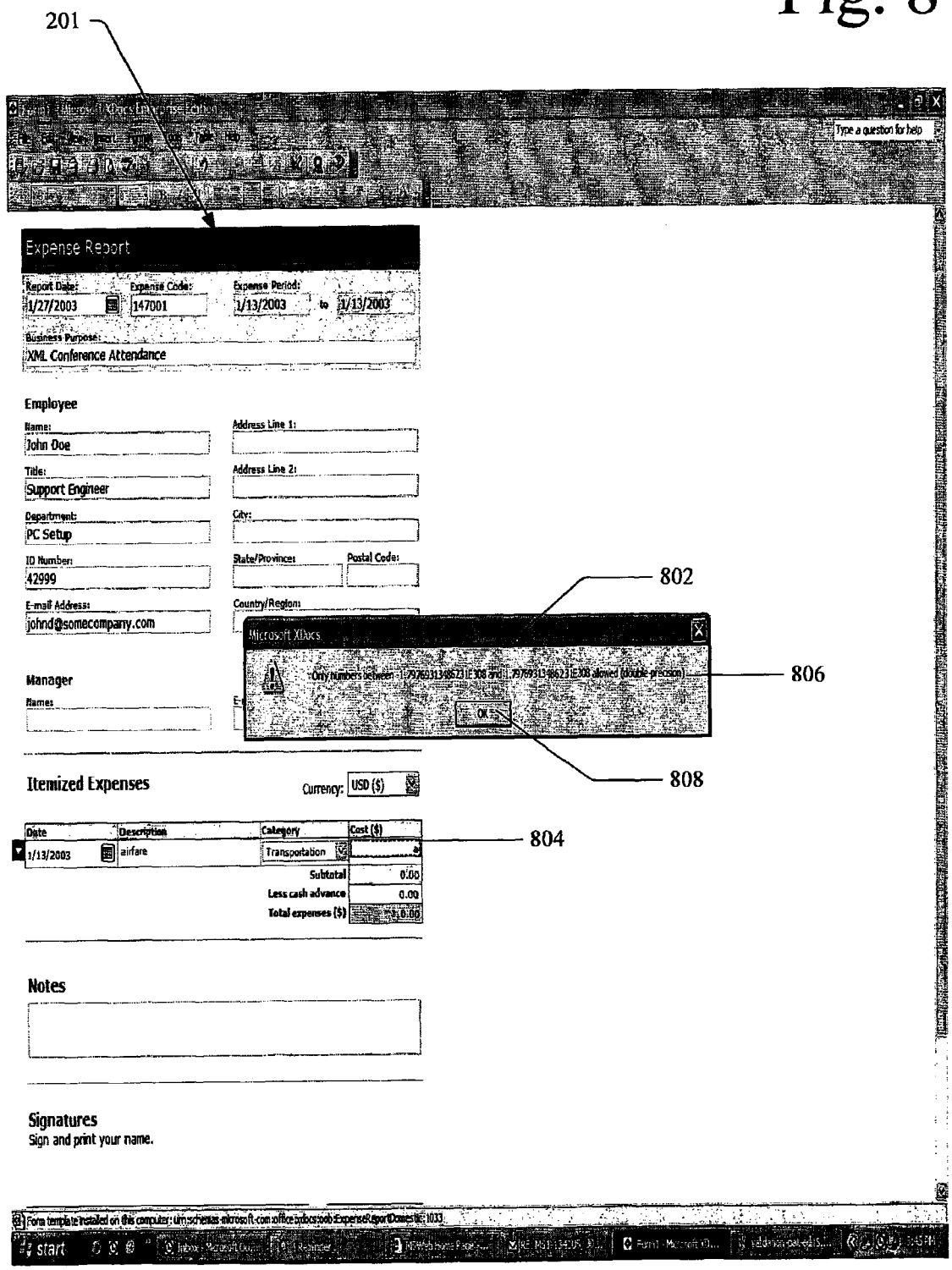
FIG. 8 illustrates an exemplary screen display showing an electronic form having many filled-in data-entry fields, one of which contains a modal invalid entry, and a dialog box.

FIG. 8 shows another example of a dialog box used for a modal error. In FIG. 8, a nearly all-filled-in expense report 201 electronic form with an invalid number dialog box 802 is shown. This expense report 201 contains many filled-in data-entry fields, each of which is not shown to be invalid with the exception of a cost data-entry field 804. The cost data-entry field 804 contains a modal error, "a". When the user entered the textual data "a", the real-time validation tool 122 found it invalid and presented the invalid number dialog box 802. The invalid number dialog box 802 informs the user through an invalid number information line 806 that the data entered is not valid because it is not a number between negative and positive 1.7976913486231E308. In this example it is not a valid number because it is not a number at all. Like the prior example, the user must select a button in the dialog box, here an invalid number button 808.

After presenting the user with some sort of alert in block 318 (FIG. 3), the real-time validation tool enables the user to re-input data into the data-entry field containing the modal error (block 320). Here the user must change the data within the data-entry field to a valid or modeless error before continuing to edit new data-entry fields in the electronic form. Once the user inputs new (or the same) data into the data-entry field (such as the cost data-entry field 804 of FIG. 8), the system 100 receives the data at the block 306 and so forth. To proceed, the user must enter data that is not a modal error; if the user does not, the system 100 will follow the process 300, continuing to find the data modally invalid and not permit the user to continue.

Through this process 300 of FIG. 3, the system 100 can receive and validate data in real-time. By so doing, a user can easily, accurately, and efficiently edit a structured data file through entry of data into data-entry fields in an electronic form.

The examples set forth in FIGS. 2 and 4-8 are examples, and are not intended to be limiting on the abilities of the system 100 or the real-time validation tool 122; other types of forms, data-entry fields, and alerts can be used.

Creating Custom Validation Rules for Structured Data Files

Overview

The system 100 of FIG. 1 includes the real-time validation tool 122, which enables a developer to create or customize validation rules for a structured data file. To enable the developer to choose a node for which to create or customize a validation rule, the real-time validation tool 122 displays nodes of a structured data file or its generalized instance and/or the data-entry fields mapped to those nodes. A generalized instance is a structured data file that has been generated from a schema and is comprehensive enough to illustrate all structural patterns allowed by the schema. Nodes in the generalized instance are a coupling of a node from a structured data file and a part of the structured data file's schema that governs that node. (For more on nodes, see the description relating to FIG. 14, below.) Because the nodes of a generalized instance for a structured data file are related to the nodes of the structured data file, nodes of the generalized instance can be chosen in place of a related node of a structured data file. In addition, data-entry fields that map to either of those nodes can also be selected in their place. In each of these cases, the real-time validation tool 122 recognizes the node of the structured data file to which a validation rule should be applied.

If the electronic form is in the process of being built, the developer will probably find it easiest to add custom validation rules while creating the form. Because of this, the real-time validation tool 122 enables the developer to add a custom validation rule to a data-entry field as that data-entry field is being added to the electronic form.

The real-time validation tool 122 also enables a developer to add custom validation rules to nodes after an electronic form mapped to the structured data file (or its generalized instance) has been created. In either case, the real-time validation tool 122 enables a developer to easily create custom validation rules for nodes of a structured data file, thereby improving a data-entry user's ability to accurately and efficiently enter data for storage in a structured data file. This is because when a user later enters data intended for that particular node, the real-time validation tool 122 can access the custom validation rule for that node. Custom validation rules make editing a structured data file more accurate and efficient.

In addition, the real-time validation tool 122 enables a developer to create custom validation rules in an easy-to-use way by allowing the developer to choose from preset validation rules. These preset validation rules can be chosen quickly and easily by a developer even if the developer is not skilled in programming.

Figure 9:
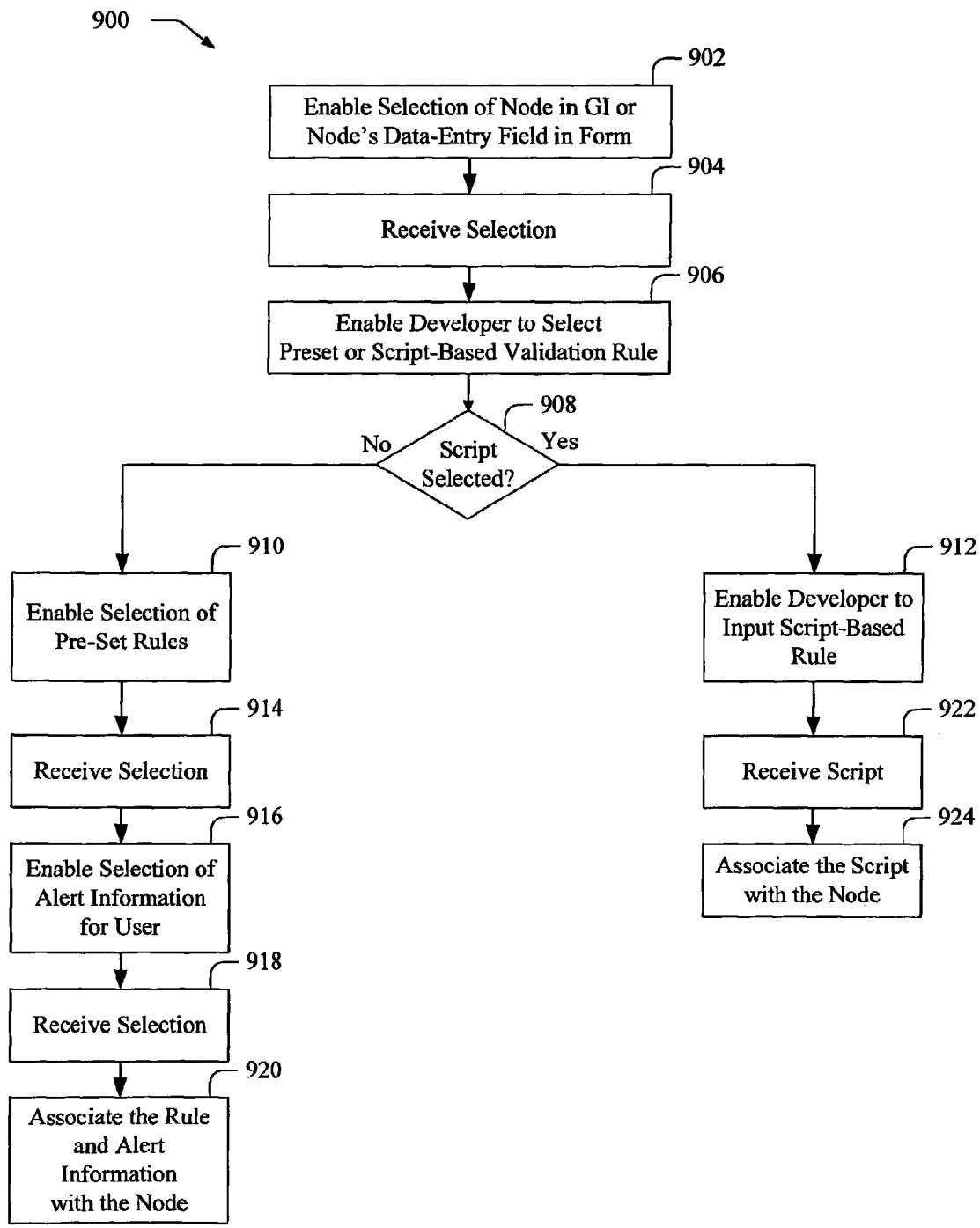
FIG. 9 is a flow diagram of an exemplary process for adding validation rules for use by a real-time validation tool.

FIG. 9 shows a process 900 for adding validation rules for nodes in a structured data file. The process 900 is illustrated as a series of blocks representing individual operations or acts performed by the system 100. The process 900 may be implemented in any suitable hardware, software, firmware, or combination thereof. In the case of software and firmware, the process 900 represents a set of operations implemented as computer-executable instructions stored in memory and executable by one or more processors.

Selecting a Node and a Preset or Script-Based Validation Rule

At block 902, the real-time validation tool 122 enables a developer to select a node in a generalize instance or structured data file either directly or through selecting a data-entry field in an electronic form that is associated with that node. A developer can select a node by right-clicking on it with the mouse 114, entering a command in the keyboard 110, or in some other manner through the other device(s) 112 (all of FIG. 1).

Figure 10:
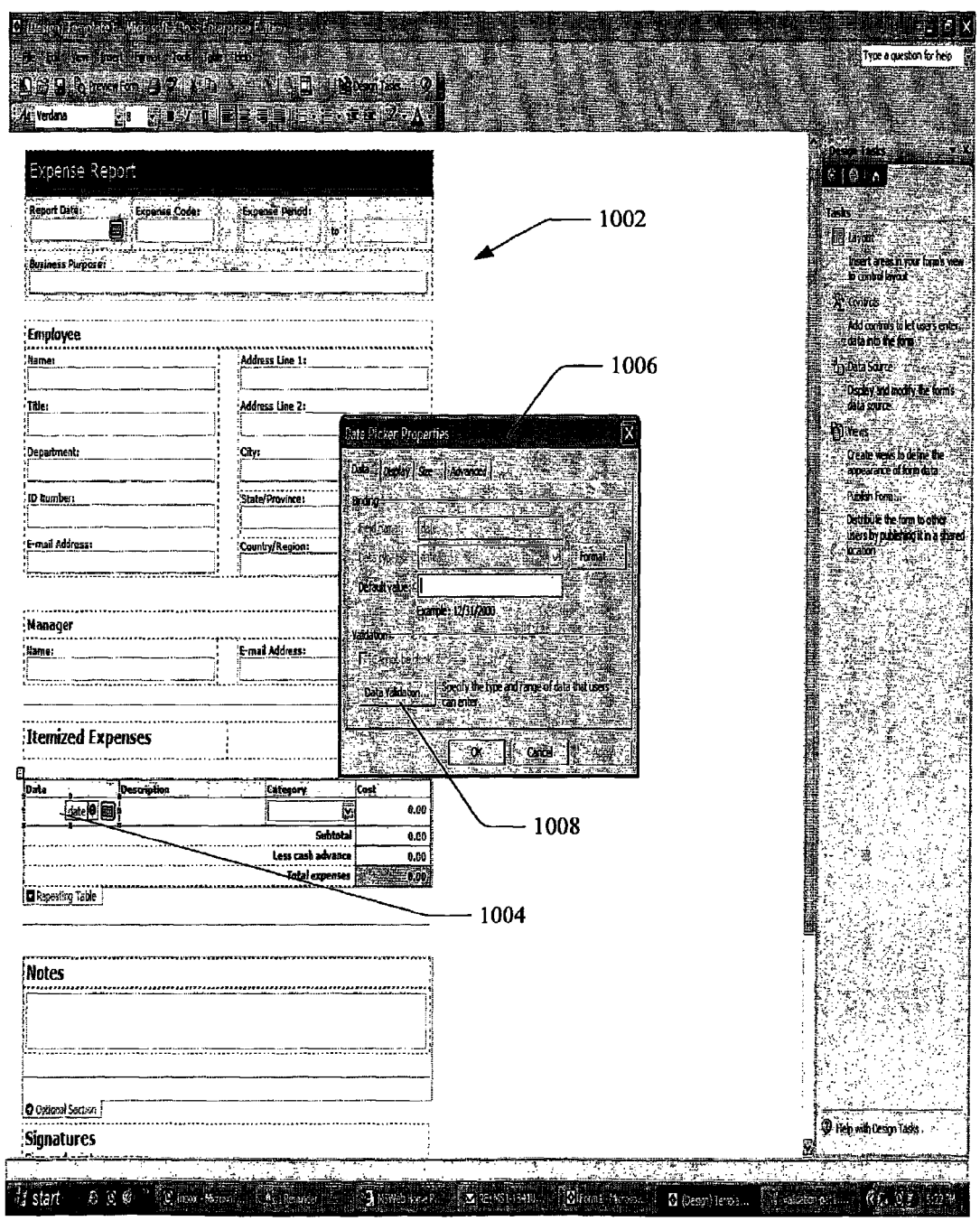
FIG. 10 illustrates an exemplary custom validation screen, including a development copy of an electronic form and a properties box.

FIG. 10 shows an exemplary custom validation screen 1000, including a development copy of an expense report electronic form 1002. The electronic form 1002 is a development copy because it is a copy that is not intended for data entry by a user, but rather editing of its form and structure by a developer. In this example, each data-entry field shown in the electronic form 1002 is associated with a node in a generalized instance and/or structured data file. The development electronic form 1002 is displayed by the real-time validation tool 122 to enable a developer to select a data-entry field associated with a node. By doing so, the developer can add a custom validation rule to that node.

At block 904, the system 100 receives a selection of a node (directly or through selection of a data-entry field).

FIG. 10 shows an example of a node chosen by a developer. In this example, the developer selected a date data-entry field 1004. Once received, the system 100 reacts according to block 906.

At the block 906, the system 100 enables a developer to select a preset or script-based validation rule. The system 100 can enable the developer's selection through many user-interface manners, including by presenting a pop-up window with various options, one of which includes an option to add a custom validation rule to the selected node. The developer can choose from a preset list of validation rules or can choose to create his or her own validation rule by creating script.

FIG. 10 shows a properties box 1006, providing the developer with an option to perform various functions, one of which includes an option to customize the validation rules for the selected node. By clicking on or otherwise selecting a data validation option button 1008, the developer can choose to see a validation option box, shown in FIG. 11.

Figure 11:
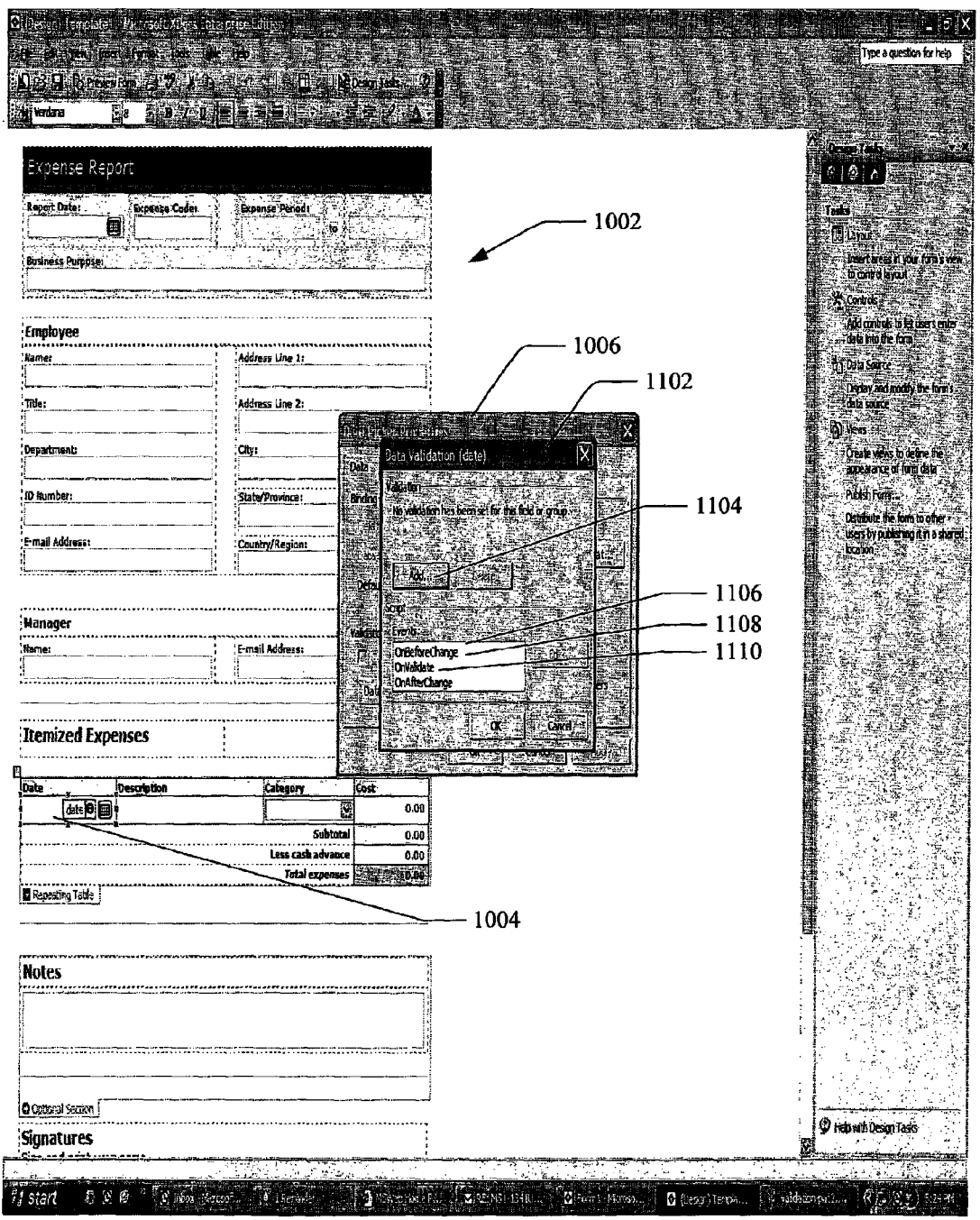
FIG. 11 illustrates an exemplary custom validation screen, including a development copy of an electronic form, a properties box, and a validation option box.

FIG. 11 shows an exemplary custom validation screen 1100, including the development copy of the expense report electronic form 1002 and a validation option box 1102 entitled "Data Validation (Date)". In this example, the "(Date)" part of the title is from the name for the selected data-entry field in the electronic form 1002. This feature is intended to make it easier for the developer to keep track of the node for which he is adding a validation rule.

The validation option box 1102 is used to enable the developer to choose which type of custom validation rule to add (and/or edit, if one already exists). The developer can choose to add a preset custom validation rule by selecting an add preset rule button 1104. The developer can also choose to add a script-based validation rule by selecting either of two events in an event box 1106, OnBeforeChange event 1108 or OnValidate event 1110. Script-based validation rules and events used in them will be discussed in greater detail below.

At block 908, the system 100 determines whether the developer selected an option to add a custom validation rule using preset rules or script-based rules. If the developer chose preset rules, the system 100 proceeds to block 910. If the developer chooses to create a script-based validation rule, the system 100 proceeds to block 912.

Preset Validation Rules

At the block 910, the system 100 enables selection of preset rules. The system 100 enables a developer to select from a list of many validation rules that are desirable for validating data. These preset validation rules can be selected by the developer in an easy, efficient manner. Also, these preset validation rules enable the developer to create powerful validation rules for the real-time validation tool 122 to use when validating data. Another benefit of these preset validation rules is that the developer does not need to know how to program or write code (script or otherwise). Also, these validation rules do not have to be exclusive, they can be added to other validation rules, such as validation rules based on the structured data file's schema or custom script-based validation rules. Thus, these preset validation rules can allow a developer with little or no programming ability to create a broad range of useful validation rules, making it accurate and efficient for an eventual user to edit a structured or unstructured data file.

Many different types of preset validation rules can be made available by the system 100. These can include rules that require data entered to be of a certain size, be numbers or text, and compare in certain ways with data from other data-entry fields, for example. To give a developer flexibility, the preset validation rules can be adjusted by the developer entering numbers or text, or relating data in one field to another. Examples of how this can be done will be discussed in the following example in FIG. 12.

Figure 12:
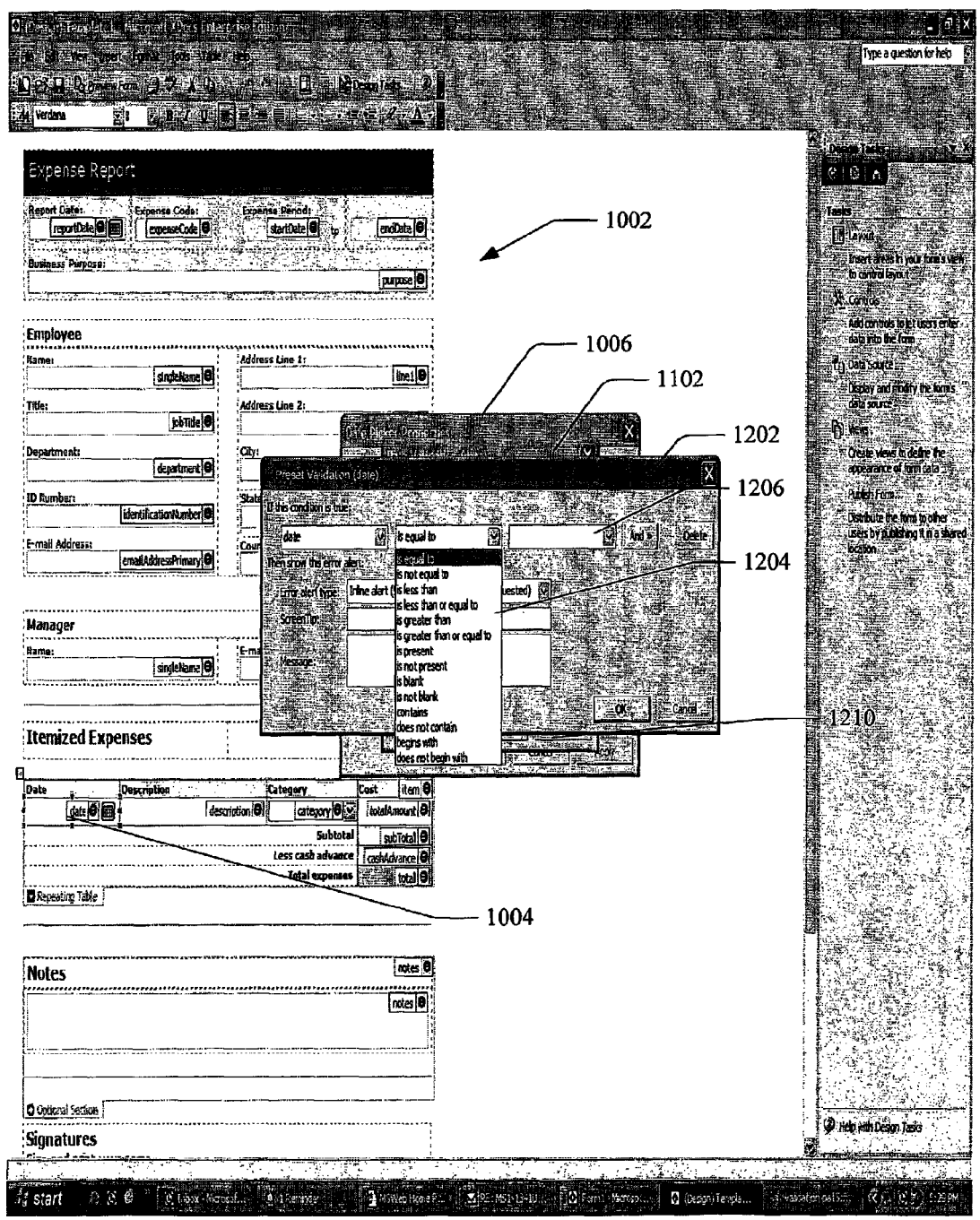
FIG. 12 illustrates an exemplary custom validation screen, including a development copy of an electronic form, a properties box, a validation option box, and a preset validation selection box.

FIG. 12 shows an exemplary custom validation screen 1200, including the development copy of the expense report electronic form 1002, the properties box 1006 (obscured), the validation option box 1102 (obscured), and a preset validation selection box 1202, entitled "Preset Validation (Date)". In this example, the "(Date)" part of the title is from the name for the selected data-entry field in the electronic form 1002. This feature is intended to make it easier for the developer to keep track of the node for which he is adding a validation rule.

In this example, the developer chose to add a preset validation rule by selecting the add validation button 1104 of FIG. 11. Once that selection was received by the system 100, the system 100 presented the preset validation selection box 1202. In this example, the developer has selected to add a preset validation rule and is attempting to view the different options for preset validation rules. Thus, the system 100 is displaying a list of preset validation rules through a preset validation list 1204 in FIG. 12.

From this list the developer can create a validation rule. The developer can choose to require (via the validation rule) that data entered into the date data-entry field 1004 be of a certain sort. Using the preset validation list 1204 as an example, the developer can choose a particular type of preset validation rule. With the preset validation rule selected, the developer can then enter text, numbers, another node, or whatever is appropriate. The developer can select a preset validation rule and then add, into a validation field 1206, numbers, text, a node, or etc., to complete the validation rule. The system 100 can intelligently aid the developer by providing appropriate options, such as suggesting a date for the date data-entry field 1004. This is another aid to guide the developer, helping him or her to easily add and/or edit validation rules.

The developer can choose from various useful preset validation rules, such as those set forth in FIG. 12 in the preset validation list 1204. This list includes preset validation rules of: "is equal to"; "is not equal to"; "is less than"; "is greater than"; "is greater than or equal to"; "is present"; "is not present"; "is blank"; "is not blank"; "contains"; "does not contain"; "begins with"; and "does not begin with", for example.

Figure 13:
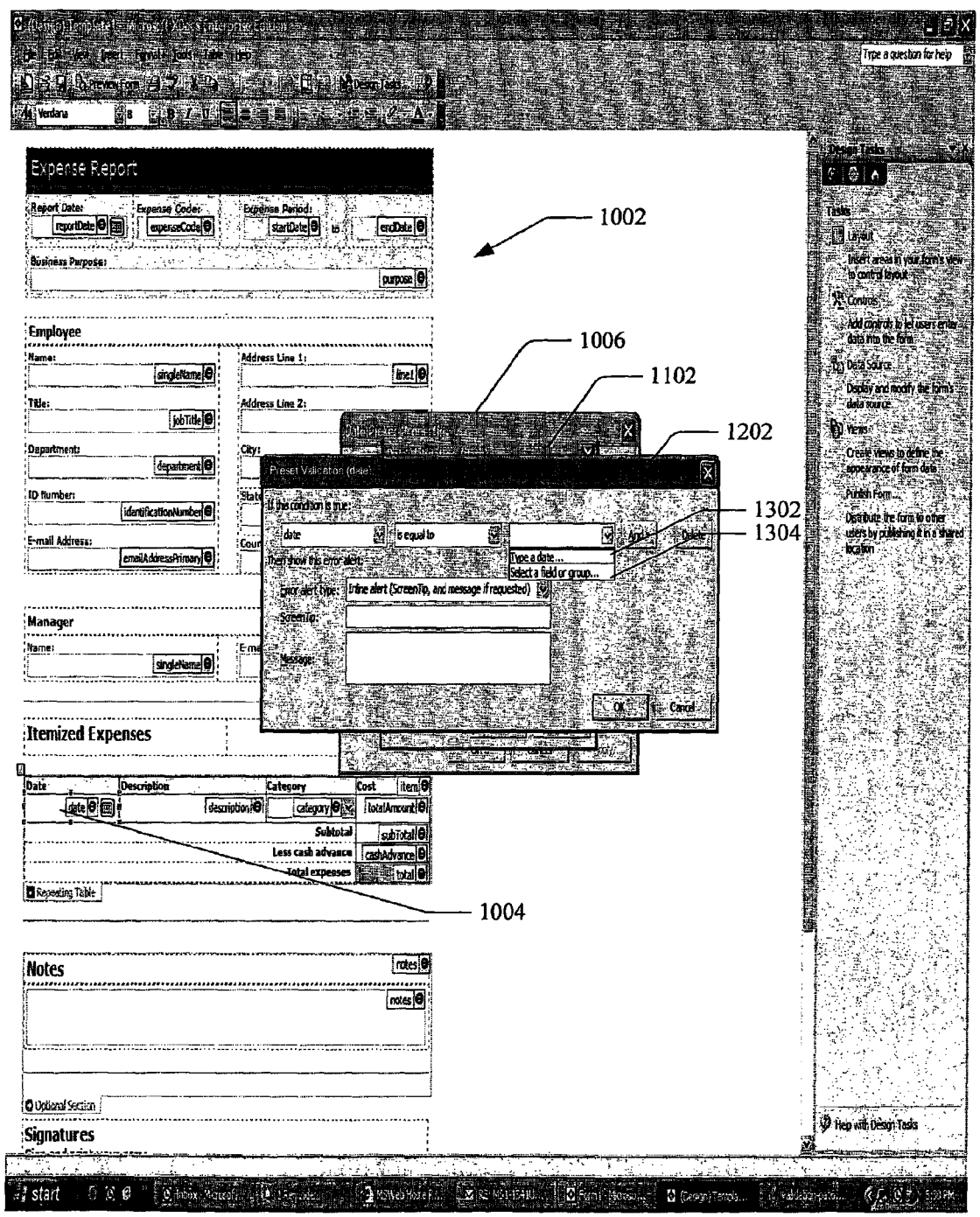
FIG. 13 illustrates an exemplary custom validation screen, including a development copy of an electronic form, a properties box, a validation option box, and a preset validation selection box.

FIG. 13 shows an exemplary custom validation screen 1300, including the development copy of the expense report electronic form 1002, the properties box 1006 (obscured), the validation option box 1102 (obscured), the preset validation selection box 1202, and two validation field options, enter date option 1302 and enter field option 1304.

Once a preset validation rule is selected by the developer, such as the "is equal to" preset validation rule, the developer can enter an appropriate date, such as "Mar. 13, 2003" into the enter date option field 1302 or select a field with the enter field option 1304. In the present example, the developer does not select to enter a date, but rather selects a data-entry field compared to which the date must be equal in order for the data entered to be valid.

If the developer chooses to select a field (in this present example by selecting the enter field option 1304), the system 100 enables the developer to choose from nodes and/or data-entry field mapped to those nodes. The system 100 can do so simply by allowing the developer to choose from data-entry fields shown in the electronic form or from a list of nodes in the generalized instance. Because the nodes of the generalized instance and the data-entry fields of the electronic form are related, choosing either the node or the data-entry field associated with the node can be allowed by the system 100. Some developers may be unfamiliar with nodes of a generalized instance and so may feel more comfortable choosing from data-entry fields associated with those nodes. The developer need not know that the data-entry fields are associated with nodes, however. By so enabling the developer to choose in whichever way he or she is comfortable, the system 100 improves the customization experience of the developer.

Figure 14:
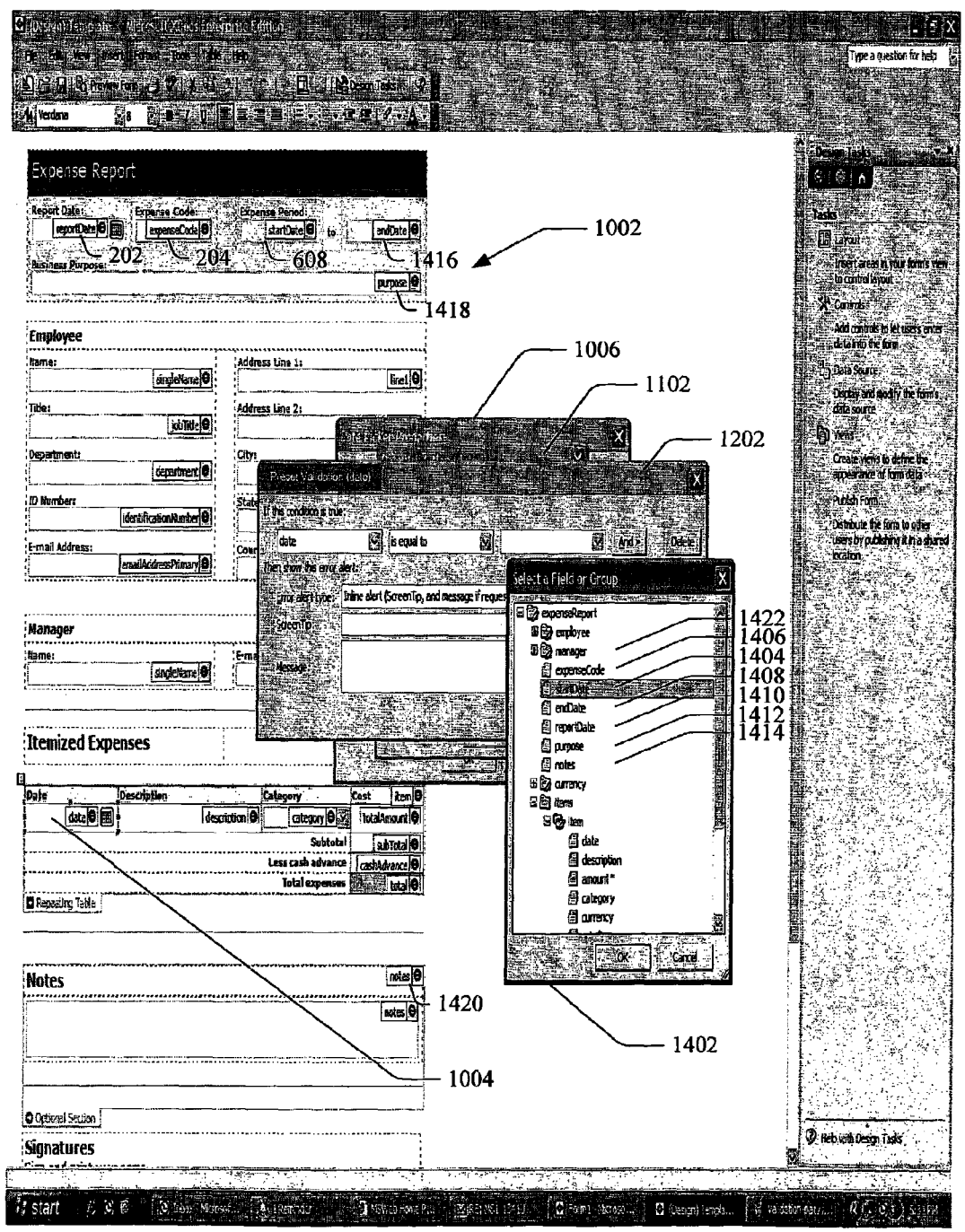
FIG. 14 illustrates an exemplary custom validation screen, including a development copy of an electronic form, a properties box, a validation option box, a preset validation selection box, and a node selection box.

FIG. 14 shows an exemplary custom validation screen 1400, including the development copy of the expense report electronic form 1002, the properties box 1006 (obscured), the validation option box 1102 (obscured), the preset validation selection box 1202 (partially obscured), and a node selection box 1402.

Continuing the ongoing example, the developer can choose the enter field option 1304 in FIG. 13. After the developer does so, the system 100 presents nodes of the generalized instance or structured data file that map to or govern the data-entry fields in the electronic form. In this example, the system 100 presents nodes from the generalized instance, shown in the node selection box 1402. This enables the developer to choose a node, such as by selecting a start date node 1404 in the node selection box 1402.

FIG. 14 serves to demonstrate the structured format of nodes in a structured data file, as well as the relationship between nodes and data-entry fields. The node selection box 1402 includes a partial list of the nodes of the structured data file corresponding to the expense report electronic form 201. These nodes include nodes mapped to data-entry fields, such as the start date node 1404, an expense code node 1406, an end date node 1408, a report date node 1410, a purpose node 1412, and a notes node 1414. These nodes are mapped, respectively, to the expense period data-entry field 608, the expense code data-entry field 204, an end date data-entry field 1416, the report date data-entry field 202, a purpose data-entry field 1418, and a notes data-entry field 1420. These nodes also include nodes that contain or govern other nodes, such as a manager node 1422, which governs the nodes 1404 to 1414. The structured aspect of the structured data file and/or generalized instance is shown here by nodes governing other nodes, and graphically by some nodes being presented in the form of a folder icon and some being indented related to others.

At block 914, the system 100 receives a selection of a preset rule. The system 100 can receive the selection in various ways, including those set forth for selecting nodes and data-entry fields above. The selection of a preset validation rule may include numerous steps, as shown in the foregoing example.

In the foregoing example, because of the developer's selection of the start date node 1404, the system 100 adds a validation rule requiring that data entered into the date data-entry field 1004 be equal to the date entered or retained in the start date node. This start date node is associated with a start date data-entry field 608, shown in FIG. 14.

Alerts for the Preset Validation Rule

At block 916, the system 100 enables the selection of alert information for the user. Before, after, or as part of a developer adding a preset validation rule, the system 100 enables the developer to add alert information that can be presented to the user if the user violates a preset validation rule. The developer can choose from default information or input custom information. The developer can choose how the alerts and their information and graphics are presented, such as through a dialog box in a pop-up window or a line of text appearing if the user moves a mouse icon over the data-entry field. With or without information, the developer can choose from various graphical aspects to be included in an alert, such as box or dashed-line box around the data-entry field, a squiggly line under the data in the data-entry field, shading of the data-entry field, and in other manners.

Figure 15:
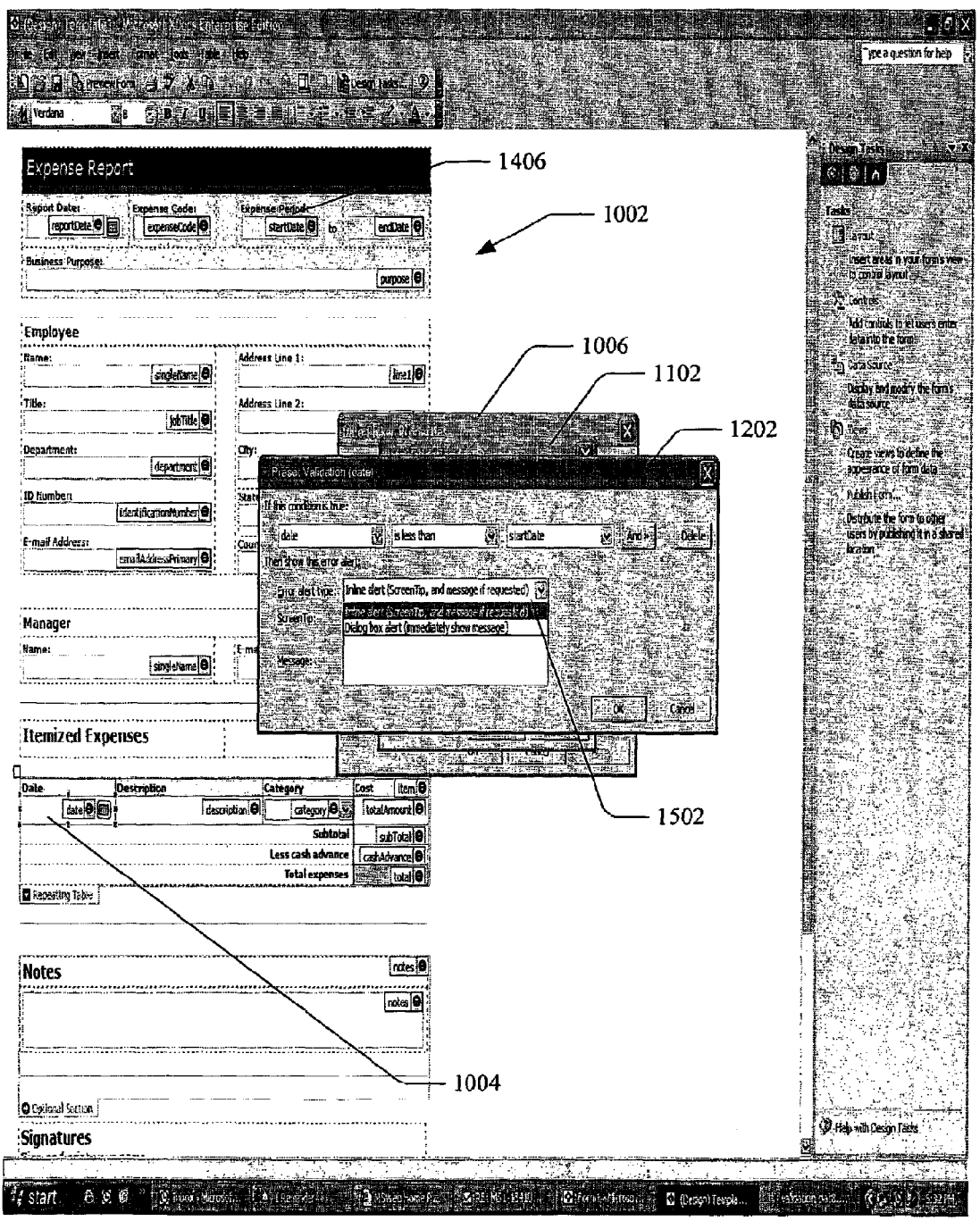
FIG. 15 illustrates an exemplary custom validation screen, including a development copy of an electronic form, a properties box, a validation option box, and a preset validation selection box.

FIG. 15 shows an exemplary custom validation screen 1500, including the development copy of the expense report electronic form 1002, the properties box 1006 (obscured), the validation option box 1102 (obscured), the preset validation selection box 1202, and an information alert option box 1502.

In the example shown in FIG. 15, the system 100 enables the developer to choose information to be made available to the user if he enters data violating the associated preset validation rule. Here the developer can choose two sets of information to be presented. The system 100 presents the first set of information as a "screen tip", which arises when the user makes the error, and can be presented automatically or if the user moves a mouse icon or otherwise selects the data-entry field containing the invalid data.

The system 100 presents the second set of information either at the request of the user or automatically, depending on the preference of the developer. The developer can choose to have the second set of information presented automatically and in a dialog box in a pop-up window, for instance. The developer can choose for the dialog box to contain a button, such as a button like the invalid number button 808 of FIG. 8, and that the user must click to continue editing the electronic form. A developer could desire to automatically present a pop-up window so that the user takes special attention to the invalid entry. For errors the developer is not as concerned about or if the developer thinks it more efficient for the user to be able to continue editing the electronic form without the interruption of a pop-up window, the developer can choose to have the information only come up at the user's request.

Figure 16:
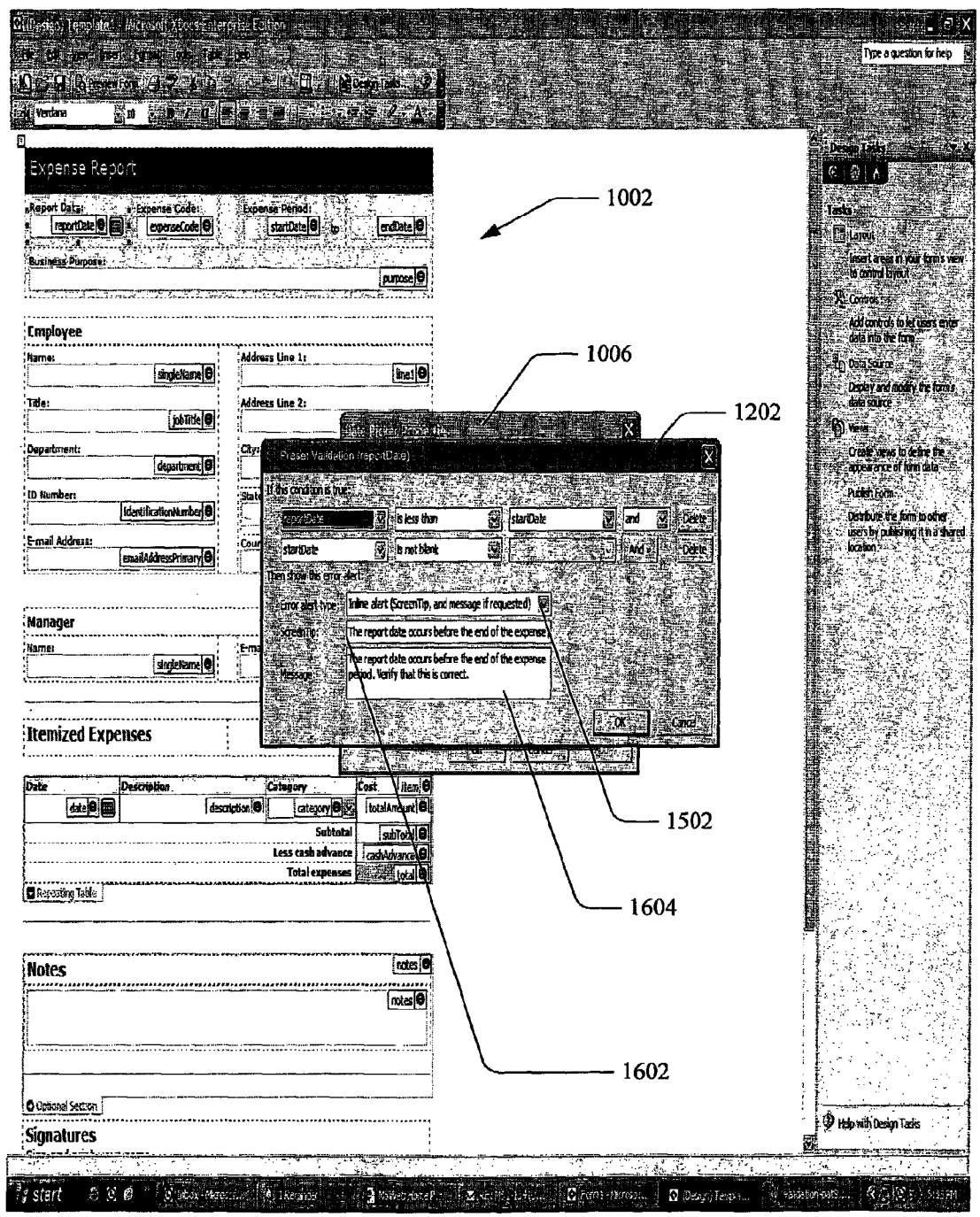
FIG. 16 illustrates an exemplary custom validation screen, including a development copy of an electronic form, a properties box, a validation option box, and a preset validation selection box.

FIG. 16 shows an exemplary custom validation screen 1600, including the development copy of the expense report electronic form 1002, the properties box 1006 (obscured), the preset validation selection box 1202, and the information alert option box 1502. In this example, which is not based on the date data-entry field 1004 of FIG. 15, a developer has entered two messages using the information alert option box 1502. The first, entered into a screen tip field 1602, is presented to the user as a screen tip, such as is shown in the error information 606 field of FIG. 6. The second, entered into a message dialog field 1604, is presented to the user as a message in a dialog box if the user requests, such as is shown in the date information line 706 of FIG. 7.

Associating the Preset Validation Rule with Its Node

At block 920, the system 100 associates the preset validation rule and its alert information with the selected node. The system 100 associates a preset validation rule and its alert information (and/or non-information alert, if applicable) to the node selected for the validation rule by mapping the preset validation rule to the node. This mapping can be accomplished through a declarative syntax, which can include XPath expressions. Each preset validation rule that governs a node, or group of nodes, can be associated with the node or group of nodes with XPath expressions. The alert information can also be associated with the node or nodes with XPath expressions, either alone or along with the preset validation rule.

An example of the declarative syntax the system 100 can use to associate a preset validation rule to its node is shown below:

```
<xsf:validationConstraints>
  <xsf:errorCondition
    match="TravelPlan"
    expression=". > ../endDate"
    expressionContext="startDate"
    showErrorOn=".|../endDate">
    <xsf:errorMessage  type="Modeless"
    shortMessage="short error message">
      long error message
    </xsf:errorMessage>
  </xsf:errorCondition>
</xsf:validationConstraints>
```

In this example, a preset validation rule is associated with a node, marked as "TravelPlan", of a structured data file. When a user later enters data into a data-entry field mapped to this node, the real-time validation tool 122 can validate the data against the preset validation rule. The preset validation rule shown here is specified by the "expression" attribute and is positive (violated) when the data entered into a data-entry field marked "endDate" violates a condition where the data entered previously into a "startDate" data-entry field is greater than the data entered into the "endDate" data-entry field. The error is shown on the "endDate" data-entry field through the code "showErrorOn=".|../endDate">".

As part of this block 920, the system 100 can build a file containing the preset validation rules created for the structured data file (or, in some cases, a generalized instance for the structured data file). This file of preset validations can be added to the structured data file's solution. The structured data file's solution, as mentioned above, contains various files, such as a viewing file to create an electronic form.

Returning to the block 908, if a developer chooses to add a custom validation rule using script, the system proceeds to the block 912.

Script-Based Validation Rules

At the block 912, the system 100 enables input of a script-based rule. The system 100 can enable input of a script-based rule in various ways, including easy-to-use ways like presenting a screen for inputting script, providing much of the surrounding script so that the developer does not have to write as much script, and the like. By so doing, the system 100 provides an easy-to-use way for a developer to input validation rules.

The system 100 provides this way of adding validation rules (and related alert information, also through the script) for developers desiring greater control than the preset rules allow, such as a developer wishing to add a validation rule of considerable complexity. Through script the developer can, for example, add a validation rule that compares data received against an entry in a non-local database, such as zip-code data received against postal zip-code database for the United States.

In addition, through script a developer has a lot of flexibility. Script allows a developer to display alert messages in a pop-up window, with a passive screen tip, and in other manners. Script also allows a developer to choose what information is presented to a user and when it is presented. A developer could, for example, have an alert message appear when a user enters invalid data but before the user continues on to another data-entry field. The developer could have an alert appear on the screen with dialog, an alarm and information presented through audio (if the system 100 connects to speakers), and/or have the data-entry field with the invalid data highlighted in various ways. The developer could choose for the data-entry field to be highlighted with a box, a dashed-line box, shading, underlining, and choose the color for each.

Script also allows a developer to set whether or not the validation rule, when violated, results in a modal or modeless error. By so doing, the real-time validation tool 122 allows the developer to create a validation rule for a particular node of a structured data file, decide whether it is modal or not, and create the presentation and content of alerts.

Figure 17:
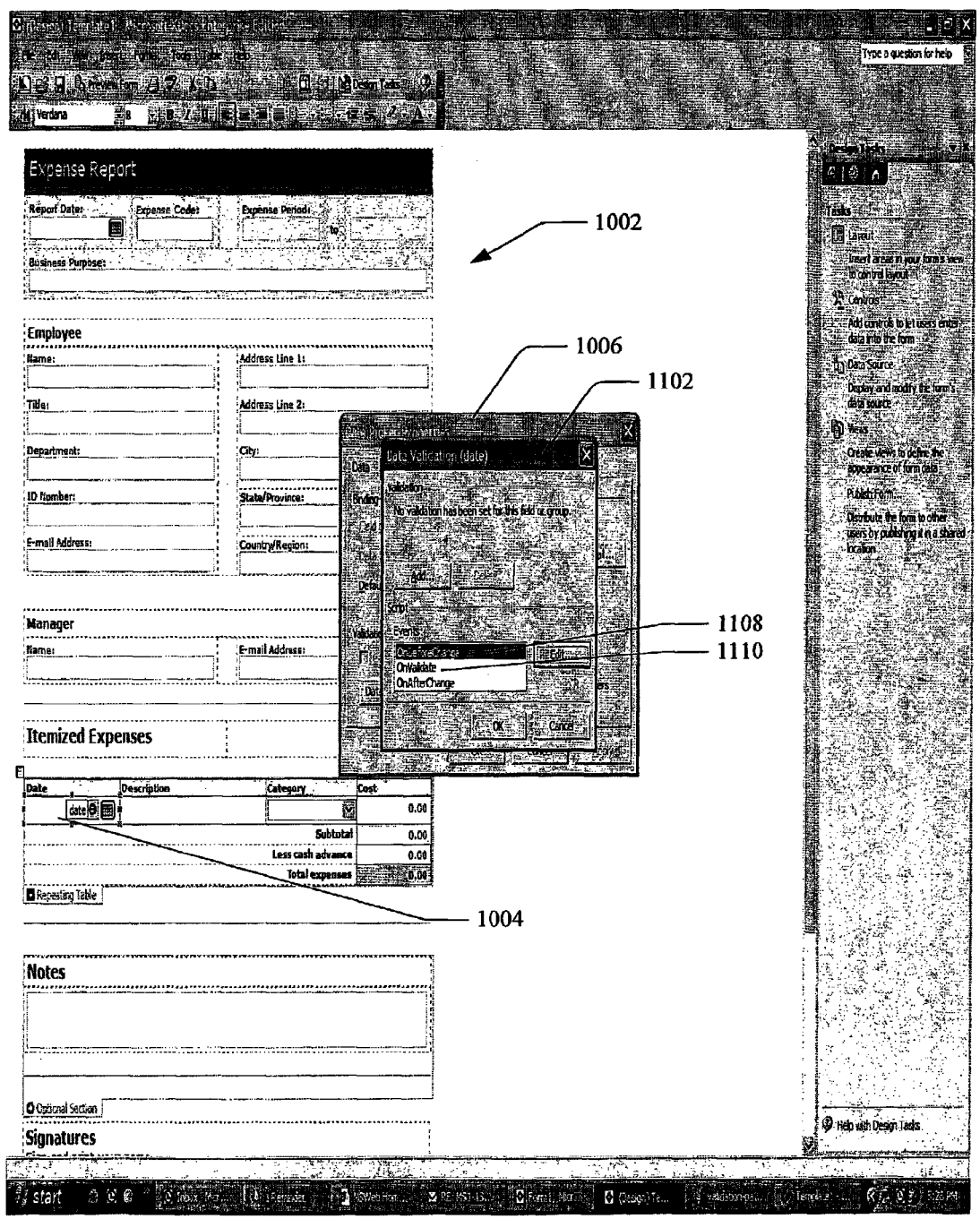
FIG. 17 illustrates an exemplary custom validation screen, including a development copy of an electronic form, a properties box, and a validation option box.

FIG. 17 shows an exemplary custom validation screen 1700, including the development copy of the expense report electronic form 1002, the date data-entry field 1004, the properties box 1006 (obscured), the validation option box 1102, the OnBeforeChange event 1108, and the OnValidate event 1110. In this example, a developer can choose to input a script-based validation rule by selecting the OnBeforeChange event 1108 or the OnValidate event 1110. Event handlers are useful in associating script-based rules with nodes, and will be discussed in greater detail below.

Figure 18:
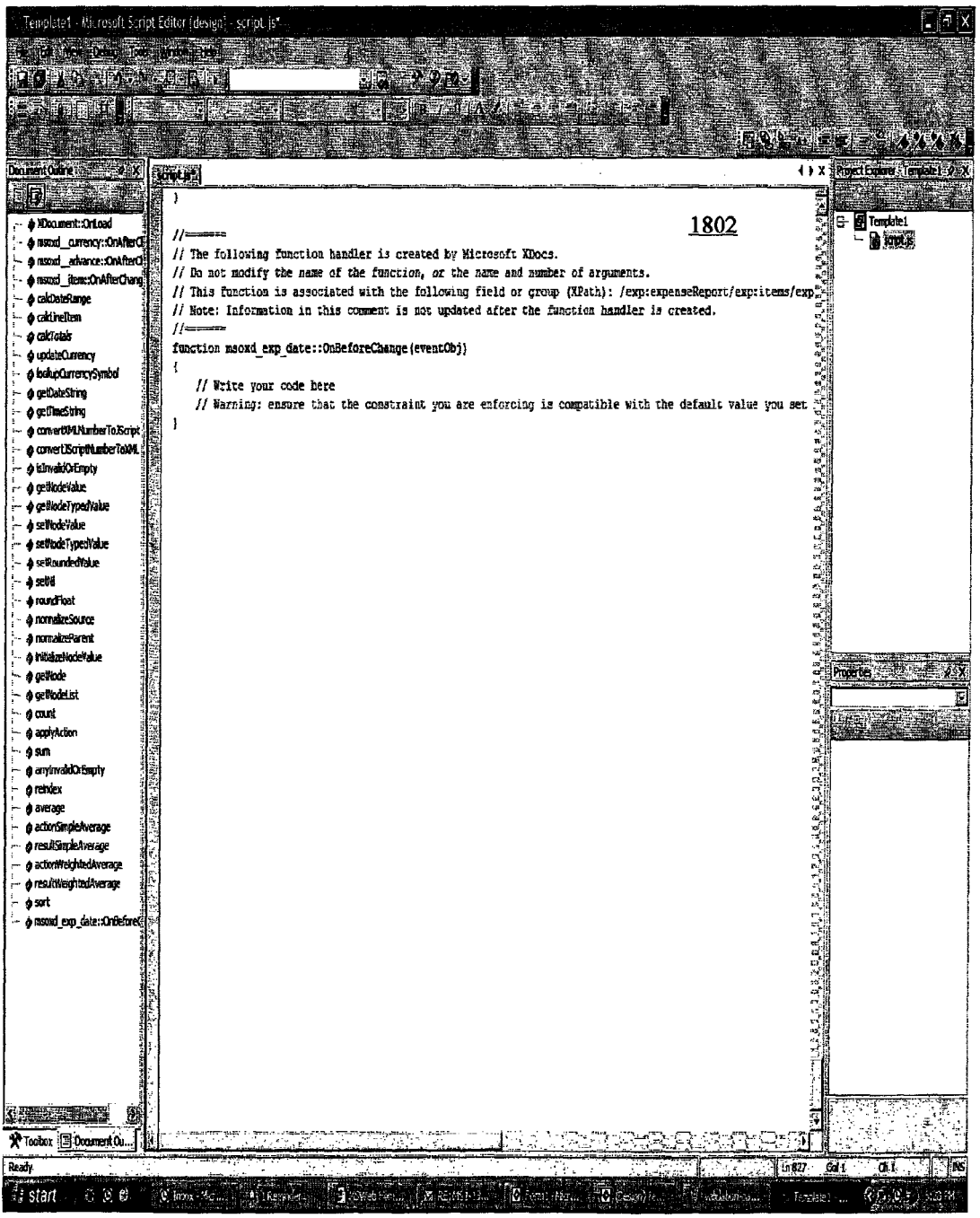
FIG. 18 illustrates an exemplary script entry screen for entry of a script-based validation rule.

FIG. 18 shows an exemplary script entry screen 1800. In this example, the system 100 continues to enable the developer to input a script-based validation rule by presenting the script entry screen 1800. To aid the developer in inputting script, the system 100 provides some of the script needed, which is shown in a script entry area 1802. By so doing, the system 100 makes it easier for the developer to input a script-based validation rule.

When a developer inputs script, the script can be written to include not only a validation rule, but also the information for alerts to a user and how those alerts are displayed.

At block 922, once the developer has input the script, the system 100 receives the script. The system 100 saves the script, either alone or along with other files in the structured data file's solution.

Associating the Script-Based Validation Rule with Its Node

At block 924, the system 100 associates the script with the appropriate node. The system can associate script-based validation rules (and the included alert information, if any) to a particular node through use of event handlers. The event handlers are stored in a file accessible by the real-time validation tool 122, such as in the solution. An event handler points to script that should be executed when data entered into a particular data-entry field is received. The event handlers can point to the script through XPath expressions, or otherwise, so long as the event handler informs the real-time validation tool 122 of the correct script to execute for data received.

For example, the following declaration defines an event handler for a script-based validation rule that the real-time validation tool 122 will apply to a "travelReport/Expenses" data-entry field in an electronic form.

```
<xsf:domEventHandlers>
  <xsf:domEventHandler
    match="TravelReport/Expenses"
    handlerObject="TravelExpenses" />
</xsf:domEventHandlers>
```

The type of event handler determines when the real-time validation tool 122 executes the script. One type of event handler is executed by the real-time validation tool 122 before the real-time validation tool 122 allows the user of an electronic form to move on after entering data. The OnBeforeChange event handler 1108 is an example of this type of event handler. With this type of event handler, when data is entered and received by the real-time validation tool 122, but before the real-time validation tool 122 allows the user to edit another data-entry field, the real-time validation tool 122 (or the system 100) executes the script pointed to by the event handler.

Developers can use this type of event handler for errors that the developer wants to be modal. This type of event handler can be used for modal errors because the real-time validation tool 122 is able to determine, by executing the script, that the data entered is invalid before it has allowed the user to continue editing the electronic form. Thus, the developer can stop the user from continuing to edit the electronic form if the rule is violated.

Continuing the previous example, the following script is executed by the real-time validation tool 122 whenever any change is made to the "TravelReport/Expenses" data-entry field or its node (or any other node inside its hierarchy) but before the real-time validation tool 122 allows the user to continue editing the electronic form. This script-based validation rule is violated if the data received for the "TravelReport/Expenses" data-entry field is greater than 500, based on the script: "value of expense report!=500". If the data received is greater than 500, this script-based validation rule will cause the real-time validation tool 122 to return a modal error.

```
function TravelExpenses::onBeforeChange (eventObj){
  if (eventObj.Source.Text != '500')
  {
    eventObj.ReturnMessage = "Correct value is 500";
    return false;
  }
  return true;
}
```

Another type of event handler is executed by the real-time validation tool 122 after the real-time validation tool 122 has allowed the user of an electronic form to move on after entering data. The OnValidate event handler 1110 is an example of this type of event handler. Developers can use this type of event handler for errors that the developer desires to be modeless. Errors that are programmatically added to the electronic form can constantly be checked by the real-time validation tool 122 and automatically cleared when the condition that triggered them no longer exists.

A Computer System

FIG. 19 shows an exemplary computer system that can be used to implement the processes described herein. Computer 1942 includes one or more processors or processing units 1944, a system memory 1946, and a bus 1948 that couples various system components including the system memory 1946 to processors 1944. The bus 1948 represents one or more of any of several types of bus structures, including a memory bus or memory controller, a peripheral bus, an accelerated graphics port, and a processor or local bus using any of a variety of bus architectures. The system memory 1946 includes read only memory (ROM) 1950 and random access memory (RAM) 1952. A basic input/output system (BIOS) 1954, containing the basic routines that help to transfer information between elements within computer 1942, such as during start-up, is stored in ROM 1950.

Computer 1942 further includes a hard disk drive 1956 for reading from and writing to a hard disk (not shown), a magnetic disk drive 1958 for reading from and writing to a removable magnetic disk 1960, and an optical disk drive 1962 for reading from or writing to a removable optical disk 1964 such as a CD ROM or other optical media. The hard disk drive 1956, magnetic disk drive 1958, and optical disk drive 1962 are connected to the bus 1948 by an SCSI interface 1966 or some other appropriate interface. The drives and their associated computer-readable media provide nonvolatile storage of computer-readable instructions, data structures, program modules and other data for computer 1942. Although the exemplary environment described herein employs a hard disk, a removable magnetic disk 1960 and a removable optical disk 1964, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 1956, magnetic disk 1960, optical disk 1964, ROM 1950, or RAM 1952, including an operating system 1970, one or more application programs 1972 (such as a real-time validation tool), other program modules 1974, and program data 1976. A user may enter commands and information into computer 1942 through input devices such as a keyboard 1978 and a pointing device 1980. Other input devices (not shown) may include a microphone, joystick, game pad, satellite dish, scanner, or the like. These and other input devices are connected to the processing unit 1944 through an interface 1982 that is coupled to the bus 1948. A monitor 1984 or other type of display device is also connected to the bus 1948 via an interface, such as a video adapter 1986. In addition to the monitor, personal computers typically include other peripheral output devices (not shown) such as speakers and printers.

Computer 1942 commonly operates in a networked environment using logical connections to one or more remote computers, such as a remote computer 1988. The remote computer 1988 may be another personal computer, a server, a router, a network PC, a peer device or other common network node, and typically includes many or all of the elements described above relative to computer 1942. The logical connections depicted in FIG. 19 include a local area network (LAN) 1990 and a wide area network (WAN) 1992. Such networking environments are commonplace in offices, enterprise-wide computer networks, intranets, and the Internet.

When used in a LAN networking environment, computer 1942 is connected to the local network through a network interface or adapter 1994. When used in a WAN networking environment, computer 1942 typically includes a modem 1996 or other means for establishing communications over the wide area network 1992, such as the Internet. The modem 1996, which may be internal or external, is connected to the bus 1948 via a serial port interface 1968. In a networked environment, program modules depicted relative to the personal computer 1942, or portions thereof, may be stored in the remote memory storage device. It will be appreciated that the network connections shown are exemplary and other means of establishing a communications link between the computers may be used.

Generally, the data processors of computer 1942 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the blocks described below in conjunction with a microprocessor or other data processor. The invention also includes the computer itself when programmed according to the methods and techniques described herein.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The above-described real-time validation tool provides an easy and intuitive way for a user to correctly and efficiently edit structured data files by notifying the user of her errors as she makes them. The above-described real-time validation tool also enables a developer to efficiently create custom validation rules for use by the real-time validation tool. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A method comprising:
receiving, at a computing device, first data entered into a first data-entry field mapped to a first node of a hierarchical data file written in XML, the first data intended for storage in the first node of the hierarchical data file; and
validating, locally on the computing device and using one or more validation rules based at least in part on a schema containing logic governing the hierarchical data file, wherein at least one validation rule is configured to be a script-based rule, the first data received in real time and prior to permitting entry of second data into a second data-entry field mapped to a second node of the hierarchical data file, the second data intended for storage in the second node of the hierarchical data file, the one or more validation rules governing a node group of the hierarchical data file of which the first node is a part of, and validating being based on third data stored in at least a third node of the node group, the third data having been entered into a third data-entry field mapped to at least the third node.

2. A method of claim 1, further comprising providing an alert if the first data received is not valid.

3. A method of claim 1, further comprising providing an alert if the first data received is not valid, wherein the alert includes information related to the invalid first data.

4. A method of claim 1, further comprising providing an alert if the first data received is not valid, wherein the alert marks the first data-entry field.

5. A method of claim 1, wherein the first data is received from a user entering the first data into an electronic form.

6. A method of claim 1, wherein the first data is received from a user entering the first data into the first data-entry field and further comprising alerting the user if the first data received is invalid.

7. A method of claim 1, wherein the first data is received from a user entering the first data into the first data-entry field and further comprising alerting the user with information related to the first data if the first data is invalid.

8. A method of claim 1, wherein the first data is received from a user entering the first data into the first data-entry field and further comprising alerting the user by marking the first data-entry field containing the first data if the first data is invalid.

9. A method of claim 1, wherein the first data is received from a user entering the first data into the first data-entry field and further comprising alerting the user by marking the first data-entry field containing the first data by outlining the first data-entry field with a red, dashed-lined box if the first data is invalid.

10. A method of claim 1, wherein the first data is received from a user entering the first data into the first data-entry field and further comprising alerting the user by marking the first data-entry field containing the first data with a solid red underline beneath the first data in the first data-entry field.

11. A method of claim 1, wherein the first data is received from a user entering the first data into an electronic form through the first data-entry field and further comprising preventing the user from editing the second data-entry field in the electronic form if the first data received is invalid.

12. A method of claim 1, wherein the first data is received from a user entering the first data into an electronic form through the first data-entry field and further comprising enabling the user to enter second data into the second data-entry field in the electronic form if the first data received is valid.

13. A method of claim 1, wherein the first data is received from a user entering the first data into an electronic form written in XHTML.

14. A method of claim 1, further comprising:
displaying an electronic form with the first data-entry field mapped to the first node; and
enabling a user to input the first data into the first data-entry field.

15. A computer-readable storage medium comprising computer-executable instructions that perform the method of claim 1 when executed by a computer.

16. A method comprising:
displaying with a computing device an electronic form with first and second data-entry fields associated with first and second nodes in a hierarchical data file written in XML;
enabling a user to input data into the first data-entry field through the computing device, the data being storable in the first node;
receiving data input into the first data-entry field;
validating the data, locally on the computing device, with a validation rule, in real time, and prior to enabling the user to input second data into the second data-entry field, to determine if the data is valid or invalid, wherein the validation rule is based on a part of a schema containing logic that governs the hierarchical data file, wherein the logic sets forth bounds of what data nodes the file can contain or the structure the nodes should have, and wherein the validation rule governs a node group of the hierarchical data file which includes the first node, and wherein validating is based on third data stored in a third node belonging to the node group, the third data having been entered into a third data-entry field mapped to the third node; and
enabling the user to input the second data into the second data-entry field if the data input into the first data-entry field is valid, the second data being storable in the second node, or alerting the user if the data input into the first data-entry field is invalid.

17. A method of claim 16, further comprising:
enabling the user to input the second data into the second data-entry field if the data is invalid.

18. A method of claim 16, wherein alerting the user includes marking the first data-entry field.

19. A method of claim 16, wherein alerting the user includes presenting a dialog box informing the user that the data input is invalid.

20. A method of claim 16, further comprising:
requiring the user to correct the data input into the first data-entry field if the data is invalid.

21. A method of claim 16, wherein the electronic form has a fourth data-entry field.

22. A method of claim 21, wherein alerting the user includes marking the first data-entry field and the fourth data-entry field.

23. A method of claim 16, wherein the validation rule is written in script.

24. A method of claim 16, wherein the validation rule written in a declarative syntax.

25. A computer-readable storage medium comprising computer-executable instructions that perform the method of claim 16 when executed by the computing device.

26. One or more computer-readable storage media comprising computer-executable instructions that are executable to implement a user interface, the user interface comprising:
an electronic form containing a first data-entry field mapped to a first node of a hierarchical data file and a second data-entry field mapped to a second node of the hierarchical data file;
an interface to enable a user to input first data into the first data-entry field and prohibit, in response to a real-time validation indicating that the first data is invalid, the user to input second data into the second data-entry field, wherein the real-time validation is performed in real-time locally on a computing device comprising one or more processors, and wherein the real-time validation is performed using one or more validation rules based at least in part on a schema containing logic governing the hierarchical data file, wherein the real-time validation is configured to perform validation based on script-based validation rules and wherein the real-time validation is performed based at least in part on third data having been entered into a third data-entry field mapped to at least a third node of the hierarchical data file, and wherein the first data is intended for storage in the first node; and
an alert area near the first data-entry field indicating that the data input is invalid based on the real-time validation indicating that the first data is invalid.

27. The one or more computer-readable storage media of claim 26, wherein the alert area includes graphics surrounding the first data-entry field.

28. The one or more computer-readable storage media of claim 26, wherein the alert area surrounds the first data-entry field and includes graphics containing a red, dashed-lined box.

29. The one or more computer-readable storage media of claim 26, wherein the alert area includes graphics highlighting the first data.

30. The one or more computer-readable storage media of claim 26, wherein the alert area surrounds the first data-entry field and includes the graphics containing a squiggly line beneath the invalid first data.

31. The one or more computer-readable storage media of claim 26, wherein the alert area includes text containing information about the invalid first data.

32. The one or more computer-readable storage media of claim 26, wherein the alert area includes text containing information about the first data-entry field.

33. The one or more computer-readable storage media of claim 26, wherein the alert area includes a pop-up window.

34. A system comprising:
- a user-input device;
- a computer having a display;
- a user interface executable on the computer and configured to:
  - display in the display an electronic form containing a first data-entry field mapped to a first node of a hierarchical data file written in XML; and
  - receive first data input into the first data-entry field via the user input device; and
- a real-time validation tool application executable on the computer and configured to:
  - validate without communicating with a remote computing device remote from the computer having the display, in real-time and prior to second data being input into a second data-entry field mapped to a second node of the hierarchical data file, the first data input into the data-entry field against one or more validation rules, wherein the one or more validation rules are based at least in part on a schema containing logic governing the hierarchical data file, wherein at least one validation rule is configured to be a script-based rule and wherein the one or more validation rules govern a node group of the hierarchical data file of which the first node is a part of, and wherein the real-time validation tool application is configured to validate the first data based at least in part on third data having been input into a third data-entry field mapped to a third node of the hierarchical data file; and
  - indicate whether the first data is valid or invalid to the user interface, wherein the user interface is further configured to:
    - prohibit the user from inputting the second data into the second data-entry field if the real-time validation tool indicates that the first data is invalid; and
    - enable the user to input the second data into the second data-entry field if the real-time validation tool indicates that the first data is valid.

35. An apparatus comprising:
- means for displaying an electronic form with data-entry fields associated with nodes of a hierarchical data file written in XML;
- means for enabling a user to input first data into a first data-entry field of the data-entry fields;
- means for validating the first data with a validation rule, in real time and prior to enabling the user to input second data into a second data-entry field of the data-entry fields, to determine if the data is valid or invalid, wherein validating is performed locally on a computing device comprising one or more processors without communicating with a remote computing device, and wherein the validation rule is based on a part of a schema containing logic that governs the hierarchical data file, wherein the logic sets forth the bounds of what data nodes the file can contain or the structure the nodes should have, and governs a group of all or part of the nodes, and wherein one node of the group is associated with the first data-entry field and is intended to store the first data input into the first data-entry field, and wherein validating is based at least in part on third data having been input into a third data-entry field of the data-entry fields, wherein the third data-entry field is associated with another node of the group storing the third data; and
- means for enabling the user to input the second data into the second data-entry field if the first data input into the first data-entry field is valid, or alerting the user if the first data input into the first data-entry field is invalid.

* * * * *